(12) United States Patent
Szeto et al.

(10) Patent No.: US 10,956,957 B2
(45) Date of Patent: Mar. 23, 2021

(54) TECHNIQUES FOR AUTOMATED MESSAGING

(71) Applicant: Facebook, Inc., Menlo Park, CA (US)

(72) Inventors: Andrew Eugene Szeto, Menlo Park, CA (US); Shawn C. P. Mei, San Francisco, CA (US); Alexander David Ramirez, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 262 days.

(21) Appl. No.: 14/804,650

(22) Filed: Jul. 21, 2015

(65) Prior Publication Data
US 2016/0285790 A1    Sep. 29, 2016

Related U.S. Application Data

(60) Provisional application No. 62/138,337, filed on Mar. 25, 2015, provisional application No. 62/138,341,
(Continued)

(51) Int. Cl.
*G06F 15/16*    (2006.01)
*G06Q 30/06*    (2012.01)
(Continued)

(52) U.S. Cl.
CPC ..... *G06Q 30/0631* (2013.01); *G06Q 30/0635* (2013.01); *H04L 51/02* (2013.01);
(Continued)

(58) Field of Classification Search
CPC .............................. H04L 51/02; H04L 67/306
(Continued)

(56) References Cited

U.S. PATENT DOCUMENTS 6,065,042 A * 5/2000 Reimer ................ G11B 27/034
709/203
6,497,412 B1 * 12/2002 Bramm ................... A63F 9/183
273/430
(Continued)

FOREIGN PATENT DOCUMENTS

CN        101076060 A     11/2007
WO        2014017674      1/2014

OTHER PUBLICATIONS

Ferrucci et al., "Building Watson: An overview of the DeepQA Project", AI Magazine, Fall 2010, All Pages (Year: 2010).*
(Continued)

*Primary Examiner* — Anthony Mejia
(74) *Attorney, Agent, or Firm* — Kacvinsky Daisak Bluni PLLC

(57) ABSTRACT

Techniques for automated messaging are described. Some embodiments are particularly directed to techniques for automated business-to-consumer messaging leveraging social-networking information. In one embodiment, an apparatus may comprise a user profile component operative to retrieve a user profile associated with a user account for a messaging service and a messaging automation component operative to receive a messaging initiation from a messaging endpoint on a client device; and configure an automated response based on the user profile in response to the messaging initiation. Other embodiments are described and claimed.

17 Claims, 30 Drawing Sheets

Related U.S. Application Data filed on Mar. 25, 2015, provisional application No. 62/138,344, filed on Mar. 25, 2015.

(51) Int. Cl.
  *H04L 12/58* (2006.01)
  *H04L 29/08* (2006.01)
  *G06Q 50/00* (2012.01)

(52) U.S. Cl.
  CPC ............ *H04L 51/32* (2013.01); *H04L 67/306* (2013.01); *G06Q 50/01* (2013.01)

(58) Field of Classification Search
  USPC ......................................................... 709/206
  See application file for complete search history.

(56) References Cited

U.S. PATENT DOCUMENTS

| | | | | |
|---|---|---|---|---|
| 6,606,644 | B1* | 8/2003 | Ford | H04L 12/1831 709/203 |
| 7,155,421 | B1* | 12/2006 | Haldar | G06N 5/003 706/46 |
| 7,219,072 | B1 | 5/2007 | Sundaresan | |
| 7,475,109 | B1* | 1/2009 | Fletcher | G06Q 10/107 709/204 |
| 7,720,835 | B2* | 5/2010 | Ward | G06Q 50/01 707/710 |
| 8,032,483 | B1* | 10/2011 | Haveliwala | G06Q 30/02 706/20 |
| 8,160,979 | B1* | 4/2012 | Evans | G06F 16/334 706/45 |
| 8,165,997 | B1* | 4/2012 | Podgorny | G06F 16/35 707/688 |
| 8,959,043 | B2 | 2/2015 | Ferrucci et al. | |
| 8,995,972 | B1* | 3/2015 | Cronin | G10L 15/1822 455/414.3 |
| 9,116,996 | B1* | 8/2015 | Provine | G06F 16/334 |
| 9,247,066 | B1* | 1/2016 | Stec | G06F 40/30 |
| 9,253,139 | B1* | 2/2016 | Fisher | G06F 40/30 |
| 2002/0107712 | A1* | 8/2002 | Lam | G06Q 10/063 705/7.11 |
| 2004/0137413 | A1* | 7/2004 | Yamamoto | A61B 5/16 434/236 |
| 2007/0022040 | A1* | 1/2007 | Gordon | G06Q 30/0633 705/37 |
| 2007/0112762 | A1* | 5/2007 | Brubaker | G06Q 30/02 |
| 2008/0235095 | A1* | 9/2008 | Oles | G06Q 30/0225 705/14.26 |
| 2009/0037541 | A1* | 2/2009 | Wilson | G06Q 10/10 709/206 |
| 2009/0186330 | A1* | 7/2009 | Brownholtz | G06Q 10/10 434/362 |
| 2010/0057723 | A1* | 3/2010 | Rajaram | G06F 16/951 707/E17.032 |
| 2010/0131563 | A1* | 5/2010 | Yin | G06F 16/338 707/794 |
| 2010/0191686 | A1* | 7/2010 | Wang | G09B 7/02 706/46 |
| 2010/0204550 | A1* | 8/2010 | Heneghan | A61B 5/4818 600/301 |
| 2010/0235343 | A1* | 9/2010 | Cao | G06F 16/951 707/710 |
| 2011/0004520 | A1* | 1/2011 | Chou | G06Q 30/02 705/14.53 |
| 2011/0054977 | A1* | 3/2011 | Jaffer | G06Q 10/06 705/7.37 |
| 2011/0125734 | A1* | 5/2011 | Duboue | G09B 7/00 707/723 |
| 2011/0153312 | A1* | 6/2011 | Roberts | G06F 16/3329 704/9 |
| 2011/0161431 | A1 | 6/2011 | Jagannathan et al. | |
| 2011/0196927 | A1* | 8/2011 | Vance | G06Q 10/107 709/204 |
| 2011/0262890 | A1* | 10/2011 | Kanemoto | G09B 7/00 434/362 |
| 2011/0264691 | A1* | 10/2011 | Migita | G06Q 90/20 707/769 |
| 2012/0065963 | A1 | 3/2012 | Bangalore et al. | |
| 2012/0072260 | A1* | 3/2012 | Graham | G06Q 10/10 705/7.32 |
| 2012/0101807 | A1* | 4/2012 | Heo | G06F 16/3331 704/9 |
| 2012/0150973 | A1* | 6/2012 | Barak | H04L 51/04 709/206 |
| 2012/0278300 | A1* | 11/2012 | Soubbotin | G06F 16/338 707/706 |
| 2013/0007037 | A1* | 1/2013 | Azzam | G06F 16/3329 707/769 |
| 2013/0097269 | A1* | 4/2013 | Plotkin | H04L 51/02 709/206 |
| 2013/0097270 | A1* | 4/2013 | Plotkin | H04M 1/72547 709/206 |
| 2013/0124449 | A1* | 5/2013 | Pinckney | G06N 5/048 706/52 |
| 2013/0173723 | A1 | 7/2013 | Herold et al. | |
| 2013/0304730 | A1* | 11/2013 | Zhou | G06F 16/951 707/723 |
| 2013/0325645 | A1* | 12/2013 | Thomas | G06Q 30/0615 705/26.3 |
| 2014/0133696 | A1 | 3/2014 | Ilan et al. | |
| 2014/0108231 | A1 | 4/2014 | Keen, Jr. et al. | |
| 2014/0143324 | A1* | 5/2014 | Lessin | G06F 16/13 709/204 |
| 2014/0164296 | A1* | 6/2014 | Duan | G06N 5/047 706/11 |
| 2014/0164304 | A1* | 6/2014 | Bagchi | G06N 5/02 706/46 |
| 2014/0171133 | A1* | 6/2014 | Stuttle | H04W 4/14 455/466 |
| 2014/0245141 | A1* | 8/2014 | Yeh | G06F 9/453 715/708 |
| 2014/0280612 | A1 | 9/2014 | Beslic et al. | |
| 2014/0280623 | A1 | 9/2014 | Duan | |
| 2014/0317030 | A1 | 10/2014 | Shen et al. | |
| 2014/0342704 | A1 | 11/2014 | Alam | |
| 2014/0358612 | A1 | 12/2014 | Sri et al. | |
| 2014/0380179 | A1* | 12/2014 | Bose | G06Q 10/10 715/738 |
| 2015/0088998 | A1* | 3/2015 | Isensee | H04L 67/141 709/206 |
| 2015/0193682 | A1* | 7/2015 | Baughman | G06F 16/243 707/728 |
| 2015/0228280 | A1* | 8/2015 | Watanabe | G06F 40/55 704/235 |
| 2015/0244653 | A1* | 8/2015 | Niu | G06F 3/0481 715/752 |
| 2015/0281138 | A1* | 10/2015 | Niu | H04L 51/02 709/206 |
| 2015/0283455 | A1* | 10/2015 | Nova | A63F 9/183 463/9 |
| 2015/0293901 | A1* | 10/2015 | Bufe, III | G06F 16/24578 707/725 |
| 2015/0293988 | A1* | 10/2015 | Eubanks | G06F 16/285 707/738 |
| 2015/0302301 | A1* | 10/2015 | Petersen | G06N 5/04 706/11 |
| 2016/0014580 | A1 | 1/2016 | Kim et al. | |
| 2016/0019293 | A1* | 1/2016 | Bhagwat | G06F 16/3344 707/732 |
| 2016/0066164 | A1* | 3/2016 | Steinbach | H04W 4/12 455/411 |
| 2016/0092410 | A1* | 3/2016 | Martin | G06F 40/109 715/269 |
| 2016/0140446 | A1* | 5/2016 | Adderly | G06N 5/022 706/51 |
| 2016/0285816 | A1* | 9/2016 | Schmid | G06Q 30/0631 |
| 2016/0308799 | A1* | 10/2016 | Schubert | H04L 51/046 |
| 2016/0371276 | A1* | 12/2016 | Furtado | G06F 16/24578 |
| 2017/0091164 | A1* | 3/2017 | Bao | G06F 40/284 |

(56) References Cited

U.S. PATENT DOCUMENTS

2017/0132309 A1\* 5/2017 Bufe ...................... G06N 5/022
2017/0178531 A1\* 6/2017 Swank .................... G06F 21/31
2017/0206191 A1\* 7/2017 Biegert ................. G06F 40/284

OTHER PUBLICATIONS

Xiaoli et al., "Semantic Pattern based Dependency Matching for Exact Answer Retrieval", 2007, IEEE, Third International Conference on Semantics, Knowledge, and Grid, 262-265 (Year: 2007).\*
International Search Report and Written Opinion received for PCT Patent Application No. PCT/US2015/041555, dated Feb. 18, 2016, 12 pages.

\* cited by examiner

*600*

Receiving, at a network interface on a commerce intermediary server, an order request package from a client device, the order request specifying a user account and a commerce account, the user account associated with a user entity in a social graph data structure, the commerce account associated with a commerce entity in the social graph data structure.
*602*

Transmitting the order request package to a commerce front-end server associated with the commerce entity.
*604*

Creating a commerce edge in the social graph data structure between the user entity and the commerce entity, the commerce edge associated with the order request package.
*606*

Receive a messaging package from a messaging endpoint at a messaging service.
*902*

Perform a natural language processing of the messaging package to determine a response message predicted to correspond to the messaging package.
*904*

Determine an administrator account assigned to respond to the messaging package.
*906*

Transmit a form response package to an administrator messaging endpoint for the administrator account, the form response package comprising the response message.
*908*

*FIG. 9*

TECHNIQUES FOR AUTOMATED MESSAGING

RELATED APPLICATIONS

This application claims the benefit of priority under 35 U.S.C. § 119(e) to U.S. Provisional Patent Application No. 62/138,337, titled "Techniques for Social Messaging Authorization and Customization," filed on Mar. 25, 2015, which is hereby incorporated by reference in its entirety.

This application claims the benefit of priority under 35 U.S.C. § 119(e) to U.S. Provisional Patent Application No. 62/138,341, titled "Techniques for Product, Service, and Business Recommendation," filed on Mar. 25, 2015, which is hereby incorporated by reference in its entirety.

This application claims the benefit of priority under 35 U.S.C. § 119(e) to U.S. Provisional Patent Application No. 62/138,344, titled "Techniques for Automated Messaging," filed on Mar. 25, 2015, which is hereby incorporated by reference in its entirety.

This application is related to the United States patent application titled "Techniques for Social Messaging Authorization and Customization," filed on Jul. 21, 2015, which is hereby incorporated by reference in its entirety.

This application is related to the United States patent application titled "Techniques for Automated Determination of Form Responses," filed on Jul. 21, 2015, which is hereby incorporated by reference in its entirety.

This application is related to the United States patent application titled "Techniques for Product, Service, and Business Recommendation," filed on Jul. 21, 2015, which is hereby incorporated by reference in its entirety.

BACKGROUND

Users may interact with each other in a messaging system, sending messages back and forth to each other in a text-based conversation between two or more users. A user may have a user account associated with them in the messaging system, the user account providing an online identity for the user, a destination for messages directed to the user, and generally coordinating the user's access to and use of the messaging system. A user may access the messaging system from a variety of endpoints, including mobile devices (e.g., cellphones), desktop computers, web browsers, specialized messaging clients, etc.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for social messaging authorization and customization. Some embodiments are particularly directed to techniques in which commerce entity access to a messaging system is authorized based on a social networking relationship between the business and messaged users, and in which messaging between businesses and users is customized according to social networking information. In one embodiment, for example, an apparatus may comprise a commerce intermediary server operative to receive, from a network interface, an order request package from a client device, the order request specifying a user account and a commerce account, the user account associated with a user entity in a social graph data structure, the commerce account associated with a commerce entity in the social graph data structure; and transmit the order request package to a commerce front-end server associated with the commerce entity; and a social graph data structure component operative to create a commerce edge in the social graph data structure between the user entity and the commerce entity in response to the commerce intermediary server receiving the order request package from the client device, the commerce edge associated with the order request package. Other embodiments are described and claimed.

Various embodiments are generally directed to techniques for automated determination of form responses. Some embodiments are particularly directed to techniques in which natural language processing is used to determine which of a set of form responses is most appropriate to a particular natural language query or comment by a user. In one embodiment, for example, a commerce intermediary server may be operative to receive a messaging package from a messaging endpoint at a messaging service; perform a natural language processing of the messaging package to determine a response message predicted to correspond to the messaging package; determine an administrator account assigned to respond to the messaging package; and transmit a form response package to an administrator messaging endpoint for the administrator account, the form response package comprising the response message. Other embodiments are described and claimed.

Various embodiments are generally directed to techniques for product, service, and business recommendation. Some embodiments are particularly directed to techniques for product, service, and business recommendation leveraging messaging affinity information. In one embodiment, for example, an apparatus may comprise a user context component operative to manage a user context associated with a user account for a messaging service; a user profile component operative to retrieve a user profile for the user account; and a recommendation component operative to determine one or more recommendations based on the user context and the user profile and configure a recommendation interface for a messaging endpoint on a client device based on the recommendations, the messaging endpoint associated with the user account for the messaging service. Other embodiments are described and claimed.

Various embodiments are generally directed to techniques for automated messaging. Some embodiments are particularly directed to techniques for automated business-to-consumer messaging leveraging social-networking information. In one embodiment, for example, an apparatus may comprise a user profile component operative to retrieve a user profile associated with a user account for a messaging service; and a messaging automation component operative to receive a messaging initiation from a messaging endpoint on a client device; and configure an automated response based on the user profile in response to the messaging initiation. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel

BRIEF DESCRIPTION OF THE DRAWINGS

FIG. 6 illustrates an embodiment of a first logic flow for the system of FIG. 1.

FIG. 9 illustrates an embodiment of a second logic flow for the system of FIG. 1.

DETAILED DESCRIPTION

Figure 1:
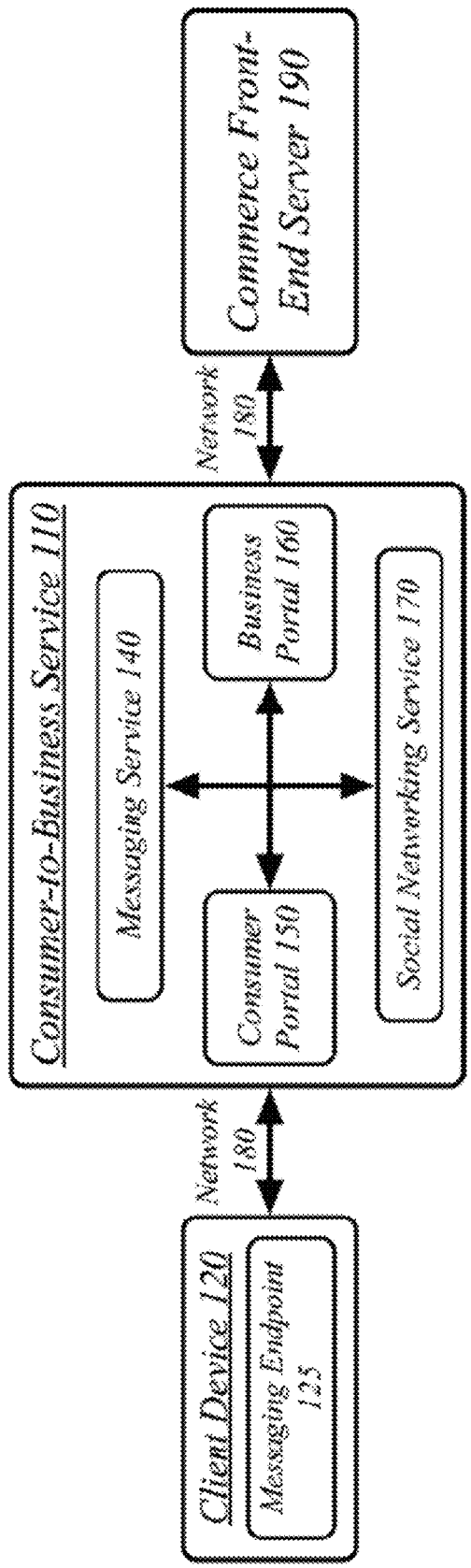
FIG. 1 illustrates an embodiment of a consumer-to-business messaging system.

Users may engage with a business via a page in a social-networking service using messaging communication, as they may be familiar with from chatting with friends. Users may discover, engage with, and purchase products and services from these businesses in the same messaging application they use for communicating with friends, colleagues, and other acquaintances. Some of these messages may be automatically responded to, while others may be responded to fully or partially manually by administrators of business pages. A partially-manual response may make use of a proposed response identified by a natural language processor, that is automatically presented to the administrator but that is manually approved before sending. In contrast, fully-automated responses may also be used in which the messaging service responds without administrator approval. Fully-manual response may be used in which the administrator themselves crafts the response that is sent to the user. By combining various techniques for discovery, engagement, and messaging, users may presented with the best response to their particular situation. As a result, the embodiments herein may improve the naturalness of communicating with a business while still leveraging automation techniques where appropriate.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-$a$ may include components 122-1, 122-2, 122-3, 122-4 and 122-5. The embodiments are not limited in this context.

FIG. 1 illustrates a block diagram for a consumer-to-business messaging system 100. In one embodiment, the consumer-to-business messaging system 100 may comprise a computer-implemented system having software applications comprising one or more components. Although the consumer-to-business messaging system 100 shown in FIG. 1 has a limited number of elements in a certain topology, it may be appreciated that the consumer-to-business messaging system 100 may include more or less elements in alternate topologies as desired for a given implementation.

A consumer-to-business service 110 may serve as an intermediary between consumers and businesses. Consumers and businesses may both be users of the consumer-to-business service 110, with consumers represented via an individual user account and businesses represented by a commerce account and, possibly, one or more individual user accounts associated with the business, such as individual user account associated with representatives and other employees of the business. A consumer user may be represented with a user entity entry in a social graph. A business or other commercial user may be represented by a commerce entity in a social graph. The relationship between the consumer user and the commercial user may be represented by one or more edges between the user entity and commerce entity in the social graph.

The consumer-to-business service 110 may comprise a messaging service 140. The messaging service 140 may be generally arranged to receive, store, and deliver between individual entities such as individual users and collective entities such as businesses and other organizations. The messaging service 140 may store messages while messaging endpoints, such as messaging endpoint 125, are offline and deliver the messages once the messaging endpoints are available. The messaging service 140 may empower a user to use multiple messaging endpoints (e.g., a messaging client on a mobile device, a web browser on a personal computer) for the same user account, with the messaging service 140 keeping all of the messaging endpoints up-to-date as to the messaging state of the user account.

The consumer-to-business service 110 may comprise a social networking service 170. The social networking service 170 may maintain a social graph data structure representing a social graph. The social graph may represent relationships between entities, such as user entities, commerce entities, and any other sort of entity. The social graph may represent the relationships as graph relationships, in which all information is encoded as either being attached to a particular node in the graph or attached to a particular edge between two nodes in the graph. The social networking service 170 may be an element of a social-networking service, with the social graph containing, at least in part, social-networking information. The whole of the consumer-to-business service 110 may be an element or composed of elements of a social-networking service.

The consumer-to-business service 110 may comprise a consumer portal 150. The consumer portal 150 may be a unified entry point into the consumer-to-business service 110 for client applications being used by consumers. The consumer portal 150 may serve as a general user portal for non-commerce entities, including users that are not or do not engage in commerce using the consumer-to-business service 110. The consumer portal 150 may provide access to the messaging service 140 and the social networking service 170. In some embodiments, all access to the social networking service 170 may be mediated by the consumer portal 150 in which the information of the social networking service 170 is used and managed on behalf of the user without the user having direct access to some or all of the social graph information. In some embodiments, the user may have direct access to the messaging service 140 using their user account, with the consumer portal 150 limited to consumer functions of the consumer-to-business service 110 with general messaging functionality (e.g., messaging with friends) provided through direct network communication between the messaging endpoint 125 and the messaging service 140 without the mediation of the consumer portal 150.

The consumer-to-business service 110 may comprise a business portal 160. The business portal 160 may be a unified entry point into the consumer-to-business service 110 for client application being used by business entities. The business portal 160 may provide access to the messaging service 140 and the social networking service 170. In some embodiments, all access to the social networking service 170 may be mediated by the business portal 160 in which the information of the social networking service 170 is used and managed on behalf of the commerce entity without the commerce entity having direct access to some or all of the social graph information. In some embodiments, the commerce entity may have direct access to the messaging service 140 using their commerce account, with the business portal 160 limited to business functions of the consumer-to-business service 110 with general messaging functionality (e.g., messaging with customers) provided through direct network communication between the commerce front-end service 190 and the messaging service 140 without the mediation of the business portal 160.

A user may participate in the consumer-to-business messaging system 100 and interact with the consumer-to-business service 110 using a messaging endpoint 125 software application executing on a client device 120. The client device 120 may typically be a smartphone—a mobile phone capable of executing software applications that provide functionality beyond that of a conventional telephone—such as an iPhone®, Android® phone, or other smartphone. The messaging endpoint 125 may be specifically associated with a particular messaging service 140 that forms part of the consumer-to-business service 110 or may be a general-purpose messaging client operative to interact with a plurality of messaging services. The messaging endpoint 125 may interact with one or both of the consumer portal 150 and the messaging service 140 for the performance of messaging tasks and commerce tasks.

A commerce entity, such as through the actions of representatives, employees, and/or agents of the commerce entity, may participate in the consumer-to-business messaging system 100 and interact with the consumer-to-business service 110 using a commerce front-end server 190. The commerce front-end server 190 may comprise any software and/or computer hardware used by a commerce entity for participating in the consumer-to-business messaging system 100. The commerce front-end server 190 may interact with one or both of the business portal 160 and the messaging service 140 for the performance of messaging tasks and commerce tasks. The commerce front-end server 190 may serve as or act as an intermediary within a commerce entity for computing devices used by administrators of a business's presence within the consumer-to-business messaging system 100, for computing devices used by employees carrying out purchased services or providing purchased products, or for computing devices used by any other member of a commerce entity carrying out tasks related to the consumer-to-business messaging system 100.

The network 180 may comprise any form of computer network operative to carry computer transmissions between computer devices. The network 180 may include one or both of intranets and the Internet. The network 180 may include cellular data and/or Wi-Fi data networks, such as may be used to provide connectivity to a mobile client device 120.

The consumer-to-business messaging system 100 may use knowledge generated from interactions between users. The consumer-to-business messaging system 100 may comprise a component of a social-networking service and may use knowledge generated from the broader interactions of the social-networking service. As such, to protect the privacy of the users of the consumer-to-business messaging system 100 and the larger social-networking service, consumer-to-business messaging system 100 may include an authorization server (or other suitable component(s)) that allows users to opt in to or opt out of having their actions logged by the consumer-to-business messaging system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the consumer-to-business messaging system 100 and other elements of a social-networking service through blocking, data hashing, anonymization, or other suitable techniques as appropriate. For example, while interactions between users of a social-networking service and the social-networking service may be used to learn media content preferences and the relationship between preferences for different pieces of media content, these interactions may be anonymized prior to or as part of the learning process.

Figure 2:
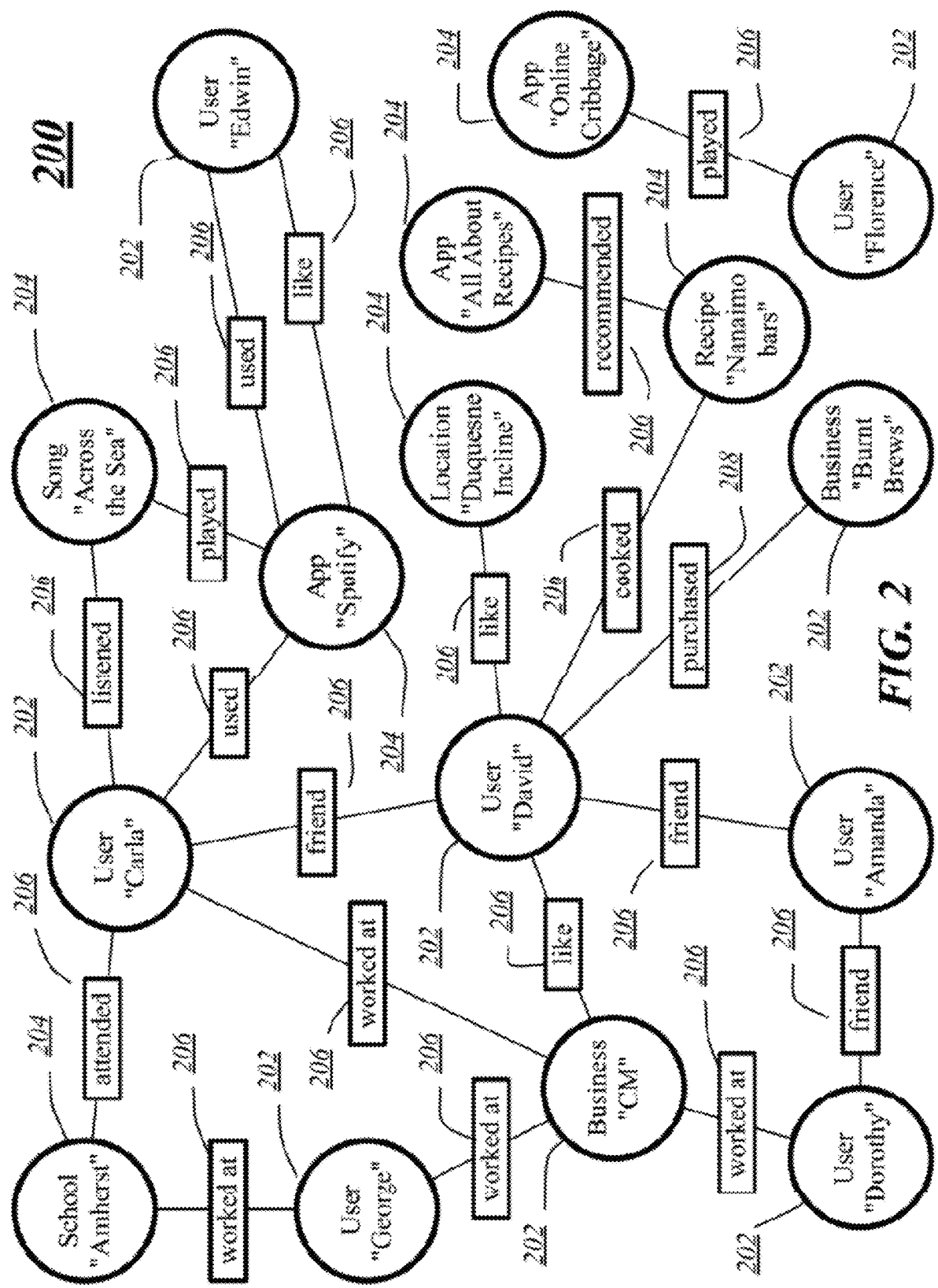
FIG. 2 illustrates an example of a social graph.

FIG. 2 illustrates an example of a social graph 200. In particular embodiments, a social-networking service may store one or more social graphs 200 in one or more data stores as a social graph data structure via the social networking service 170.

In particular embodiments, social graph 200 may include multiple nodes, which may include multiple user nodes 202 and multiple concept nodes 204. Social graph 200 may include multiple edges 206 connecting the nodes. In particular embodiments, a social-networking service, client system, third-party system, or any other system or device may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of the social-networking service. As an example and not by way of limitation, a user may be an individual (human user), an entity (e.g., an enterprise, business, or third-party application), or a group (e.g., of individuals or entities) that interacts or communicates with or over the social-networking service. In particular embodiments, when a user registers for an account with the social-networking service, the social-networking service may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking service. In particular embodiments, a user node 202 may be associated with information provided by a user or information gathered by various systems, including the social-networking service. As an example and not by way of limitation, a user may provide their name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages. A user node 202 may be associated with a unique user identifier for the user in the social-networking service.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking service or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking service. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to the social-networking service. Profile pages may also be hosted on third-party websites associated with a third-party server. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. A business page such as business page 205 may comprise a user-profile page for a commerce entity. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking service a message indicating the user's action. In response to the message, the social-networking service may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking service may send a "friend request" to the second user. If the second user confirms the "friend request," the social-networking service may create an edge 206 connecting the first user's user node 202 to the second user's user node 202 in social graph 200 and store edge 206 as social-graph information in one or more data stores. In the example of FIG. 2, social graph 200 includes an edge 206 indicating a friend relation between user nodes 202 of user "Amanda" and user "Dorothy." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking service may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking service may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking service may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Across the Sea"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "Edwin" and concept node 204 for "SPOTIFY").

In particular embodiments, the social-networking service may create an edge 206 between a user node 202 and a concept node 204 in social graph 200. As an example and not by way of limitation, a user viewing a concept-profile page (such as, for example, by using a web browser or a special-purpose application hosted by the user's client system) may indicate that he or she likes the concept represented by the concept node 204 by clicking or selecting a "Like" icon, which may cause the user's client system to send to the social-networking service a message indicating the user's liking of the concept associated with the concept-profile page. In response to the message, the social-networking service may create an edge 206 between user node 202 associated with the user and concept node 204, as illustrated by "like" edge 206 between the user and concept node 204. In particular embodiments, the social-networking service may store an edge 206 in one or more data stores. In particular embodiments, an edge 206 may be automatically formed by the social-networking service in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

As shown in FIG. 2, a user "David" has a "purchased" edge between their user node and the user node for the "Burnt Brews" business. This edge may have been created in response to the purchase made as a result of the actions described in relation to FIG. 2B. The existence of this edge may indicate to the consumer-to-business messaging system 100 that the user "David" has voluntarily engaged in a business relationship with the business "Burnt Brews." The existence of this commerce edge may authorize the commerce entity "Burnt Brews" to message the user "David."

The social graph 200 may further comprise a plurality of product nodes. Product nodes may represent particular products that may be associated with a particular business. A business may provide a product catalog to the consumer-to-business service 110 and the consumer-to-business service 110 may therefore represent each of the products within the product in the social graph 200 with each product being in a distinct product node. A product node may comprise information relating to the product, such as pricing information, descriptive information, manufacturer information, availability information, and other relevant information. For example, each of the items on a menu for a restaurant may be represented within the social graph 200 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 200. The information for a product node may be manipulated by the messaging service 140 as a product object that encapsulates information regarding the referenced product.

Business Messaging

People enjoy the convenience and flexibility of online—Internet-based—transactions and interactions, including online commerce. A user may engage in an interaction with an online entity—for example, the purchase of a product or service from a commerce entity—and one or both of the parties may desire to follow up on the interaction, such as to clarify the performance of a purchased service or to suggest the purchase of related products. However, the user may wish to avoid being pestered by online entities with which it doesn't have an established relationship, such as may attempt to send unwanted promotions (i.e., "spam").

As such, a user may benefit from being tracked by a social graph data structure that represents relationships between different entities. A business portal for a messaging system to which the user subscribes may reference the social graph data structure to determine whether an online entity is allowed to contact the user through the messaging system. The business portal may safeguard the privacy of the user by limiting messaging access to the user to only those online entities with which the user has a sufficient preexisting relationship. A sufficient preexisting relationship may correspond to any relationship established prior to the receipt of a requested communication that indicates that a user is interested in engaging with the business. Examples of sufficient relationships may include having engaged in prior commerce with the entity, having recently engaged in commerce with the entity, having liked or followed the entity in a social networking service, or other forms of explicit behavior by the user in regards to the entity. In some cases, implicit connections—for example, discussing a business in a messaging conversation—may contribute to the evaluation of whether a sufficient relationship exists.

Businesses may therefore be able to communicate with and service their customers in a personal way. The may create personal conversations with customers: businesses can personally communicate with their customers on a growing platform. They may use rich, beautiful messages that combine the rich presentation of email with high-signal pushability. They may be serviced by a pushable, real-time channel empowering them to send timely messages directly to customers' phones, where they can read and take basic actions while on the go. The may send actionable messages that improve conversion with messages that people can tap and take action on without logging into another site or installing another app. The may implement a personal touch across platforms that allow them to build trust with your customers in a single conversation that's unified and personalized across web and mobile.

People may therefore be able to communicate with business like they're talking with a friend. These conversations may take place in one location, people communicating with a business in a single conversation in a messaging endpoint. People may save time by receiving important messages from businesses, including order confirmation and shipping status, without digging through their email or getting on the phone. People may take action by taking basic actions, like modifying, tracking, or returning their order, in the same conversation without navigating web links, installing more apps, or remembering passwords. People may ask questions by messaging a business with their questions—from customer support to product availability—and get quick responses like their talking with a friend.

This may provide several advantages to both customers and businesses. A person will be able to start a conversation with a business in a messaging endpoint when they complete the checkout flow on the business' site. Once the person agrees, the business can send the person order updates in the messaging endpoint, including order confirmation and shipping status. The person can also take basic actions (e.g., modify, track, or return the order) directly within the conversation. In addition, a person can ask the business free-form questions about the order or other questions (e.g., "Do you have The Cotton V in size S?") and receive quick responses from the business, again directly within the conversation. People will also be able to initiate a conversation through a customer service live chat. People can also start a thread with a business from a search field in response to a current or previous search query (e.g., from an area designated with recent search results, previously viewed pages, etc.) and/or messaging a business from a social media site. It may be appreciated that these are merely a few examples of how a person may start a conversation with a business in a messaging endpoint, and others exist as well. Embodiments are not limited in this context.

Embodiments enhance communications between people and businesses. Pages for a business are integrated in the messaging application so that all communications with a business are unified into a single conversation in Messenger, regardless of the entry point. A page may represent an identity for a business on social media and may be seamlessly integrated with a variety of social and non-social media applications and services. The messaging application provides communication tools that serve a broad range of businesses. A business is able to send rich, actionable messages to a person in real-time through a set of APIs. As a result, the embodiments herein can improve the privacy of a user while extending the utility of a messaging service for the user and for online entities such as businesses.

Figure 3A:
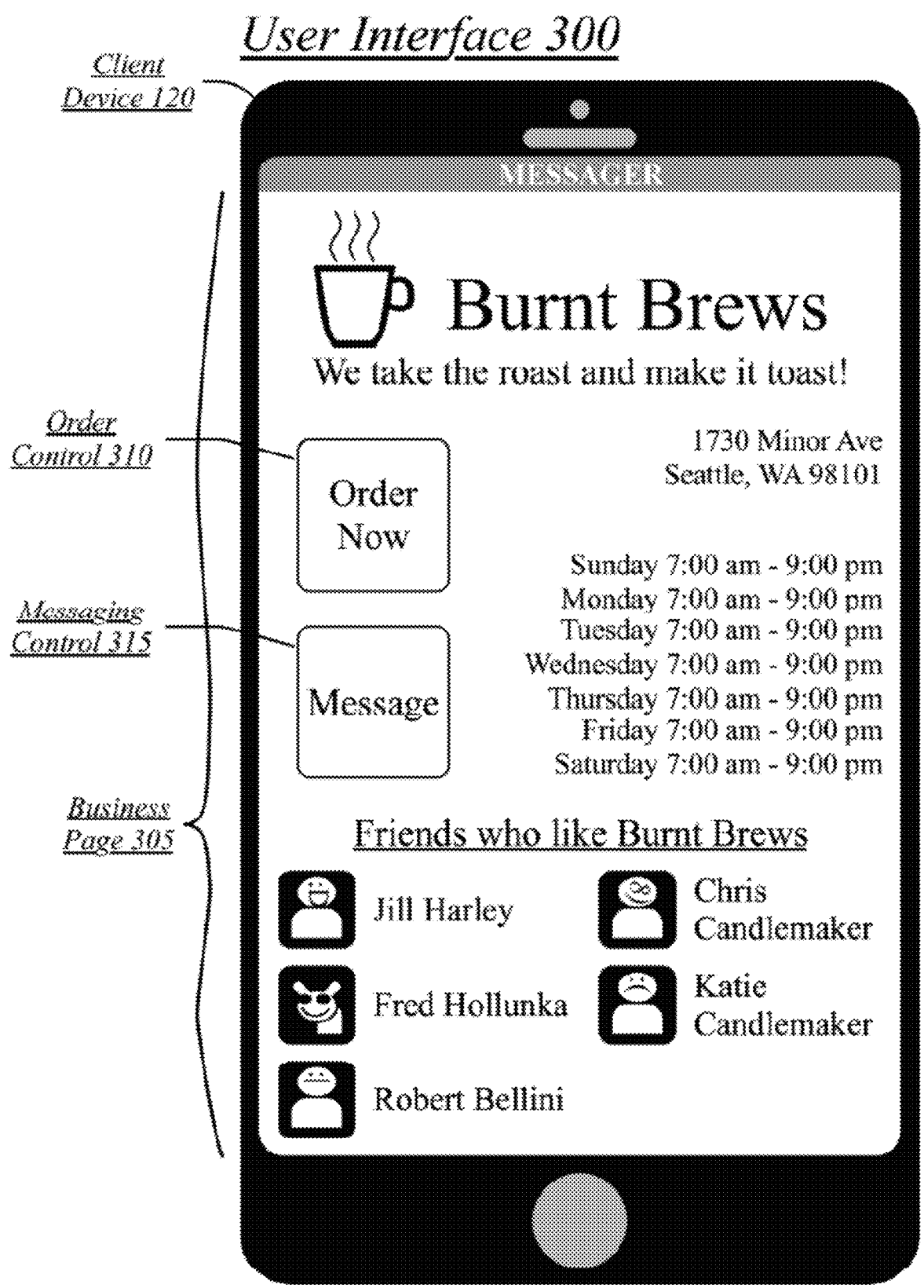
FIG. 3A illustrates an embodiment of a user interface for a messaging endpoint displaying a business page.

FIG. 3A illustrates an embodiment of a user interface 300 for a messaging endpoint 125 displaying a business page 305.

The business page 305 may display information regarding a commerce entity "Burnt Brews," an example coffee shop. The business page 305 may include information for the commerce entity, such as one or more of a physical location for the commerce entity, the operating hours of the physical location, the hours in which the commerce entity (e.g., a representative of the commerce entity) is available for messaging through the consumer-to-business messaging system 100. The business page 305 may include social-networking information for the commerce entity, such as a list of friends of a viewing user that have "liked" or "followed" the commerce entity within a social network as may be represented in a social graph.

The business page 305 may include an order control 310, the order control 310 operative to instantiate an ordering interface for ordering from the commerce entity on the client device 120.

The business page 305 may include a messaging control 315, the messaging control 315 operative to instantiate a messaging interface for messaging with the commerce entity on the client device 120.

Figure 3B:
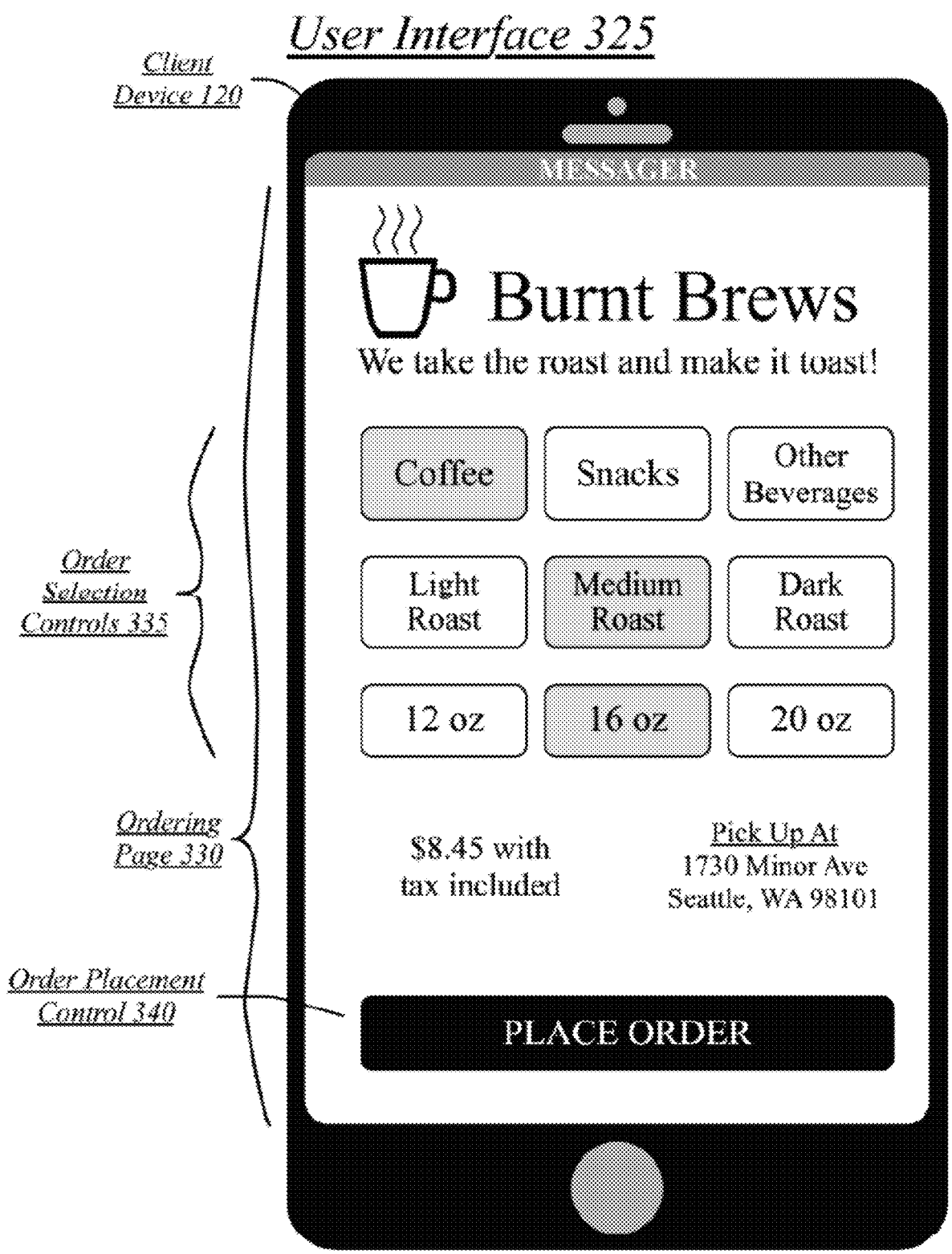
FIG. 3B illustrates an embodiment of a user interface for a messaging endpoint displaying an ordering page.

FIG. 3B illustrates an embodiment of a user interface 325 for a messaging endpoint 125 displaying an ordering page 330.

The ordering page 330 may display information and controls for configuring and submitting an order to the commerce entity. Order selection controls 335 may empower a user to select one or more products and/or service and/or options configuring a product or service. The ordering page 330 may comprise an order placement control 340 empowering the user to submit an order comprising one or more selected products, service, and/or options for the selected products and/or services.

Figure 3C:
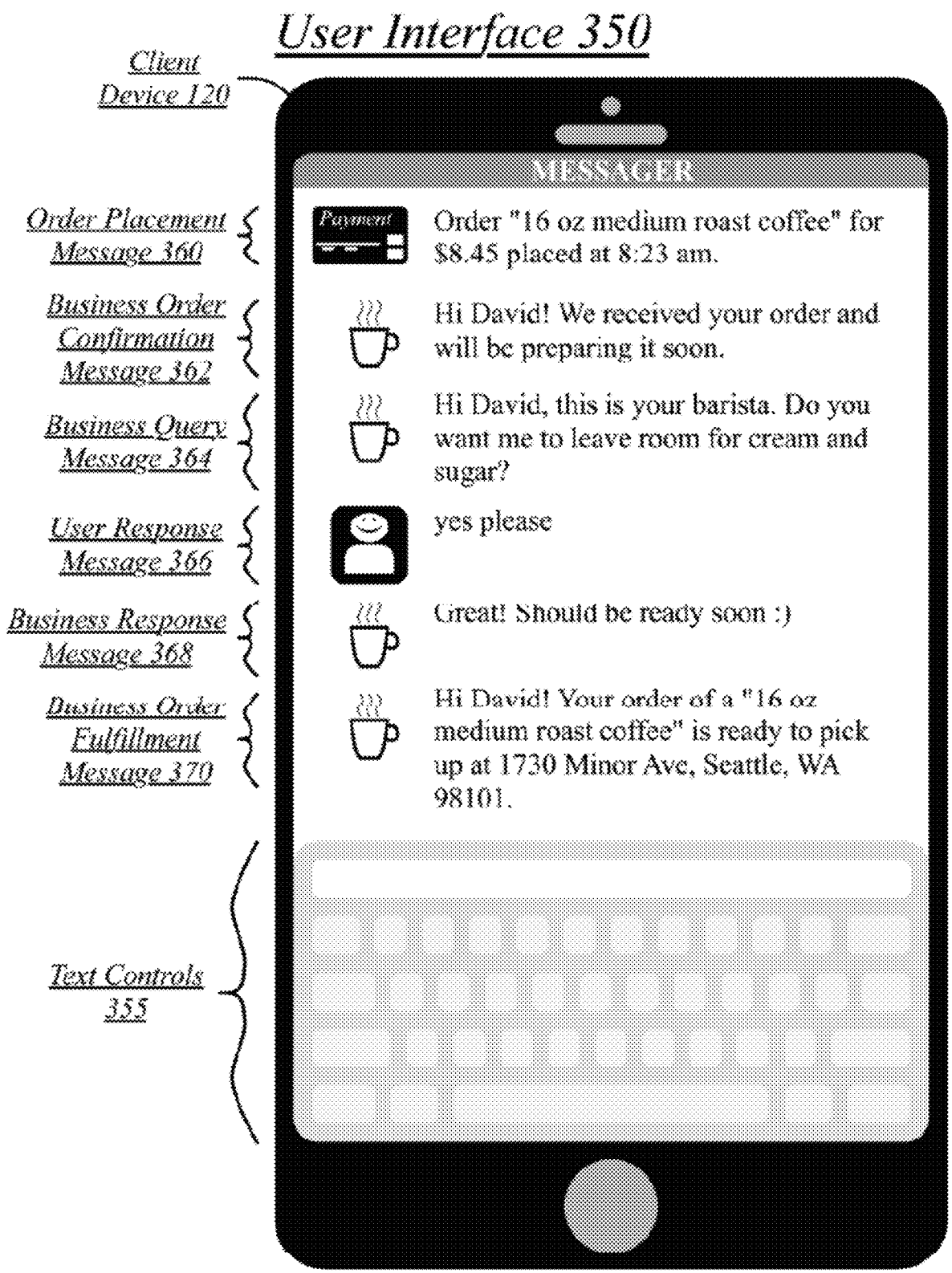
FIG. 3C illustrates an embodiment of a user interface for a messaging endpoint displaying a consumer-to-business messaging interaction.

FIG. 3C illustrates an embodiment of a user interface 350 for a messaging endpoint 125 displaying a consumer-to-business messaging interaction.

The consumer-to-business messaging interaction may include an order placement message 360, the order placement message 360 summarizing an order configured and submitted using the ordering page 330. The order placement message 360 may be an automated message generated by the consumer-to-business service 110 that summarizes the interaction from the perspective of this intermediary service. The order placement message 360 may include information provided by the consumer-to-business service 110 such as the name of the ordering user, a preferred form of address of the ordering user, and other personal details of the ordering user.

The consumer-to-business messaging interaction may include a business order confirmation message 362. The business order confirmation message 362 may be received by the consumer-to-business service 110 from the commerce front-end server 190 and have been generated by the commerce entity. The business order confirmation message 362 may correspond to an automatically-generated message generated automatically by a computing device of the commerce entity in response to the received order.

The consumer-to-business messaging interaction may include a business query message 364. The business query message 364 may comprise a query to the ordering user regarding the customization or some other query from the commerce entity for use in the delivery of the ordered product or service. The business query message 364 may comprise a manually-entered message entered by a member of the commerce entity involved in the performance of a requested order. The ability of the commerce entity to message the user once an order has been received may represent a key advantage of the consumer-to-business messaging system 100 by enabling natural, conversational dialog between the user and the commerce entity to aid in the performance of a requested order.

The consumer-to-business messaging interaction may include a user response message 366. The user response message 366 may comprise a response to the business query message 364 answering the query.

The consumer-to-business messaging interaction may include a business response message 368. The business response message 368 may comprise a human acknowledgement that the user's response has been received and will be acted on.

The consumer-to-business messaging interaction may include a business order fulfillment message 370. The business order fulfillment message 370 may comprise a notification to the user that their order has been fulfilled. Where a physical interaction (e.g., the reception of an in-person service, the reception of a physical product) has been requested the business order fulfillment message 370 may include a reminder of the physical location at which the product or service may be received. The business order fulfillment message 370 may be automatically generated in response to an indication from a member of the commerce entity that the fulfillment is ready or has been performed. This automatic generation may automatically include details such as the physical location for the reception of the product or service and a reminder of the ordered product or service.

Figure 4:
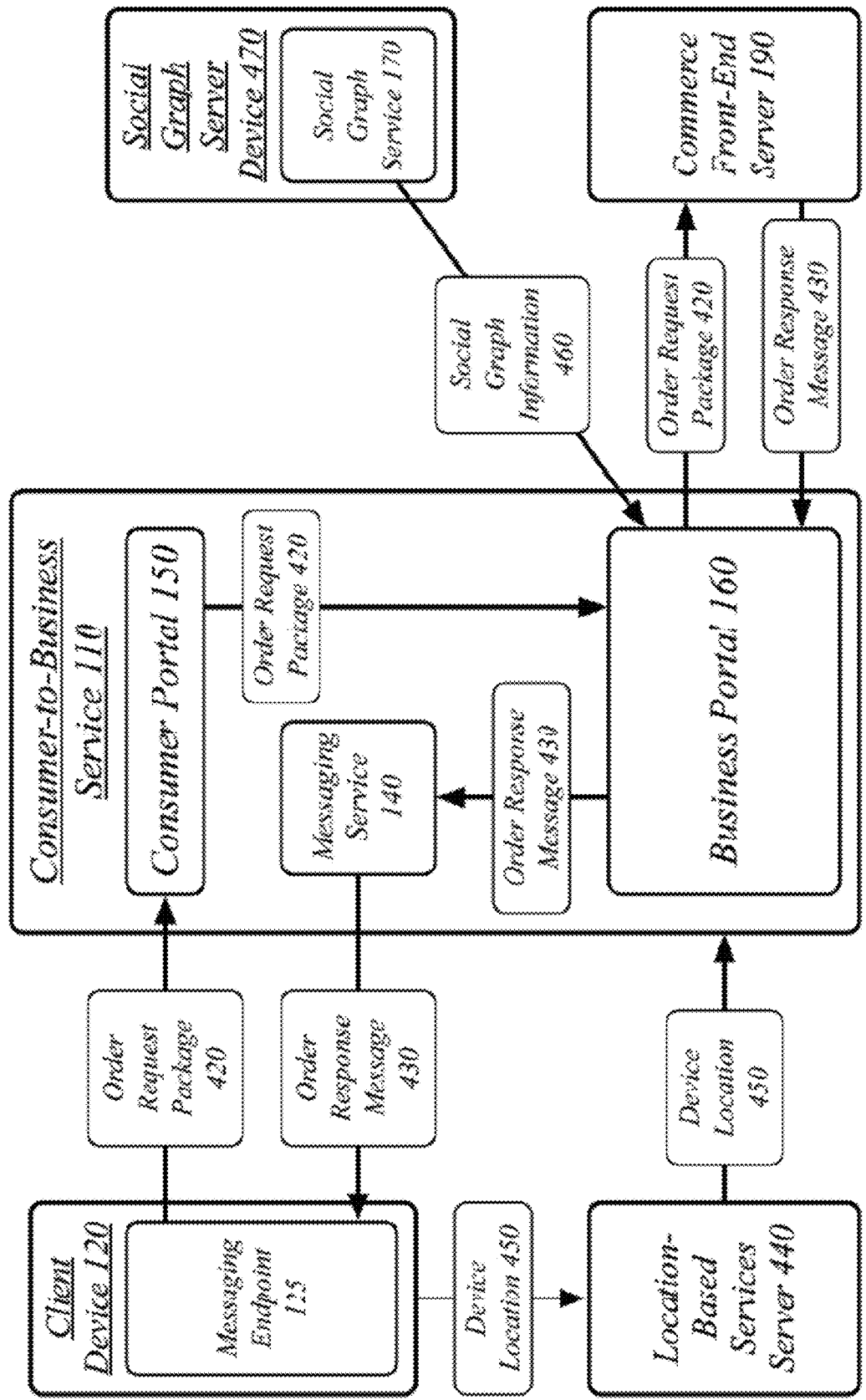
FIG. 4 illustrates an embodiment of a consumer-to-business service processing an order request.

FIG. 4 illustrates an embodiment of a consumer-to-business service 110 processing an order request.

The consumer portal 150 for the consumer-to-business service 110 may receive, at a network interface on a commerce intermediary server, an order request package 420 from a client device 120, the order request package 420 specifying a user account and a commerce account, the user account associated with a user entity in a social graph data structure, the commerce account associated with a commerce entity in the social graph data structure. The commerce intermediary server may transmit the order request package 420 to the commerce front-end server 190 for the commerce entity via a business portal. In some cases, the order request package 420 may be supplemented with information added by the consumer-to-business service 110 to further the fulfillment of the order request represented by the order request package 420.

The consumer-to-business service 110 may perform a financial transaction with a financial transaction server based on the order request package 420. A financial transaction may comprise one or more of charging a credit card associated with the user account, charging a debit card associated with the user account, debiting a credit account associated with the user account, or any other technique for performing a financial transaction. The consumer-to-business service 110 may insert a financial transaction record for the financial transaction into the order request package 420 prior to transmitting the order request package 420 to the commerce front-end server 190. In some embodiments, a default payment configuration may be used. The consumer-to-business service 110 may retrieve a default payment configuration record for the user account and perform the financial transaction using the default payment configuration record. Alternatively, the order request package 420 may comprise a payment configuration record indicating what form of financial transaction should be performed, and may also include financial transaction information (e.g., a credit card number) for use in performing the financial transaction.

An integrated messaging and payment system can provide convenience in the processing of payment transactions for the purchase of a product or service. Specifically, the integrated messaging and payment system can allow a user to perform a payment transaction with a merchant to purchase a product or service within a messaging endpoint 125. For example, the consumer-to-business messaging system 100 can allow the user to initiate a payment transaction with a merchant while communicating with the merchant via the messaging endpoint 125. Thus, the consumer-to-business messaging system 100 can enable a user to easily interact with a merchant to inquire about and/or purchase a product from the user's client device 120 (e.g., a mobile device such as a smartphone).

Additionally, an embodiment of the consumer-to-business messaging system 100 can simplify a method for processing refunds to users. For example, the consumer-to-business messaging system 100 can provide a way for merchants to issue refunds to the user via the messaging endpoint 125. Specifically, the consumer-to-business messaging system 100 can allow a user to request a refund from a merchant from within the messaging endpoint 125 by associating a messaging thread between the user and the merchant with a transaction identifier tied to a payment transaction between the user and the merchant. Thus, the merchant can issue a refund to a user without requiring the user to give the merchant sensitive information (e.g., a card number) in a phone call or in person.

According to one or more embodiments, the consumer-to-business messaging system 100 can also allow users to pay merchants via a variety of payment methods. In particular, the consumer-to-business messaging system 100 can allow users to register a plurality of payment credentials with the system for use in payment transactions with merchants. For example, the consumer-to-business messaging system 100 can allow a user to select one or more of a plurality of registered payment credentials to pay for a product from a merchant using the messaging endpoint 125. Additionally, the consumer-to-business messaging system 100 also may allow merchants to provide a plurality of different payment options to the user based on the preferences or requirements of the merchants. Thus, the consumer-to-business messaging system 100 can provide versatility of payment methods in electronic payment transactions between users and merchants.

Furthermore, the system can allow a consumer to make a pay a merchant for a product or service without having to provide sensitive financial information (e.g., credit card number, checking account number) to the merchant. Thus, the consumer-to-business messaging system 100 can provide increased security for the user. In particular, the user can avoid any fears of fraud when visiting a new merchant.

The consumer-to-business messaging system 100 can also increase security for the merchant. In particular, the consumer-to-business messaging system 100 can perform risk checks based on information maintained about the consumer by a social networking system. The consumer-to-business messaging system 100 can deny a payment if the consumer is a known fraudster or if the payment appears fraudulent based on information about the consumer or the merchant maintained by the system.

In addition allowing the users to exchange electronic communications, the consumer-to-business messaging system 100 can allow the users to send and receive monetary payments to and from one another. In one or more embodiments, the consumer-to-business messaging system 100 allows users to define and send a payment message to a merchant user. For instance, the consumer-to-business messaging system 100 can allow the user to send a payment to a business via the messaging service 140. Likewise, the business can receive notice of the payment, and accept or decline the payment. The business can communicate with the consumer-to-business messaging system 100 to coordinate a transaction that facilitates the payment between the users (i.e., their accounts).

In one or more embodiments, for example, the consumer-to-business messaging system 100 can communicate with a payment network to authorize and process a transaction. For example, the consumer-to-business messaging system 100 can send a transaction to a payment gateway system. Once the payment gateway system receives the transaction, the payment gateway system can send the transaction to the processor (e.g., a payment processing system) used by a payment merchant user's acquiring bank. Based on the method of the payment (e.g., consumer user's account), the payment processing system can transmit the transaction to an appropriate card network system. In many instances, the card network system then sends the transaction to an issuing bank system.

The issuing bank system either approves or declines the transaction, and sends the decision back to a card network system. The card network then sends the decision to the payment processing system. The payment processing system can then forward the decision to the payment gateway system, and in one or more embodiments, the payment gateway system can maintain the details related to the transaction and the decision. The payment processing system also sends the decision to the consumer-to-business messaging system 100.

In addition to authorizing a transaction, the payment network can also perform settlement tasks. For example, the consumer-to-business messaging system 100 can coordinate with the payment gateway system to submit a daily settlement batch including one or more captured transactions to an acquiring bank via the acquiring bank's preferred payment processing system. The payment processing system then sends the settlement batch to a server of the acquiring bank, which records a deposit in the amount of each transaction within the settlement batch to an account associated with the merchant.

The acquiring bank can then send a funding request in satisfaction of the deposit amount to the payment processing system, which passes the funding request to the appropriate card network system. The card network system then sends the funding request to the issuing bank system. The issuing bank system can post the transaction to the consumer user's account and pass a release of the funds to the card network system, which are then passed to the payment processing system, and then the acquiring bank.

A social graph data structure component on the commerce intermediary server may be generally arranged to create a commerce edge in the social graph data structure between the user entity and the commerce entity in response to the commerce intermediary server receiving the order request package 420 from the client device 120, the commerce edge associated with the order request package 420.

A messaging server operating as part of the messaging service 140 may receive, such as via the business portal 160, a message package comprising an order response message 430, the message package addressed to the user account, the message package received from the commerce front-end server 190. The messaging server may determine that the commerce front-end server 190 is authorized to message the user account based on the commerce edge in the social graph data structure between the user entity and the commerce entity.

The messaging server may transmit the message package to the client device 120 based on the determination that the commerce front-end server 190 is authorized to message the user account based on the commerce edge in the social graph data structure between the user entity and the commerce entity. In some embodiments, the message package may be received at the messaging server from the commerce front-end server 190 via the commerce intermediary server as the commerce front-end server 190 may be required to use the business portal 160 to access the messaging system so that the business portal 160 can perform access control based on social graph information 460 indicating whether a sufficient relationship exists between the user account and the commerce entity to authorize the commerce entity to message the user.

In some cases, the message package may comprise an order fulfillment package in response to the order request package 420. An order fulfillment package may comprise an online fulfillment notification indicating that an online service contracted by the order request package 420 has been fulfilled. An order fulfillment package may comprise an in-person fulfillment notification indicating that at least one of an in-person service or an in-person product contracted by the order request package 420 is ready for receipt at a particular location. An order fulfillment package may comprise a machine-readable optical label, the machine readable optical label encoding an order identifier assigned to the order request represented by the order request package 420. The machine readable optical label may be displayed by the user on their client device 120 at the physical location at which a product or service will be fulfilled in order to identify themselves as the proper recipient of the product or service.

In some cases, a particular location of a commerce entity from a plurality of locations (e.g., franchise locations) may be selected based on the location of the client device 120. In some cases, an order request may be customized based on a location of the client device 120. The consumer-to-business service 110 may receiving a geographic location of the client device 120 and select automatically at least one of the one or more product options based on the received geographic location. A device location 450 may be transmitted via a location-based services server 440.

A commerce edge existing between the user entity and the commerce entity in the social graph data structure may be used to authorize the commerce entity in transmitting promotions (e.g., notices of sales) to the user. The consumer-to-business service 110 may receive a promotion package from the commerce intermediary server 190, the promotion package defining one or more user selection attributes. The consumer-to-business service 110 may select the user account based on the user selection attributes. The consumer-to-business service 110 may authorize the transmission of the promotion package to the user account based on commerce edge in the social graph data structure between the user entity and the commerce entity. The consumer-to-business service 110 may message the user account with the promotion package based on the authorizing of the transmission of the promotion package.

An order response message 430 may include actionable elements. An actionable element may include one or more controls providing access to one or more of modifying an order, tracking an order, and returning an order. Some of these actionable elements may be automatically performed, such as providing controls that initiate automated actions. For example, a tracking control may prompt the automatic return of tracking information. Tracking information may be returned within the flow of a messaging conversation and displayed as simply another entry in the back-and-forth flow of the messaging conversation.

It will be appreciated that, in some cases, the user may initiate messaging with the business. For example, they may select a message control on a business page or social-networking page for the commerce entity. The user may initiate messaging in order to, for example, ask questions regarding products or services prior to initiating an order.

Figure 5:
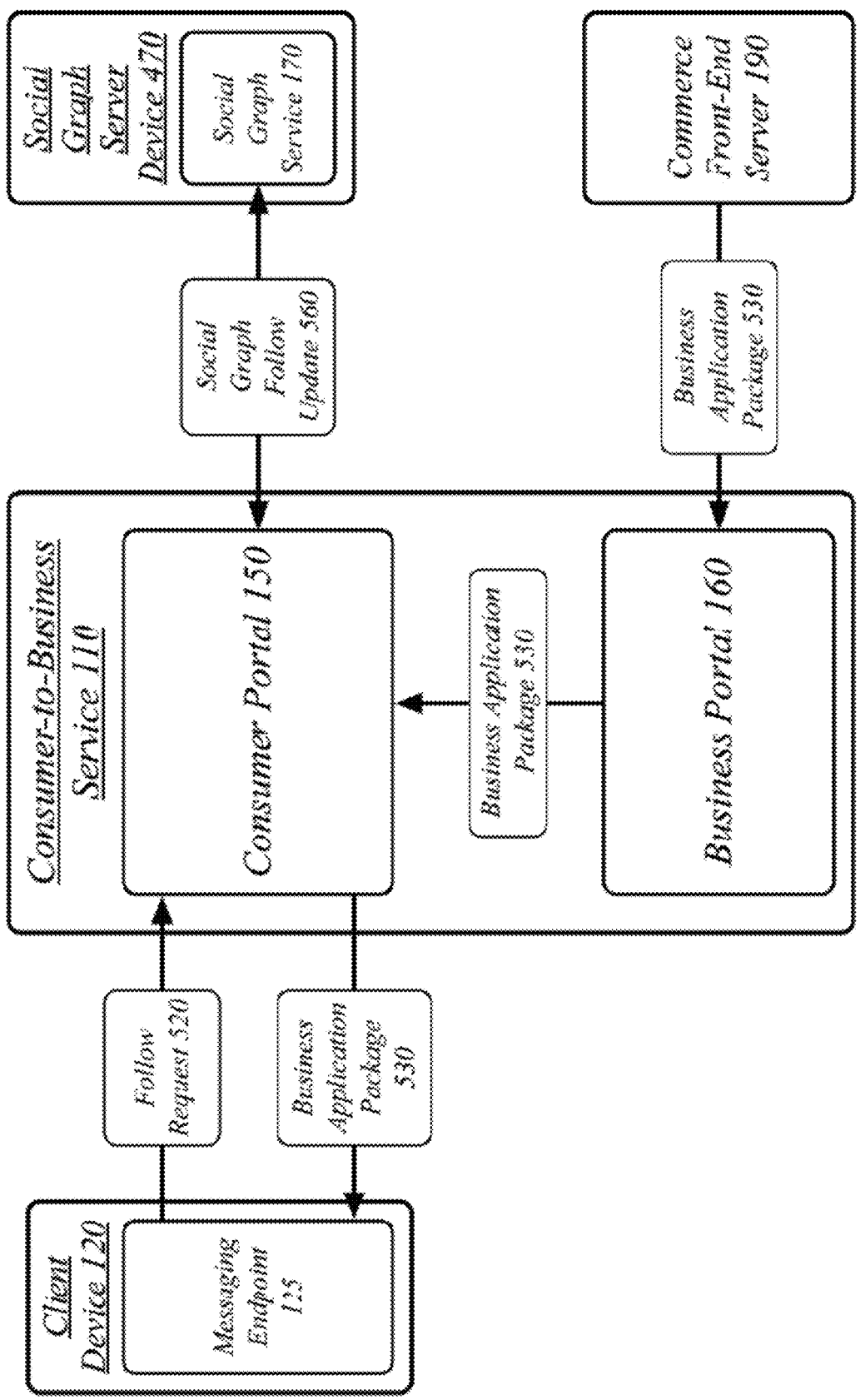
FIG. 5 illustrates an embodiment of a consumer-to-business service processing a follow request.

FIG. 5 illustrates an embodiment of a consumer-to-business service 110 processing a follow request 520.

In some cases a user may find a commerce entity in social networking service 170, such as through searching a social-networking service. The user may find the commerce entity by searching local businesses, searching recommended businesses, searching for the business using keywords or the name of the business, or according to any other technique for business discovery. The user may elect to "follow" the commerce entity in the social networking service 170.

Displaying the business page 305 and/or the ordering page 330 may involve accessing data from a business application package 530, the business application package 530 defining one or more of contact information for the business, product information for the business (e.g., a product listing, product options), service information for the business (e.g., a service listing, service options), and other information related to the business and interaction with the business. The business application package may define an order request format and order request options for a order request package 420. Product information for the business may include prices for the products. Service information for the business may include prices for the services.

The business application package 530 may comprise one or more of address information associated with the commerce entity, contact information associated with the commerce entity, and a product manifest associated with the commerce entity. The business application package 530 may comprise a product manifest associated with the commerce entity, the product manifest comprising a plurality of products, wherein each of the products is associated with a price, wherein one or more of the plurality of products is associated with one or more product options.

The consumer-to-business service 110 may transmit a business application package 530 to the client device 120. The business application package 530 may be transmitted to the client device 120 in response to a follow request 520 received from the client device 120. The consumer-to-business service 110 may receive a page follow request 520 for the user account, create a following edge in the social graph data structure between the user entity and the commerce entity in the social graph data structure in response to the received page follow request 520, and transmit the business application package 530 to the client device 120 based on the page follow request 520.

In some cases, a business may be promoted to a user based on the physical proximity of the business. For example, a user searching for a coffee shop may be suggested a nearby coffee shop. The consumer-to-business service 110 may receive a geographic location for the client device 120 from the client device 120 at a location-based services server 440 and transmit the business application package 530 to the client device 120 based on the geographic location corresponding to the commerce entity.

In some cases, a commerce entity may be promoted to a user based on predicted interest by the user in the commerce entity, as may be determined based on pattern matching to other users who have engaged in business with the commerce entity. The consumer-to-business service 110 may perform a commerce affinity analysis for the commerce entity based on the social graph data structure and transmit the business application package 530 to the client device 120 based on the commerce affinity analysis predicting a commerce affinity between the user entity and the commerce entity. The commerce affinity analysis may comprise one or more explicit affinity symbols in the social graph data structure and one or more implicit affinity symbols in the social graph data structure.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 6 illustrates one embodiment of a first logic flow 600. The logic flow 600 may be representative of some or all of the operations executed by one or more embodiments described herein.

In the illustrated embodiment shown in FIG. 6, the logic flow 600 may receive, at a network interface on a commerce intermediary server, an order request package from a client device, the order request specifying a user account and a commerce account, the user account associated with a user entity in a social graph data structure, the commerce account associated with a commerce entity in the social graph data structure at block 602.

The logic flow 600 may transmit the order request package to a commerce front-end server associated with the commerce entity at block 604.

The logic flow 600 may create a commerce edge in the social graph data structure between the user entity and the commerce entity in response to receiving the order request package from the client device, the commerce edge associated with the order request package at block 606.

The embodiments are not limited to this example.

Automatically-Determined Form Responses

Administrators of a page for a business may receive and be responsible for responding to similar messages repeatedly. For example, queries as to the hours of a business, return policy, business location, or other common topics may be received many times from potential and existing customers. Administrators may therefore benefit from recording their responses and/or generating form responses and using these responses to respond to repeated similar questions. This may save the administrators time and, by allowing administrators to spend more of their time on novel or unusual queries or comments, improve the overall quality of responses sent out by a business.

In some cases, administrators may benefit simply from having a catalog of pre-prepared responses available to choose from when crafting a reply. However, even more beneficial may be having a messaging service propose one or more of the pre-prepared responses that it has determined may be appropriate for replying to a particular user message. A natural language processor may analyze the pre-prepared responses and determine an intent associated with each of them, this intent reflecting what the natural language processor has determined as the goal of communicating each of the pre-prepared responses. When a user submits a message to a business, the message may be provided to the natural language processor and an intent of the message may be identified, this intent reflecting what the natural language processor has determined as the goal of messaging the business with that message. The inferred intent of the message may be matched against the inferred intents of the pre-prepared responses to determine whether one of the pre-prepared responses matches the intent of the message. The messaging service may then present any matching responses—or the response which best matches—to the administrator and offer them the opportunity to use the pre-prepared response to reply to the user's message. As a result, the embodiments disclosed herein may increase the utility of generating pre-prepared responses, reduce the time involved in using one, and thereby increase the response speed, response quality, and overall efficiency of a business using the messaging service.

Figure 7:
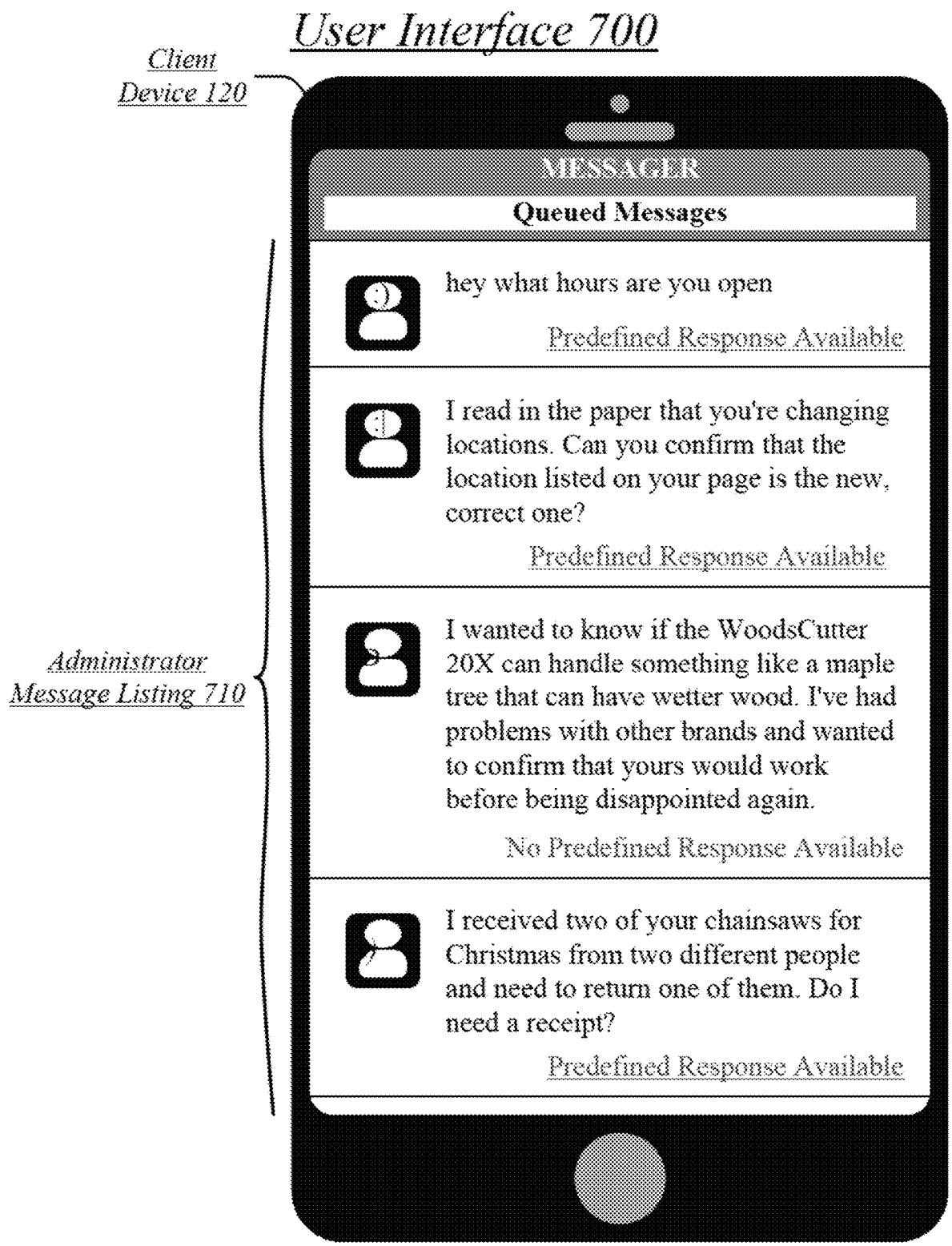
FIG. 7 illustrates an embodiment of a user interface for an administrator messaging endpoint displaying a series of received messages.

FIG. 7 illustrates an embodiment of a user interface 700 for an administrator messaging endpoint 125 displaying a series of received messages. The user interface 700 may comprise an administrator view of the messages that have been assigned to them for replying to.

An administrator message listing 710 may include a plurality of messages received by the page for a business. The use of a natural language processor may identify a predefined response message for some of the plurality of messages. The user messages for which a predefined response messages is determined may be displayed in association with a administrator control empowering the administrator to view the predefined response message. An administrator viewing a predefined response message may be empowered to customize the response message, send the response message, or instead decline to send the predefined response message. In some embodiments, whether the administrator uses a suggested predefined response message may be used to refine the suggestion of response messages, indicating to the natural language processor that its criteria for analyzing messages is accurate when the predefined response message is used and indicating to the natural language processor that is criteria for analyzing messages are not entirely accurate when the predefined response message is not used.

The user messages for which there is no matching predefined response message may be displayed in association with a notification to the administrator that no predefined response message is available. Alternatively, in some embodiments the user messages for which there is no matching predefined response message may simply be displayed without the administrator control empowering the administrator to view the predefined response message, thereby implicitly communicating that no predefined response message is available. Where no predefined response message is available, or where a predefined response message is rejected by the administrator, the administrator's actual response message may optionally be added to the list of predefined response messages, such as by querying the administrator as to whether their response should be added or by allowing the administrator to check a box or other control when composing or sending a response that marks the response for inclusion in the set of predefined response messages.

Figure 8:
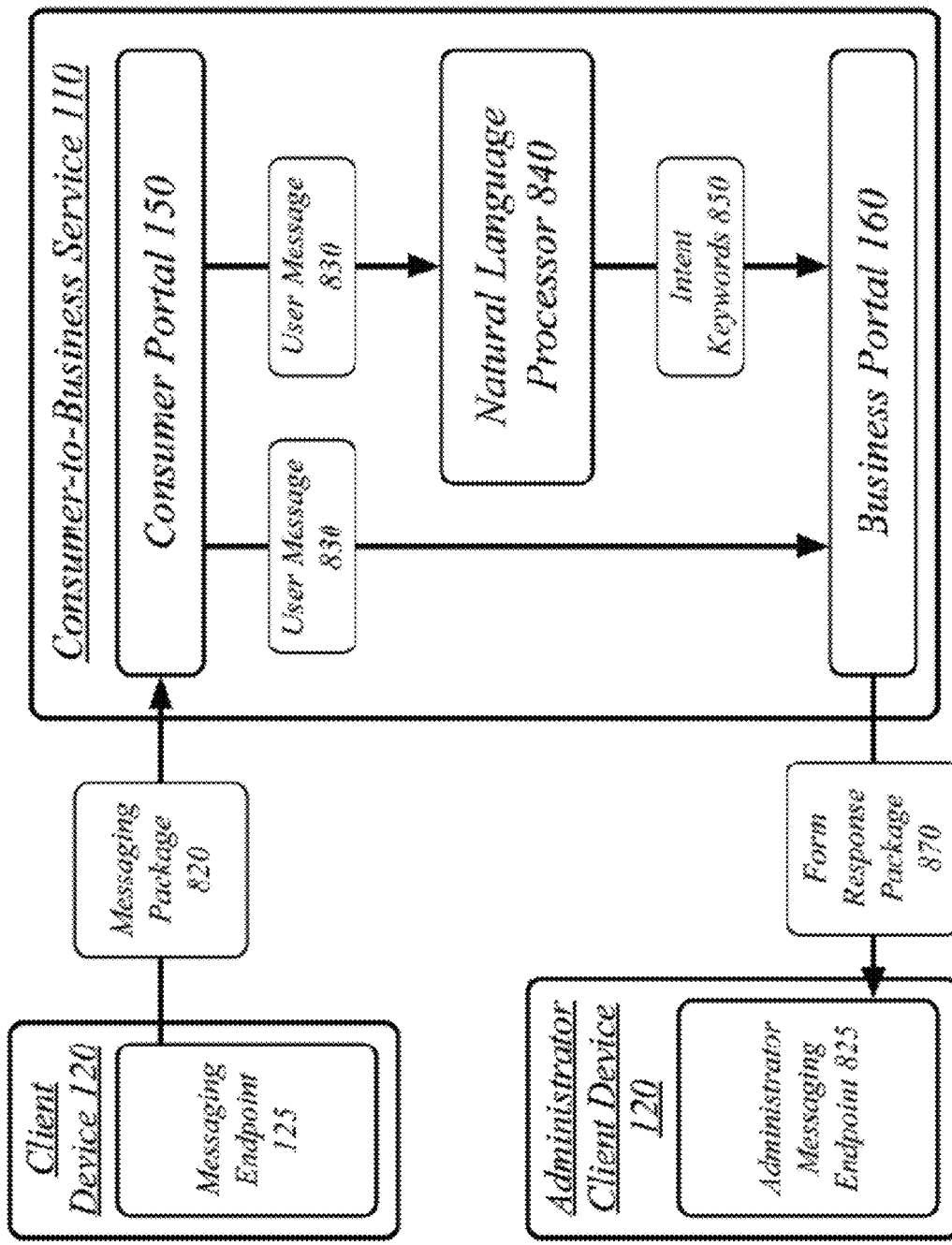
FIG. 8 illustrates an embodiment of a consumer-to-business service generating an automated response.

FIG. 8 illustrates an embodiment of a consumer-to-business service 110 generating an automated response.

The consumer portal 150 may receive, using a network interface for a commerce intermediary server, a messaging package 820 from a messaging endpoint 125 at a messaging service 140. The messaging package 820 may comprise a user message 830 from the user of the client device 120 directed to a business entity as identified by a business page for the business entity with the social networking service 170. The message may form a query, request, or directive to the business, such as regarding the products and services of the business.

The consumer portal 150 may perform a natural language processing of the messaging package 820 using a natural language processor 840. The natural language processor 840 may operate according to any of the known techniques for natural language processing. The consumer portal 150 may determine a response message predicted to correspond to the messaging package 820 by submitting a user message 830 extracted from the messaging package 820 to the natural language processor 840 and receiving natural language recognition information from the natural language processor 840 that the consumer-to-business service 110 may use to identify an appropriate response message.

Performing the natural language processing may comprise submitting at least a portion of the messaging package 820 to a natural language processor 840. The natural language processor 820 may be trained based on a messaging interaction history for the messaging service 140. This messaging interaction history may comprise a history of messaging interactions—user messages and responses from administrators—that provide examples of appropriate responses to empower the natural language processor 840 to learn to derive the intent of user messages and administrator response messages.

The business portal 160 may receive one or more messaging intent keywords 850 from the natural language processor 840. A messaging intent keyword may encapsulate in a word or short phrase the intent of a user message and/or response message. For example, a user message with the text, "How late are you open?" may correspond to a messaging intent keyword of "operating hours." A response message may have the text "Happy Times Laser Tag is open % business_hours %," where "% business_hours %" is a dynamic field instructing the consumer-to-business service 110 to write the operating hours of the business in place of the dynamic field. This response message may also correspond to the messaging intent keyword "operating hours." As such, the natural language processor 840 determining one or more intent keywords 850 may empower the business portal 160 to determine which response message is appropriate to responding to a particular user message. The business portal 160 may therefore retrieve the response message from a response message repository based on the one or more messaging intent keywords 850.

The messaging interaction history may be provided by submitting a plurality of response messages to the natural language processor 840, the plurality of response messages comprising at least a portion—such as an initially-configured portion—of a response message repository configured by the administrators of the business page for the business entity. The business portal 160 may receive an intent keyword mapping from the natural language processor 840 in response to submitting the plurality of response messages to the natural language processor 840, the intent keyword mapping defining associations between the plurality of response messages and a plurality of intent keywords. The business portal 160 may store the defined associations between the plurality of response messages and the plurality of intent keywords in the response message repository to empower the business portal 160 to identify the appropriate response message for a particular user message.

The consumer-to-business service 110 may add administrator messages that are not existing response messages to learn additional response messages. The business portal 160 may receive a responding messaging package from the administrator messaging endpoint 825 and determine that the responding messaging package is not based on the response message sent to the administrator messaging endpoint 825 in the form response package 870. The business portal 160 may extract an administrator-specified response message from the responding messaging package, extract a user message 830 from the messaging package 820, and submit the user message 830 and the administrator-specified response message to the natural language processor 840. The business portal 60 may receive an additional keyword mapping from the natural language processor 840, the additional keyword mapping defining an association between the administrator-specified response message and one or more additional intent keyword. The business portal 160 may therefore store the administrator-specified response message in the response message repository and store the association between the administrator-specified response message and the one or more additional intent keywords in the response message repository, thereby learning the administrator-specified response for potential future use. In some embodiments, this analysis and storage of the administrator-specified response message for future use may only be performed when it is indicated that it is to be done by the administrator.

The administrator making use of the proposed response message may signal that the one or more intent keywords assigned to the user message 830 and response message were accurately assigned. The administrator not making use of the proposed response message may signal that the one or more intent keywords assigned to the user message 830 and/or response message were not accurately assigned. As such, the business portal 160 may receive a responding messaging package from the administrator messaging endpoint 825, determine whether the responding messaging package uses the response message, and train the natural language processor based on whether the responding messaging package uses the response message.

The business portal 160 may determine an administrator account assigned to respond to the messaging package 820. The administrator account may be identified as one of one or more administrator accounts associated with the business entity to which the use of the client device 120 has directed their message. The business portal 160 may construct a form response package 870 for delivery to an administrator messaging endpoint 825 on an administrator client device 120 associated with the administrator account for the assigned administrator. The business portal 160 may transmit the form response package to the administrator messaging endpoint 825 for the administrator account, the form response package 870 comprising the response message. The administrator messaging endpoint 825 may comprise an instantiation of the same program as the messaging endpoint 125 or may comprise a distinct software program.

The form response package 870 may be operative to configure the administrator messaging endpoint 825 to respond to the messaging package 820 via the messaging service 140 with the response message. The form response package 870 may be sent as part of or in combination with the user message from the messaging package 820. The form response package 870 may instruct the administrator messaging endpoint 825 to display a control in association with the user message notifying the administrator of the availability of the response message and empowering the administrator to view, edit, and/or send the response message as a response to the user message. The user message and the proposed response message may be sent together, with the proposed response message an addition to the delivery of the user message to the administrator for reply by the administrator. The administrator messaging endpoint 825 may be operative to display an option to transmit the response message to the originating user's messaging endpoint 125.

The user of the administrator messaging endpoint 825 may transmit a responding messaging package to the messaging service 140. The business portal 160 may receive a responding messaging package from the administrator messaging endpoint 825, the responding messaging package comprising the response message. The messaging service 140 may then transmit the response message to the messaging endpoint 125 on the client device 120 based on the response message being received from the administrator messaging endpoint 825.

The response message may comprise one more dynamic fields, wherein a dynamic field corresponds to a field that can take on a plurality of assignments based on the context of the messaging user and the receiving business entity. A dynamic field may be used to customize a response message to a user, such as by including their preferred name or other personalization information. A dynamic field may be used to customize a response message to current information about the business entity, such as hours of operation, location, or other details. By using a dynamic field instead of hardcoding in operating hours, location, or other details, those details may be modified in a single registry of business information rather than modifying every instance in which they may appear in pre-prepared response messages. The messaging service 140 may retrieve user account information associated with the messaging endpoint 125 for the user, such as from a user account for the user with the social networking service 170, and assign one or more values to at least one of the one or more dynamic fields based on the user account information retrieved. In some cases, one or more dynamic fields may be assigned a product object, such as where a user message corresponds to a query or request regarding a particular product.

In some cases, the natural language processing of the messaging package 820 may determine one or more intent keywords 850 and, further, one or more parameters. The parameters may define details of a user's requested intent. For example, where a user's intent is to make a reservation at a restaurant (the restaurant the business entity being message), the parameters may define a desired reservation time and a number of people for which the reservation should be made. Where a user's intent is to order a product, the parameters may define the product to be ordered. The embodiments are not limited to these examples. The business portal 160 may therefore configure an automated commerce interaction based on the one or more intent keywords and the one or more parameters and interoperate with the business entity to carry out the automated commerce interaction. In some cases, the automated commerce interaction may comprise a reservation or purchase. In some cases, the business portal 160 may determine a product object from a product catalog based on at least one the one or more intent keywords and the one or more parameters, the automated commerce interaction incorporating the product object.

In some embodiments, the natural language processor 840 may return a confidence associated with each of the intent keywords 850. The business portal 160 may use a threshold to evaluate the intent keywords associated with messages by the natural language processor 840. The business portal 160 may only associate a response message with an intent keyword in the response message repository where the natural language processor 840 assigns the intent keyword a confidence at least equal to the threshold. The business portal may only transmit an associated response message to the administrator messaging endpoint 825 when its associated intent keyword was assigned a confidence of at least the threshold in association with its match to the user message. In some embodiments, a first threshold may be used for storing intent keywords in association with a response message and a second threshold may be used for determining whether to propose a response message to an administrator. In some embodiments, every response message with an associated intent keyword with a confidence at least meeting the threshold may be sent to the administrator, and in others only the response message with an associated intent keyword with the highest confidence of those received may be sent to the administrator. In some embodiments, an automated-reply threshold may be used, in which, if the response message is identified based on an intent keyword meeting the automated-reply threshold, the response message is automatically sent without requiring administrator review or approval. In some cases, a response message may be flagged as not being subject to automatic-sending, such as for business tasks (e.g., agreeing to a custom job, confirming special orders) that the administrator for the business identifies as being too important to allow automatic approval.

FIG. 9 illustrates one embodiment of a second logic flow 900. The logic flow 900 may be representative of some or all of the operations executed by one or more embodiments described herein.

In the illustrated embodiment shown in FIG. 9, the logic flow 900 may receive a messaging package from a messaging endpoint at a messaging service at block 902.

The logic flow 900 may perform a natural language processing of the messaging package to determine a response message predicted to correspond to the messaging package at block 904.

The logic flow 900 may determine an administrator account assigned to respond to the messaging package at block 906.

The logic flow 900 may transmit a form response package to an administrator messaging endpoint for the administrator account, the form response package comprising the response message block 908.

The embodiments are not limited to this example.

Commerce Recommendations

People may engage in messaging conversations with each other using a messaging service that stores and forwards messages between messaging endpoints. People may also engage in messaging conversations with businesses and may receive product recommendations from businesses using a messaging service. In any of these conversations specific products or types of products may be mentioned.

One person may comment to another that they're interested in purchasing a particular product or service or are looking at the available products within a category of products or services. For example, a user may mention that they're looking to purchase a new mobile phone, are looking to try a new Thai restaurant, or some other conversational mention of a product or service. Similarly, a user may message with a business regarding available products or services.

A messaging user may benefit from being reminded of their interest in a product or service when they are in a context that would make procurement of that product or service convenient. For example, a user considering purchasing an article of clothing may be convenience by being notified that the article of clothing—or a similar article—is available at a nearby store. They may particular benefit if the suggested article is, for example, on sale.

As such, a user may benefit from having a messaging service monitor their messaging conversations with individuals, groups, and businesses to determine their messaging affinity for various products, services, types of products, and types of services. The user may benefit from having this messaging affinity combined with their current context to receive timely recommendations as to products and services. They may particular benefit from receiving these recommendations on a mobile device that they carry with them, so that they may immediately or promptly act on recommendations. As a result, a user may have an improved shopping experience that is enhanced by merely engaging in their normal behavior of conversing with their friends and with businesses.

Figure 10A:
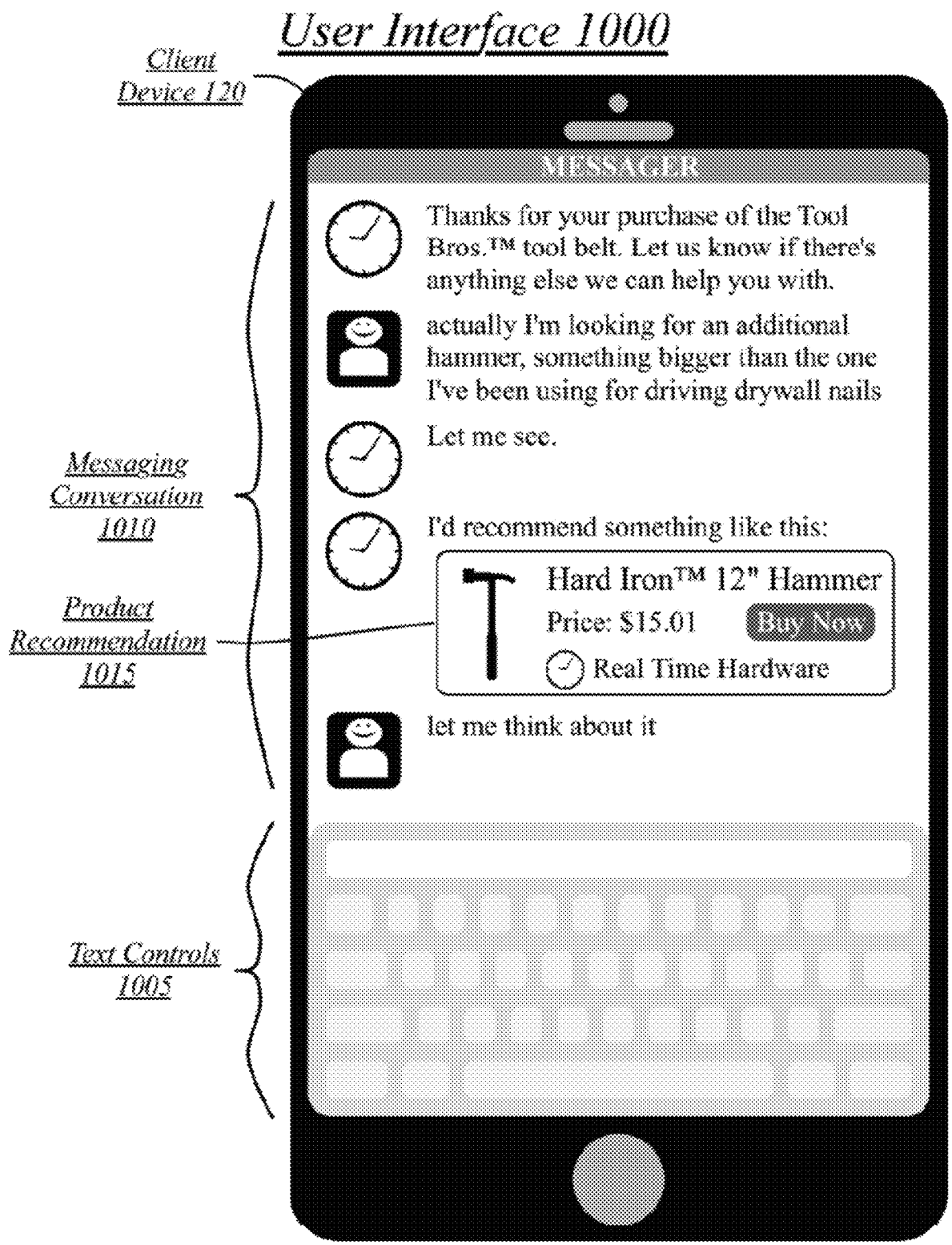
FIG. 10A illustrates an embodiment of a user interface for a messaging endpoint displaying a messaging conversation.

FIG. 10A illustrates an embodiment of a user interface 1000 for a messaging endpoint 125 displaying a messaging conversation 1010.

The user interface 1000 may include text control 1005 empowering the user to enter text for inclusion in the messaging conversation 1010. The user of client device 120 and the messaging endpoint 125 may use text controls 1005 to enter textual elements of the message conversation 1010, such as text messages for transmission to the second user on a second client device. It will be appreciated that while the text controls 1005 and other controls of the messaging endpoint 125 are depicted as touch-controls on a touch screen that other controls, including a hardware keyboard and hardware pointer control, may be used with other embodiments.

The messaging conversation 1010 may represent an interaction between a user and a representative for a business. In this messaging conversation 1010 the business has thanked a user for a previous purchase, which has prompted a conversation with the business representative as to products that might fulfill a need by the user. In this case, the business representative has mentioned a particular product via a product recommendation 1015. In this case the product recommendation 1015 is an actionable product recommendation element that, when selected, may display additional information about the product. However, in some cases the product recommendation 1015 may comprise a plain-text name or description of the product, such as may be more likely to be used in a person-to-person conversation. As shown in FIG. 10A, the user has decided not to act on the product recommendation 1015 at the time of the messaging conversation 1010.

It will be appreciated that while the illustrated embodiment illustrates an example in which the product recommendation 1015 for a product is generated by a conversation with a representative of a business, that product recommendations and product references may be detected within user-to-user conversations that do include businesses or their representatives (other than may be involved in the providing of the consumer-to-business messaging system 100 and/or messaging service 140).

Figure 10B:
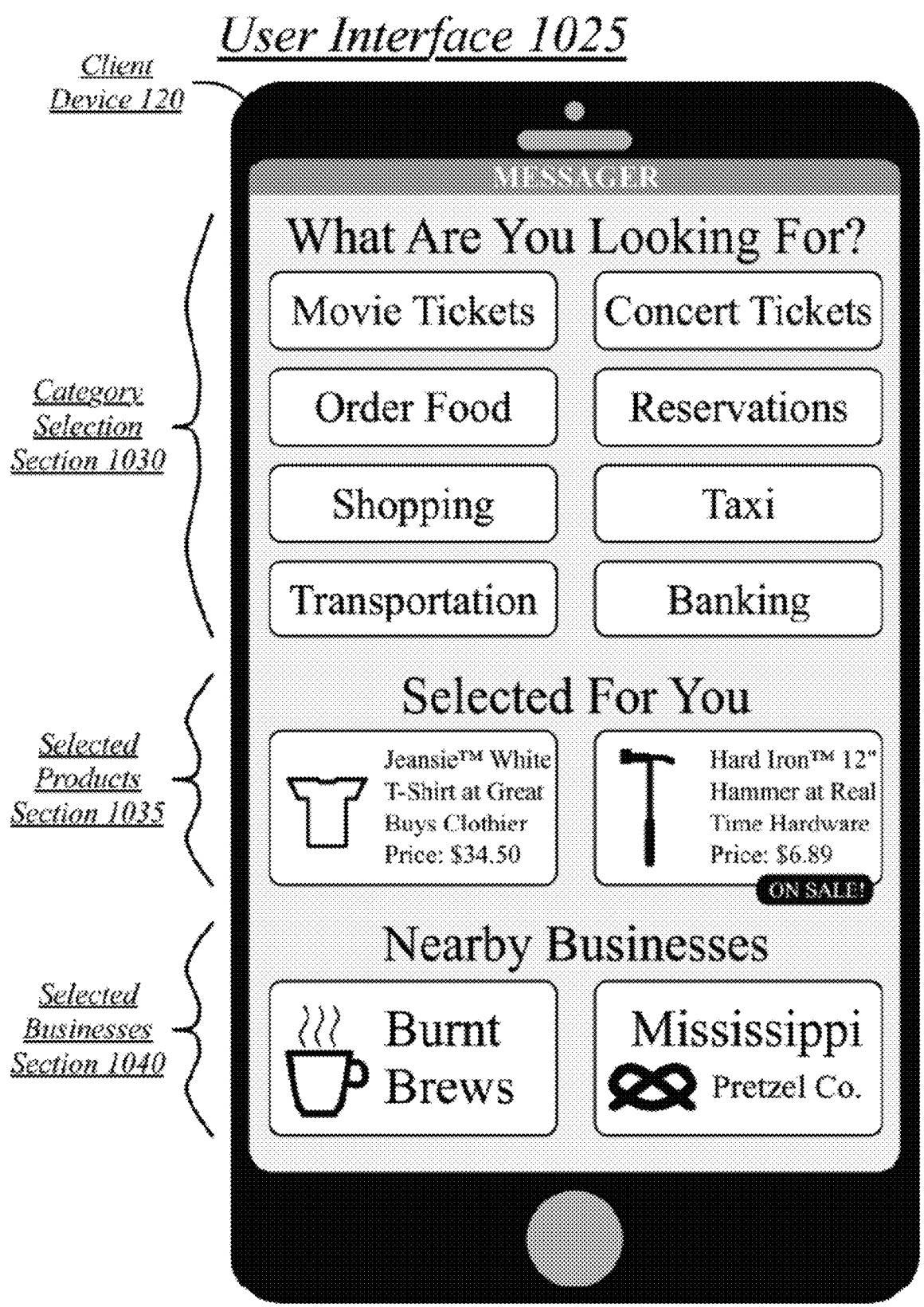
FIG. 10B illustrates an embodiment of a user interface for a messaging endpoint displaying a selection and promotion page.

FIG. 10B illustrates an embodiment of a user interface 1025 for a messaging endpoint 125 displaying a selection and promotion page.

The selection and promotion page may include a category selection section 1030. The category selection section 1030 comprises a plurality of category controls. The selection of a category control by a user engages a category page displaying products within that category and/or businesses providing products within that category.

The selection and promotion page may include a selected products section 1035. The selected products section 1035 may comprise a plurality of products selected for the user by the consumer-to-business messaging system 100, such as based on a previous instance of that product or a related product or product category being mentioned by the user in a messaging conversation or by a user or business with which the user was engaging in a messaging conversation. In some embodiments, the user may be empowered to view additional selected products by scrolling the selected products section 1035—such as by swiping left or right on the user interface 1025 on the area of the screen containing the selected products section 1035. As illustrated in FIG. 10B, the product recommendation 1015 from the from FIG. 10A has been selected, possibly because the associated business is nearby and/or the product is on sale.

The selection and promotion page may include a selected businesses section 1040. In the illustrated example of FIG. 10B the selected businesses section is for nearby businesses. However, in various cases businesses may be selected for promotion based on a plurality of criteria with physical proximity only being one criteria that may be used by the consumer-to-business messaging system 100.

Figure 10C:
FIG. 10C illustrates an embodiment of a user interface for a messaging endpoint displaying a product page.

FIG. 10C illustrates an embodiment of a user interface 1050 for a messaging endpoint 125 displaying a product page. The product page may have been reached by the user selecting the product recommended in the product recommendation 1015 in user interface 1025.

The product page may include a product section 1055 displaying information for the selected product. The information for the selected product may include a name of the product, a text description of the product, a list price for the product, a current price for the product, savings provided by a different between the current price for the product and the list price for the product, and availability information for the product (in the illustrated example that the product is in stock). The product section 1055 may include a purchase control—here represented as a "buy now" call-to-action button—empowering the user to initiate purchasing of the product.

The product page may include a business section 1060 displaying information for the business being promoted as supplying the selected product. The business section 1060 may include location information and operating hours for the business. In some embodiments, selecting the location information may automatically trigger the providing of directions to the business location. The business section 1060 may include a message control empowering the user to engage in messaging with the business.

Figure 10D:
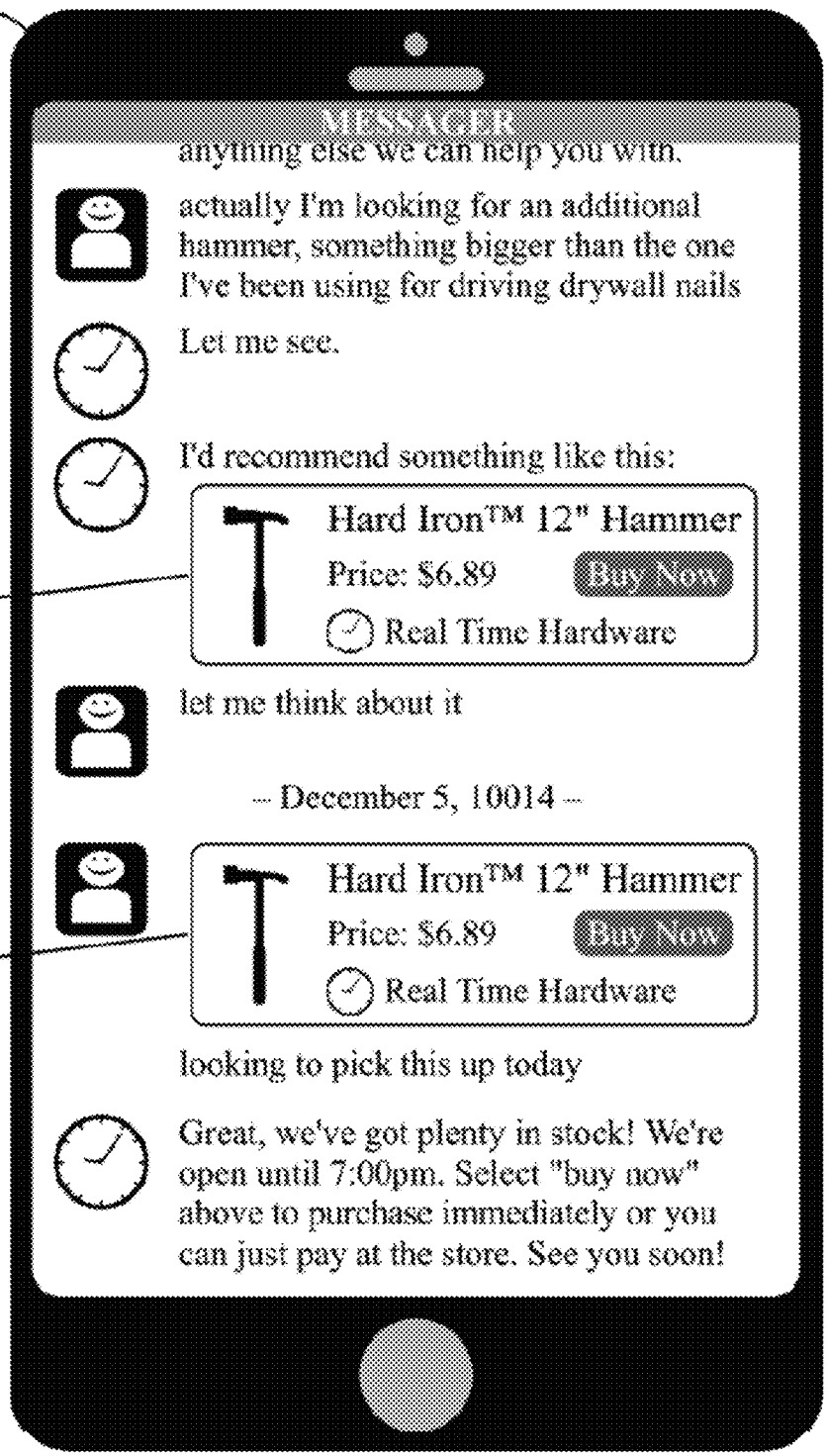
FIG. 10D illustrates an embodiment of a user interface for a messaging endpoint displaying an updated messaging conversation.

FIG. 10D illustrates an embodiment of a user interface 1075 for a messaging endpoint 125 displaying an updated messaging conversation 1010.

The user may be empowered to include the selected product listing 1085 in the messaging conversation 1010 with the business. The selected product listing 1085 may include a name of the product, a current price of the product, a business providing the product, and a "buy now" call-to-action button. As shown, the user has indicated in conversation that they are interested in purchasing the product in the selected product listing 1085. A representative for the business has responded to this with an indication that the product is available and a reminder of the operating hours of the business. In some cases, the user may select the call-to-action purchase button and initiate purchase of the product prior to visiting the business. In other cases, the user may wait until physically visiting the business to purchase the product.

As illustrated in FIG. 10D, the product recommendation 1015 of user interface 1000 has been updated to form updated product recommendation 1085 with the new, lower price for the product. In such embodiments, a user may be able to return to a messaging conversation 1010 and see a current status of the product on offer.

An integrated messaging and payment system can provide convenience in the processing of payment transactions for the purchase of a product or service. Specifically, the integrated messaging and payment system can allow a user to perform a payment transaction with a merchant to purchase a product or service within a messaging endpoint 125. For example, the consumer-to-business messaging system 100 can allow the user to initiate a payment transaction with a merchant while communicating with the merchant via the messaging endpoint 125. Thus, the consumer-to-business messaging system 100 can enable a user to easily interact with a merchant to inquire about and/or purchase a product from the user's client device 120 (e.g., a mobile device such as a smartphone).

Additionally, an embodiment of the consumer-to-business messaging system 100 can simplify a method for processing refunds to users. For example, the consumer-to-business messaging system 100 can provide a way for merchants to issue refunds to the user via the messaging endpoint 125. Specifically, the consumer-to-business messaging system 100 can allow a user to request a refund from a merchant from within the messaging endpoint 125 by associating a messaging thread between the user and the merchant with a transaction identifier tied to a payment transaction between the user and the merchant. Thus, the merchant can issue a refund to a user without requiring the user to give the merchant sensitive information (e.g., a card number) in a phone call or in person.

According to one or more embodiments, the consumer-to-business messaging system 100 can also allow users to pay merchants via a variety of payment methods. In particular, the consumer-to-business messaging system 100 can allow users to register a plurality of payment credentials with the system for use in payment transactions with merchants. For example, the consumer-to-business messaging system 100 can allow a user to select one or more of a plurality of registered payment credentials to pay for a product from a merchant using the messaging endpoint 125. Additionally, the consumer-to-business messaging system 100 also may allow merchants to provide a plurality of different payment options to the user based on the preferences or requirements of the merchants. Thus, the consumer-to-business messaging system 100 can provide versatility of payment methods in electronic payment transactions between users and merchants.

Furthermore, the system can allow a consumer to make a pay a merchant for a product or service without having to provide sensitive financial information (e.g., credit card number, checking account number) to the merchant. Thus, the consumer-to-business messaging system 100 can provide increased security for the user. In particular, the user can avoid any fears of fraud when visiting a new merchant.

The consumer-to-business messaging system 100 can also increase security for the merchant. In particular, the consumer-to-business messaging system 100 can perform risk checks based on information maintained about the consumer by a social networking system. The consumer-to-business messaging system 100 can deny a payment if the consumer is a known fraudster or if the payment appears fraudulent based on information about the consumer or the merchant maintained by the system.

In addition allowing the users to exchange electronic communications, the consumer-to-business messaging system 100 can allow the users to send and receive monetary payments to and from one another. In one or more embodiments, the consumer-to-business messaging system 100 allows users to define and send a payment message to a merchant user. For instance, the consumer-to-business messaging system 100 can allow the user to send a payment to a business via the messaging service 140. Likewise, the business can receive notice of the payment, and accept or decline the payment. The business can communicate with the consumer-to-business messaging system 100 to coordinate a transaction that facilitates the payment between the users (i.e., their accounts).

In one or more embodiments, for example, the consumer-to-business messaging system 100 can communicate with a payment network to authorize and process a transaction. For example, the consumer-to-business messaging system 100 can send a transaction to a payment gateway system. Once the payment gateway system receives the transaction, the payment gateway system can send the transaction to the processor (e.g., a payment processing system) used by a payment merchant user's acquiring bank. Based on the method of the payment (e.g., consumer user's account), the payment processing system can transmit the transaction to an appropriate card network system. In many instances, the card network system then sends the transaction to an issuing bank system.

The issuing bank system either approves or declines the transaction, and sends the decision back to a card network system. The card network then sends the decision to the payment processing system. The payment processing system can then forward the decision to the payment gateway system, and in one or more embodiments, the payment gateway system can maintain the details related to the transaction and the decision. The payment processing system also sends the decision to the consumer-to-business messaging system 100.

In addition to authorizing a transaction, the payment network can also perform settlement tasks. For example, the consumer-to-business messaging system 100 can coordinate with the payment gateway system to submit a daily settlement batch including one or more captured transactions to an acquiring bank via the acquiring bank's preferred payment processing system. The payment processing system then sends the settlement batch to a server of the acquiring bank, which records a deposit in the amount of each transaction within the settlement batch to an account associated with the merchant.

The acquiring bank can then send a funding request in satisfaction of the deposit amount to the payment processing system, which passes the funding request to the appropriate card network system. The card network system then sends the funding request to the issuing bank system. The issuing bank system can post the transaction to the consumer user's account and pass a release of the funds to the card network system, which are then passed to the payment processing system, and then the acquiring bank.

Figure 11:
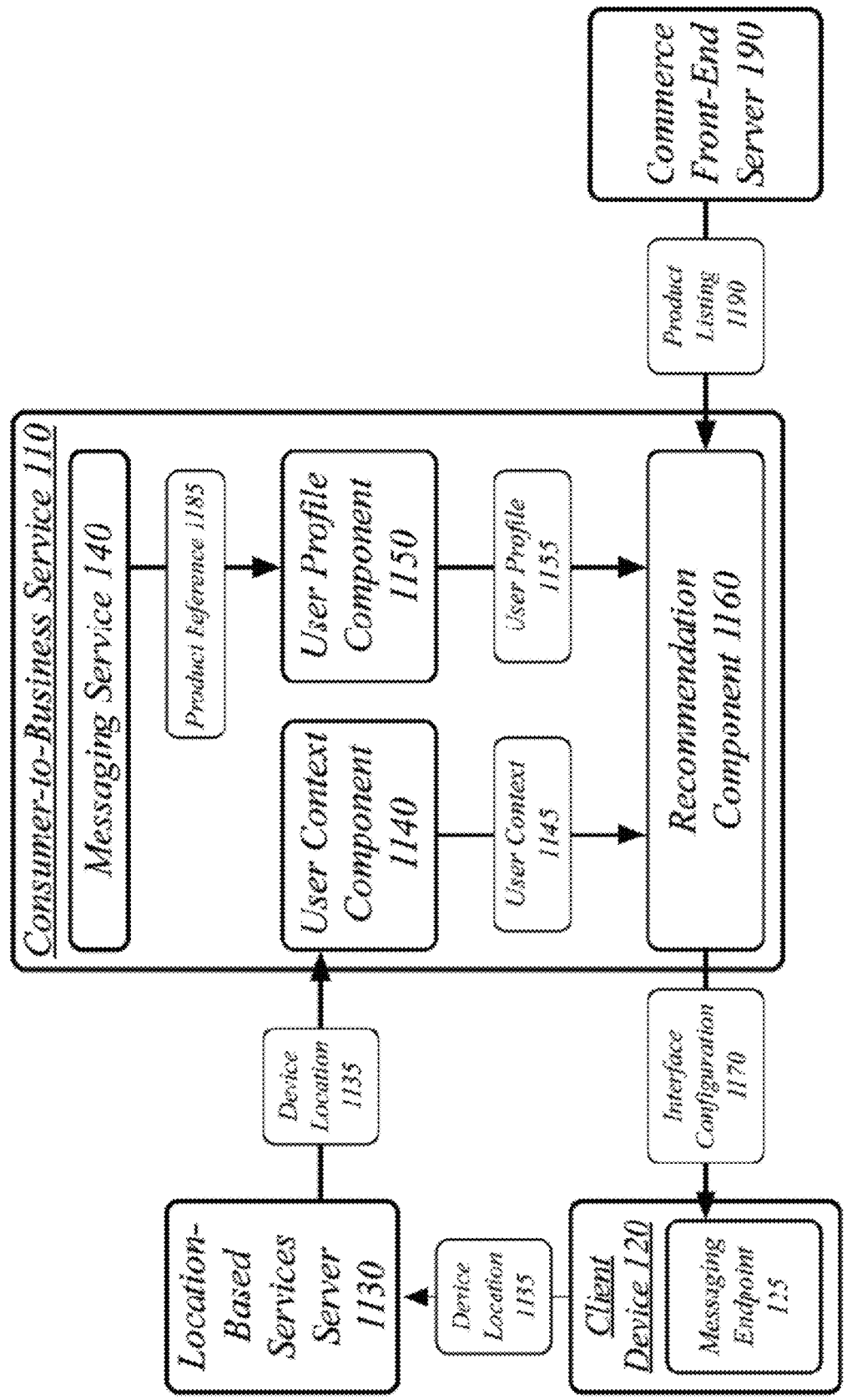
FIG. 11 illustrates an embodiment of a consumer-to-business service providing an interface configuration to a messaging endpoint.

FIG. 11 illustrates an embodiment of a consumer-to-business service 110 providing an interface configuration 1170 to a messaging endpoint 125. An interface configuration 1170 may comprise a set of one or more products, services, and/or businesses selected for suggestion to a user and arranged for display to the user. The interface configuration 1170 may include display text and/or display images for each of one or more recommendations. The interface configuration 1170 may define an ordering in which recommendations should be displayed for the user.

A user context component 1140 may be generally arranged to manage a user context 1145 associated with a user account for a messaging service 140. A user profile component 1150 may be generally arranged to retrieve a user profile 1155 for the user account. A recommendation component 1160 may be generally arranged to determine one or more recommendations based on the user context and the user profile and configure a recommendation interface for a messaging endpoint 125 on a client device 120 based on the recommendations, the messaging endpoint 125 associated with the user account for the messaging service 140. The user context 1145 may comprise current information about the status of the user, such as their location, current behavior, and other signals relevant to a current point in time. The user profile 1155 may comprise long-term information about the user that reflects the history of the user and persistent information about the user. A recommendation produced by the recommendation component 1160 may be based on a product listing 1190 received from the commerce front-end server 190 for a business. The recommendation component 1160 may received and store a plurality of product listings for each business for which the recommendation component 1160 will recommend products, with each product listing describing a particular product.

A product listing 1190 may include an identifier (id) for each of the products. In some cases, the identifier for a product may be assigned by the consumer-to-business service 110 to uniquely identify the product within an identifier space of the consumer-to-business service 110. Similarly, each user and business using the consumer-to-business service 110 may be assigned an identifier. All of these identifiers may be within a common identifier space of the consumer-to-business service 110 so that any entity or concept known to the consumer-to-business service 110 may be referenced by its identifier within a unified namespace. Product listings may be stored with reference to the business that may provide them, such as by using the identifier for the business. Product listings may be stored with reference to users that have purchased, rated, owned, recommended, or viewed the product, such as by listing a record of the identifiers for the users. Similarly, each business may be stored with reference to the products that they provide, such as by using the identifiers for the products. Where multiple businesses provide a product, each business may have a distinct identifier associated with its listing of the product or may each use the same identifier for its listing of the product. A product listing may comprise a plurality of information relating to the product, such as pricing information, descriptive information, manufacturer information, availability information, and other relevant information. References to a product, such as for recommendation, suggestion, or ordering may be performed using the identifier for the product.

The user profile 1155 may include a messaging affinity based on a messaging history for the user account, wherein determining the one or more recommendations is based on the messaging affinity. A messaging affinity may comprise an automatically-generated strength of the relationship between a user and a product, service, and/or business based on signals relating to the product, service, and/or business in a messaging conversation. A messaging affinity may be stronger for a product or service where a user has expressed an interest in a particular product or service. A messaging affinity may be stronger for a product or service where a user has expressed an interest in a particular type of product corresponding to the product or has expressed an interest in a particular type of service corresponding to the service. A messaging affinity may be stronger for a business where a user has expressed an interest in the business or in a type of business corresponding to the business.

As such, the user profile 1155 may comprise a messaging history for the user account, the one or more recommendations based at least in part on the messaging history. One or more recommended products of the plurality of recommended products may be determined based on the one or more recommended products being referenced in the messaging history for the user account.

The messaging service 140 may perform a consumer-to-business messaging interaction between the user and a business entity. The recommendation component 1160 may determine a referenced product recommended for a user of the user account in the consumer-to-business messaging interaction and include the referenced product in the one or more recommendations, the consumer-to-business messaging interaction comprising at least part of the user profile 1155. In some cases, the user context 1145 may comprise at least a geographic location for the client device 120, the consumer-to-business messaging interaction may be between the user account and a business entity account, and the recommendation component 1160 may therefore determine to include the referenced product from the consumer-to-business messaging interaction based at least in part on the business entity account being associated with a business entity geographic location within a geographic search area defined by the geographic location for the client device.

The client device 120 may provide a device location 1155 to a location-based service server 1130 which may then provide the device location 1135 to the user context component 1140 for inclusion in the user context 1145. A geographic search area may be defined by the current geographic location received as the device location 1155. The geographic search area may be defined as an area within a defined distance around the geographic location of the client device 120. The defined distance may be determined based on a detected current behavior of the user, such as using a lower defined distance when a user is determined to be walking and a higher defined distance when a user is determined to be driving or riding in a vehicle.

As such, the user context 1145 may include at least a geographic location for the client device 120, wherein at least one of the determined recommendations is for an interaction with an entity selected based on being within a geographic search area defined by the geographic location for the client device 120. Further, the user profile 1155 may comprise a plurality of recommended products, the one or more recommendations comprising recommendations to purchase one or more of the recommended products from one or more business entities within a geographic search area defined by the geographic location.

The one or more recommendations may comprise one or more recommendations to interact with one or more categories of business entities. Alternatively or additionally, the one or more recommendations may comprise one or more recommendations to interact with one or more specific business entities. The one or more recommendations may comprise one or more recommendations to purchase one or more specific products. The one or more recommendations may comprise one or more recommendations to purchase one or more specific products from one or more specific business entities.

In some cases, the products or services suggested to a user may be selected based on an amount that a business is willing to pay to the consumer-to-business service 110 for promotion of their products or services. The recommendation component 1160 may determining a plurality of relevant products based on the user profile 1155 and the user context 1145 and determining the one or more recommendations as highest-paying recommendations of the plurality of relevant products. For example, where a set number of recommendations will be made to the user, that set highest-paying number of relevant products may be suggested. The plurality of relevant products may be determined according to the techniques described herein, such as based on messaging affinity, messaging history, and/or the geographic location of the user as determined through using the location of the client device 120 as a proxy.

In some cases, a business may be selected for promotion or have their products selected for promotion based on the willingness or enthusiasm of the user in opening messages from the business. The messaging service 140 may track and log the frequency, percentage of the time, or other metric for how often the user examines messages from a particular business and thereby defined a message-open-rate for a plurality of business entities. The recommendation component 1160 may determine a plurality of relevant business entities based on the user profile 1155 and the user context 345 and determine the one or more recommendations based on message-open-rates for the user account for the plurality of relevant business entities. As such, a user may be recommendations businesses and/or products from those businesses based on their enthusiasm for receiving messages from those businesses.

A user may sometimes be presented with suggestions that relate to the extension, modification, or other option for an existing product, service, or upcoming product to be acquired or service to have received. The recommendation component 1160 may receive a product listing 1190 from a commerce front-end server 190 relating to an existing or upcoming service and suggest the product or service associated with the product listing 1190 to the user. For example, a user about to take an upcoming flight—which may be represented in the user context 1145—may be delivered an option to upgrade to a higher-quality seat on the flight. The user context 1145 may indicate that the user is about to engage in the upcoming service and the user profile 1155 may indicate that the user has an interest in the sort of option being offered by the business. As such, a user may receive only those promotions that are both relevant to the user and of a type in which they are interested.

Figure 12:
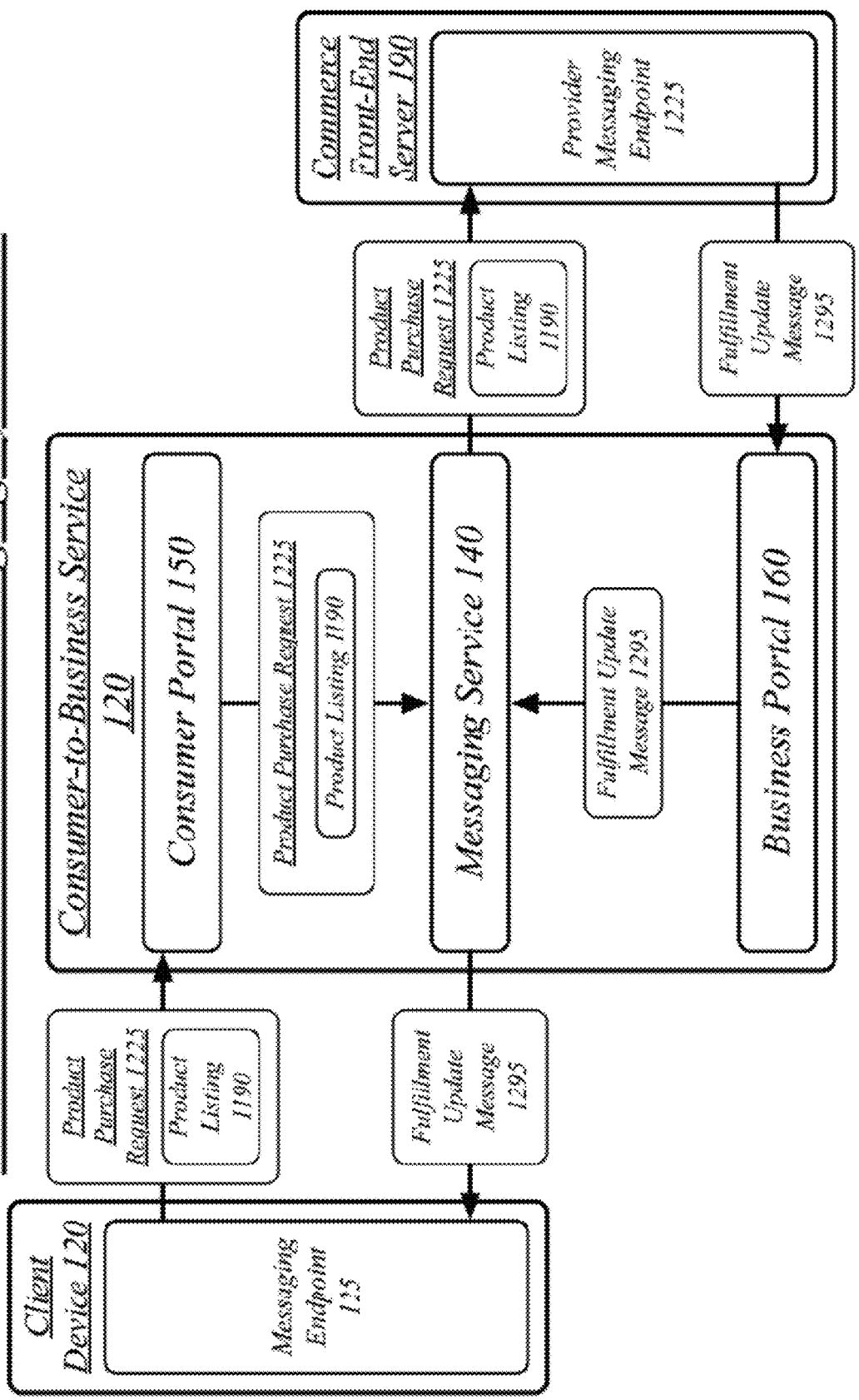
FIG. 12 illustrates an embodiment of a consumer-to-business service providing a fulfillment update message to a messaging endpoint.

FIG. 12 illustrates an embodiment of a consumer-to-business service 110 providing a fulfillment update message 1295 to a messaging endpoint 125.

The consumer portal 150 for the consumer-to-business service 110 may receive a product purchase request 1225 comprising a product listing 1190 from the messaging endpoint 125 of a client device 120. The received product listing 1190 may corresponding to a product listing 1190 initially received from the commerce front-end server 190. The received product listing 1190 may correspond to a selected recommendation, the selected recommendation comprising one of the one or more recommendations produced by the recommendation component 160 and included in the interface configuration 1170 provided by the recommendation component 160.

The consumer-to-business service 110 may initiate a messaging conversation in the messaging service 140 between the messaging endpoint 125 on the client device and a provider messaging endpoint 1225 associated with the selected recommendation, the messaging conversation automatically including the selected recommendation. This messaging conversation may empower a user to ask questions regarding the selected recommendation, arrange for purchase of the selected recommendation, and for the user and the business to generally engage in a conversation regarding the selected recommendation.

The consumer-to-business service 110 may receive a recommendation acceptance message from the messaging endpoint 125 on the client device 120 regarding acceptance of the selected recommendation. The messaging service 140 may transmit the recommendation acceptance message to the provider messaging endpoint 1225. In response, the provider messaging endpoint 1225—such as through the activities of a member of the business—may transmit, and therefore the messaging service 140 receive (such as via the business portal 160) a fulfillment update message 1295 from the provider messaging endpoint 1225 regarding fulfillment of the selected recommendation. A fulfillment update message 1295 may indicate, for example, that a purchase order has been carried out and that a product or service has been delivered or is ready for acquisition by the user.

Figure 13:
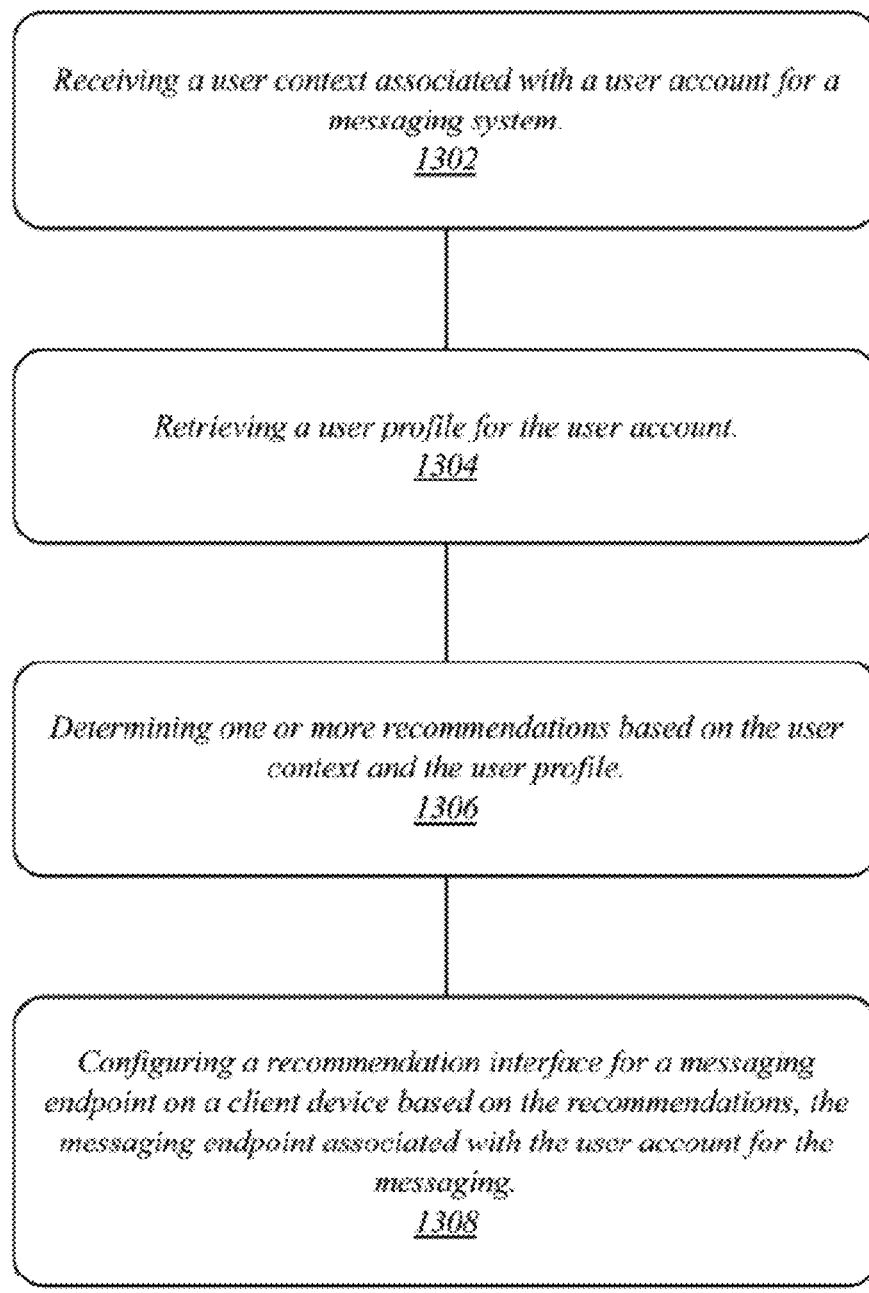
FIG. 13 illustrates an embodiment of a third logic flow for the system of FIG. 1.

FIG. 13 illustrates one embodiment of a third logic flow 1300. The logic flow 1300 may be representative of some or all of the operations executed by one or more embodiments described herein.

In the illustrated embodiment shown in FIG. 13, the logic flow 1300 may receive a user context associated with a user account for a messaging service 140 at block 1302.

The logic flow 1300 may retrieve a user profile for the user account at block 1304.

The logic flow 1300 may determine one or more recommendations based on the user context and the user profile at block 1306.

The logic flow 1300 may configure a recommendation interface for a messaging endpoint on a client device based on the recommendations, the messaging endpoint associated with the user account for the messaging service 140 at block 1308.

The embodiments are not limited to this example.

Automated Responses

People may desire to engage in messaging conversations with representatives of a business in order to experience personalized interactions. Such interactions may be particularly useful where a user has a query regarding the products or services of a business. However, representatives of a business may not be continuously available for responding to messages. Fortunately, many user queries may be answerable through an automated system. A unified system for interacting with a business may therefore empower a user to receive immediate, automated responses to queries appropriate for automation and to receive prompt, human-generated responses to queries that are not handled through automated response. A human administrator addressing a user query may be helped by being able to view the existing conversation between the user and an automated system to better understand the context of a query that did not receive an automated response. As such, an automated response messaging system that empowers administration preemption of a messaging conversation may provide the best of both worlds: the continuous availability of an automated system working in concert with the adaptability of a human administrator. As a result, users of the automated response messaging system may receive immediate automated answers when possible and be smoothly transitioned to a human administrator when appropriate, enhancing the utility of messaging with a business via a messaging service.

Figure 14A:
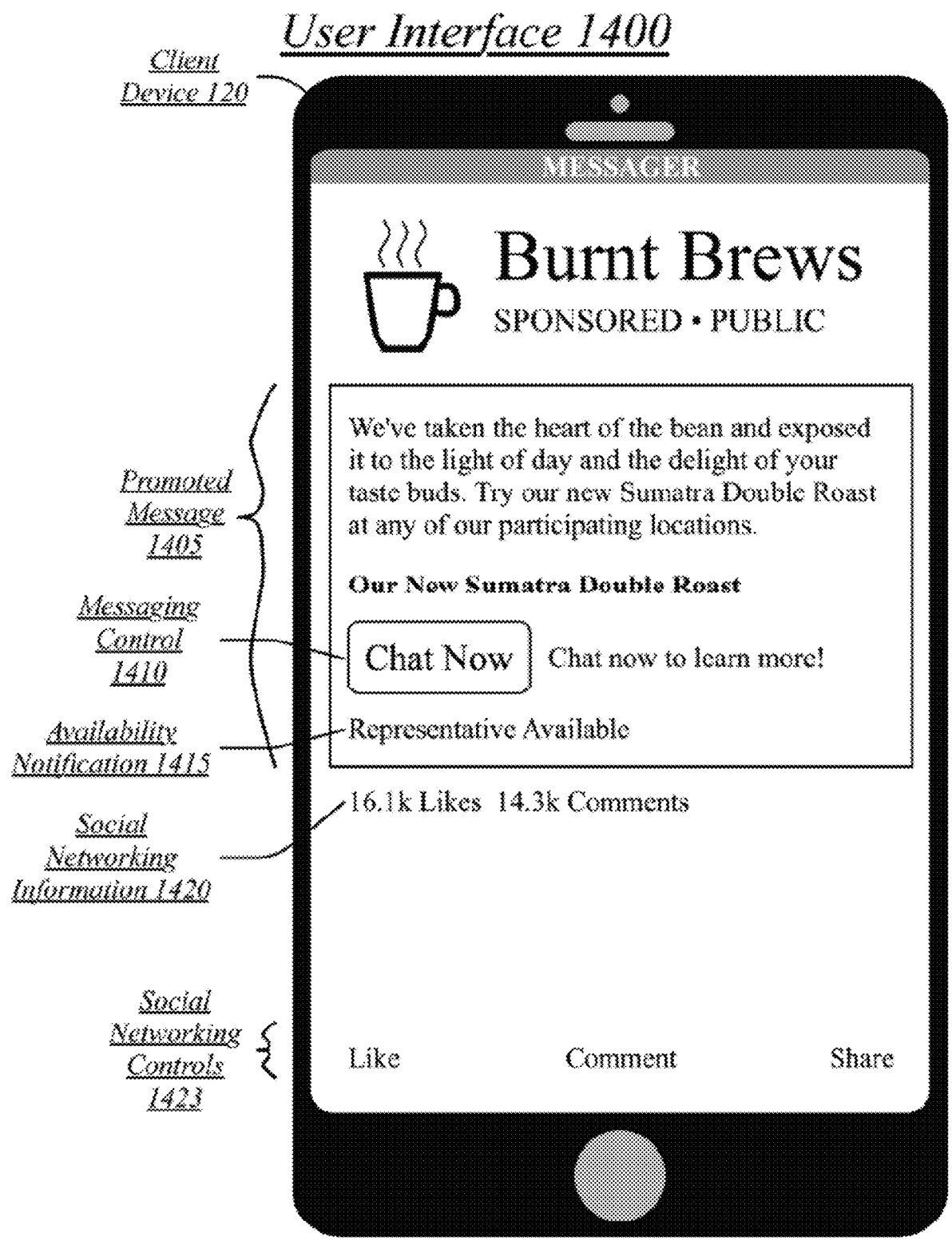
FIG. 14A illustrates an embodiment of a user interface for a messaging endpoint displaying a promoted message.

FIG. 14A illustrates an embodiment of a user interface 1400 for a messaging endpoint 125 displaying a promoted message 1405.

A promoted message 1405 may correspond to an advertisement or other message generated to promote a particular product, service, or business. The promoted message 1405 may be directed to a particular messaging endpoint 125 for display to a particular user based on information known about the user of the client device 120, such as demographic and preference information stored in a social networking service 170. The promoted message 1405 may include one or more images and one or more text segments conveying the promotion of the product, service, or business.

The promoted message 1405 may comprise a messaging control 1410. The messaging control 1410 may empower a user of the client device 120 to initiate a messaging conversation with a business (e.g., a representative for the business) using the messaging service 140. The messaging control 1410 may comprise a messaging call-to-action button that initiates a messaging conversation in relation to the promoted message 1405.

In some embodiments, the promoted message 1405 may include a availability notification 1415. The availability notification 1415 may indicate whether a representative of the business is currently available for messaging. In the illustrated embodiment of FIG. 14A, the availability notification 1415 indicates that a representative is currently available. However, in other cases a representative may not be currently available and the availability notification 1415 may indicate that a representative is not currently available.

The determination of whether a representative is available may be determined based on an available schedule for representatives for the business. One or more representatives for the business may be associated as a group with a collective availability schedule registered with the consumer-to-business messaging system 100. One ore more representatives for the business may each be associated with individual availability schedules. An availability notification 1415 may indicate that a representative is available if a collective availability schedule indicates that a representative is scheduled to be available or if any of one or more individual availability schedules indicated that at least one representative is scheduled to be available. An availability notification 1415 may indicate that representative is not available if a collective availability schedule indicates that no representative is scheduled to be available or if all of one or more individual availability schedules indicate that none of the one or more representatives is scheduled to be available. Alternatively or additionally, presence information for one or more representatives may be used by the consumer-to-business messaging system 100 to determine whether any of the representatives is currently available—such as on a client device—for messaging and reflect this determination in the availability notification 1415.

The promoted message 1405 may indicate an availability schedule for messaging with the business. A collective availability schedule, or a union of one or more individual availability schedules, may be displayed for the user. In some embodiments, an availability schedule for messaging with the business may be displayed in response to a user selection of a availability notification 1415 indicating that a representative is not currently available.

The promoted message 1405 may be displayed in association with social networking information 1420 indicating a number of likes and umber of comments on the promoted message 1405 by users of the consumer-to-business messaging system 100.

The promoted message 1405 may be displayed in association with social networking controls 1423 empowering a user to like, comment on, or share the promoted message 1405.

Figure 14B:
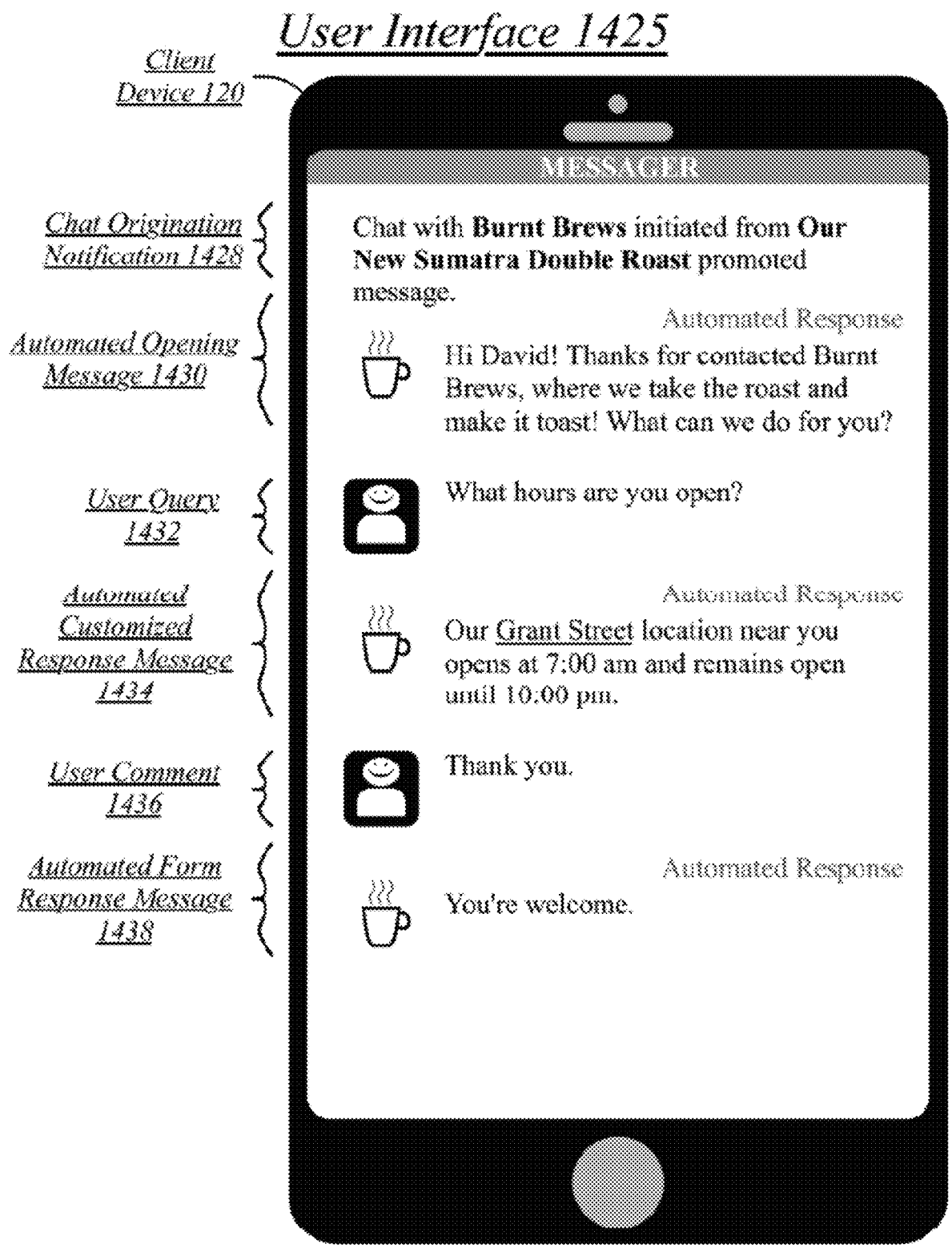
FIG. 14B illustrates an embodiment of a user interface for a messaging endpoint displaying an automated messaging interaction.

FIG. 14B illustrates an embodiment of a user interface 1425 for a messaging endpoint 125 displaying an automated messaging interaction. The illustrated automated messaging interaction may have been initiated by a user selecting the "chat now" messaging control 1410 described with reference to FIG. 14A. It will be appreciated that the messaging interactions may also be initiated from other sources, such as pages for a business that may be presented within the messaging service 140 and/or the social networking service 170.

An automated messaging interaction may include a chat origination notification 1428 indicating the entry point for the messaging interaction, in case the promoted message 1405. This chat origination notification 1428 may serve to remind the initiating user—such as if they return to the interaction at a later time—of how the interaction began. This chat origination notification 1428 may serve to notify an administrator of how a messaging interaction began if and when they take over control of the interaction from an automated agent.

The automated messaging interaction may include an automated opening message 1430. The automated opening message may include both form text and user-specific text. The form text may comprise text shown to all users—or a particular subset of users, such as may be determined by geographic location of the user—that has been generated by an administrator for the business for display at the initiation of an automated messaging interaction. The user-specific text may include text elements extracted from a user profile for the user, in this case the name or preferred form of address for the user, "David."

The automated messaging interaction may include a user query 1432 generated by the user as a question to the business. The user query 1432 may correspond to at least a portion of the user's motivation for initiating the messaging interaction.

The automated messaging interaction may include an automated customized response message 1434. The automated customized response message 1434 may comprise a response to the user query 1432. The automated customized response message 1434 may have been determined based on a keyword analysis of the user query 1432, natural language processing (NLP) analysis of the user query 1432, a keyword-driven finite state machine (FSM) analysis of the user query 1432, a decision tree analysis of the user query 1432, or according to any other known technique for branching automated interaction. In the illustrated example, the automated customized response message 1434 is based on a location associated with the user to determine a particular business location relevant to the user, in this case a franchise location for the business. Some automated customized response message 1434 may be stateless in that they do not depend on the current state of a conversation, such as a query as to the operating hours of a business.

Responses to queries may be presented by extracting answers from a repository of questions-and-answer pairs. Keyword analysis or NLP may be used to match a user query 1432 to a particular question in a question-and-answer pair and responded to with the answer from the question-and-answer pair. Analysis techniques may produce a weighted relevance for each question in the question-and-answer pairs and the consumer-to-business service 110 may respond with the answer corresponding to the question with the highest weight. In some embodiments, a minimum threshold weight may be defined wherein no answers is given and instead an alert to an administrator is generated if no question produces a weight above the minimum threshold weight.

The automated messaging interaction may include a user comment 1436 comprising a social interaction not representing a request for information. The automated messaging interaction may include an automated form response message 1438 socially responding to the user comment 1436.

An automated response such as automated opening message 1440, automated customized response message 1434, and automated form response message 1438 may be displayed with an automated-response tag indicating that the automated response was generated automatically in order to inform a user of whether they are interacting with a human administrator or an automated agent.

Figure 14C:
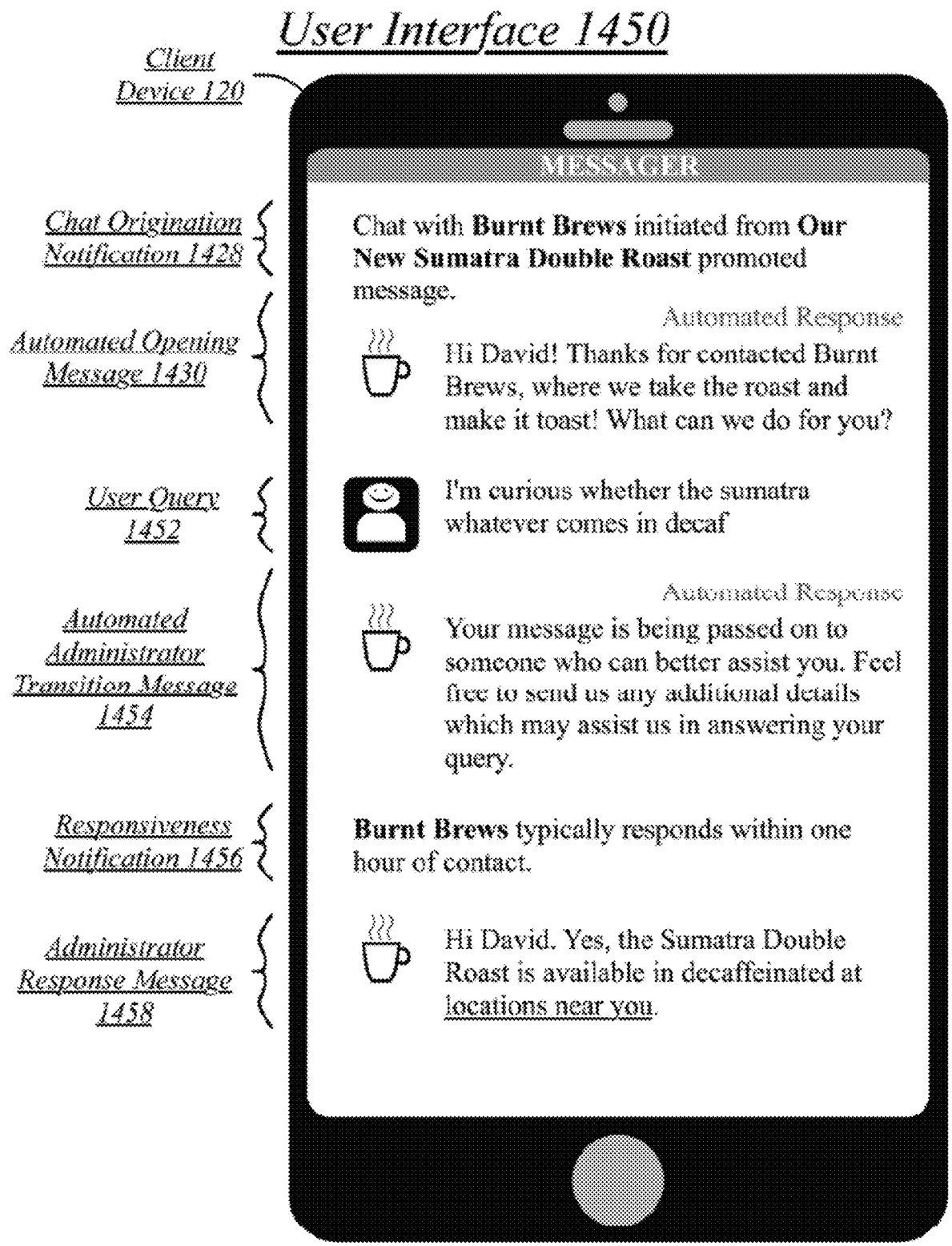
FIG. 14C illustrates an embodiment of a user interface for a messaging endpoint displaying a partially-automated messaging interaction.

FIG. 14C illustrates an embodiment of a user interface 1450 for a messaging endpoint 125 displaying a partially-automated messaging interaction. The partially-automated messaging interaction may transition from automated to administrator-controlled when a user query 1452 is not answered—though it may still be responded to—by the automated system.

The partially-automated messaging interaction may begin with the same chat origination notification 1428 and automated opening message 1430 as the interaction described with reference to FIG. 14B. However, the partially-automated messaging interaction may include a user query 1452 that the automated response configuration for the business does not include instructions for responding to. This may result from a keyword-driven automated response configuration not including keywords for the user query 1452, an NLP-driven automated response configuration not recognizing the language used, or to any other failure of the automated response configuration to provide a specific response to the user query 1452.

In response to a failure to generate a specific response to the user query 1452, the partially-automated messaging interaction may include an automated administrator transition message 1454. The automated administrator transition message 1454 may comprise form text specified by an administrator for the business used when a specific response is not generated.

Based on the display of a automated administrator transition message 1454, the partially-automated messaging interaction may automatically include a responsiveness notification 1456 by the consumer-to-business messaging system 100. The responsiveness notification 1456 may be automatically displayed whenever an automated response configuration failures to provide a specific response to the user query 1452 after the displayed of an automated administrator transition message 1454. The responsiveness notification 1456 may indicate an estimated, predicated, typical, or otherwise representative responsiveness for the business. The responsiveness notification 1456 may notify the user of a delay that they should expect before receiving a response from an administrator for the business. A time to respond may be used where one or more administrators are scheduled or determined to be available. Where a schedule or presence information indicates that no administrator is available the responsiveness notification 1456 may instead indicate the next time an administrator is scheduled or expected to be available. An amount of time—here one hour—indicated in the responsiveness notification 1456 may in some embodiments be specified by an administrator for the business and may in some embodiments be automatically determined based on monitoring of response time of administrators of the business. The responsiveness notification 1456 may be general across all the administrators of the business or may be specific to a current on-duty administrator of the business, such as may be generated from the actual response times for that administrator.

The partially-automated messaging interaction may include an administrator response message 1458 generated by an administrator for the business specifically in response to the user query 1452, not as part of an automate response configuration. As illustrated, the administrator response message 1458 is not marked as being an automated response.

In some cases, an administrator response message 1458 may incorporate content, such as product content, for the business, as may be represented in a page for the business. For example, product nodes may be represented in the social graph and linked to the business in the social graph. Information from these product nodes may be included in the messaging interaction, so as to display particular products and information associated with the products such as images of the products, identifiers for the products, prices for the products, or any other product information. A displayed product node may empower the user to immediately engage in purchase of the product from the business via the messaging endpoint 125.

The performance of the automated administrator transition message 1454 may have automatically transmitted an alert to one or more administrators for the business scheduled to be available or otherwise registered as recipients of administrator alerts. An administrator viewing the alert may be empowered to view the entirety of the partially-automated messaging interaction so as to understand the context to which they are responding, including the chat origination notification 1428 providing a link to the originating promoted message 1405.

An administrator response message 1458 response message may include information automatically retrieved for the administrator. The administrator may enter form text or otherwise specify that information should be placed in the administrator response message 1458 based on retrieval from an information repository. Information may be retrieved such as product images, product descriptions, product availability, product available quantity, and other relevant product information. Information for a user may be stored in a user profile and used in the determination of retrieved information, such as where a shoe size for a user is specified and availability and the available quantity is determined for that particular shoe size for the user. In general, customization information for a user that applies across different products (e.g., shoe size, clothing size) may be used in the retrieval of product information.

Figure 15A:
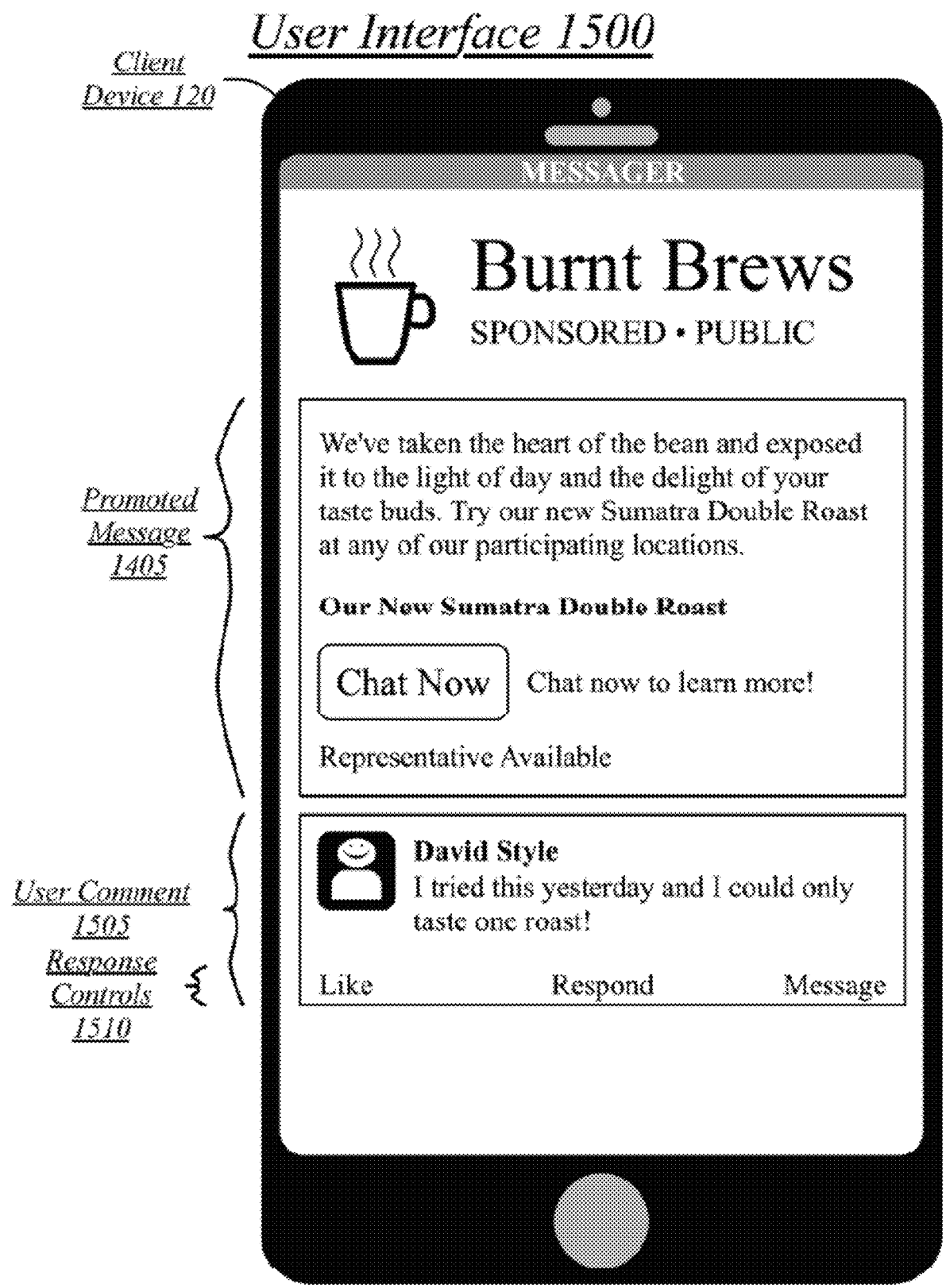
FIG. 15A illustrates an embodiment of a user interface for a messaging endpoint displaying a user comment on a promoted message.

FIG. 15A illustrates an embodiment of a user interface 1500 for a messaging endpoint 125 displaying a user comment 1505 on a promoted message 1405.

Users may be empowered to comment on messages such as promoted message 1405. A user comment 1505 may be displayed in association with the promoted message 1405. In this case the user comment 1505 contains a complaint from a user about a received product. The business may desire to privately respond to the user comment 1505 in order to determine whether they can address the user's complaint or concern.

In general, businesses may be barred from initiating messaging conversations with users in order to avoid using the messaging service 140 for spamming (i.e., the transmission of unwanted promotions, advertisements, or other communication). However, businesses may be allowed to send a single responding message to initiate a response to a user comment on a promoted message 1405 for the business while still being restricted from sending additional responses unless the user engages the business in a dialog. In some embodiments, the business may be restricted to only responding to a user comment 1505 within a predefined window of time after the posting of the user comment 1505, such as twenty-four hours or one week. In some embodiments, a set number of private messages, one or more, may be allowed in response to a user comment. A particular ratio of sent private messages to received responses may be controlled by the business portal 160 for the consumer-to-business messaging system 100.

The user comment 1505 may include response controls 1510. Some of the response controls 1510, such as the like control and respond control, may be generally available to all users, allowing them to support the user comment 1505 or publicly respond to the user comment 1505. The message control may be limited to administrators of the business—and still limited to only one response—and to friends of the user that generated the user comment 1505.

In some embodiments, business administrators may only private message a user when the user has opted-in to private messaging from the business, such as may be performed when the user interacts with a page for the business in the messaging service 140 and/or social networking service 170.

Figure 15B:
FIG. 15B illustrates an embodiment of a user interface for a messaging endpoint displaying an administrator message dialog in response to a user comment.

FIG. 15B illustrates an embodiment of a user interface 1525 for a messaging endpoint 125 displaying an administrator message dialog 1530 in response to a user comment 1505. The user interface 1525 may correspond to an administrator for the business having selected the message control.

The administrator selection of the message control may have instantiated a administrator message dialog 1530. The administrator message dialog 1530 may empower the administrator to enter a response to the user comment 1505 and send it to the user as a private message using the messaging service 140.

A user receiving a private message in response to a user comment 1505 by the user on a promoted message 1405 may be reminded in the messaging conversation that the source of the private message is their user comment 1505. The user may be shown their user comment 1505 and may be able to select a control to view their user comment 1505 in context, such as in adjacency to a promoted message 1405.

An administrator for a business may be empowered to view the larger context for the relationship between the business and the user. The administrator may be able to retrieve previous purchases by the user from the business, pending purchases by the user with the business, previous messaging interactions between the user and the business, whether a user has subscribed to updates from the business, payment information for the user (such as whether the user has payment information on file without being able to view, for example, specific financial information such as credit card numbers), contact information for the user, and any other previous interaction between the user and the business. Administrators may be able to classify users into one or more categories, such as indicating whether a user is a fan, and later view these classifications. Administrators may be able to assign a priority status to users, such as due to a user being a regular customer or high-value customer. Administrators may be provided notifications and alerts related to users according to an ordering (where multiple notifications and/or alerts are queued) determined according to the priority of the users. Users may be prompted to subscribe to updates for the business using an in-line interface in which their response can be entered as "yes" or "no" within the messaging conversation. In general, any form of interaction with the business (purchasing products, requesting updates, etc.) may be performed in-line using text entry by the user.

Figure 16:
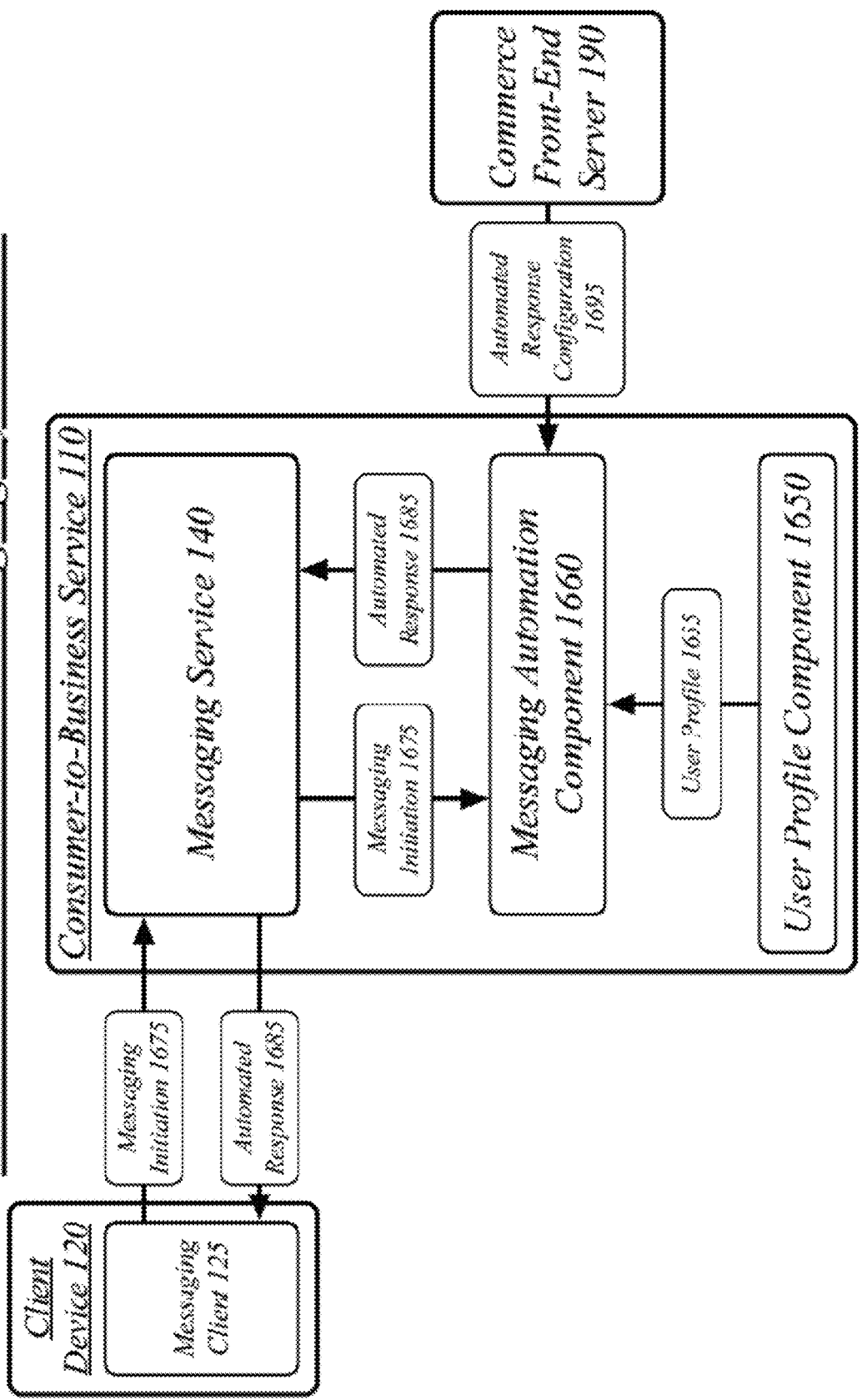
FIG. 16 illustrates an embodiment of a consumer-to-business service generating an automated response.

FIG. 16 illustrates an embodiment of a consumer-to-business service 110 generating an automated response 1685.

A user profile component 1650 may be generally arranged to manage, update, and retrieve a plurality of user profiles for a plurality of users of the automate response messaging system 100. The user profile component may retrieve a user profile 1655 associated with a user account for a messaging service 140. The user profile 1655 may be retrieved in response to the user performing a messaging initiation 1675 using a messaging endpoint 125 on a client device 120.

A messaging automation component 1660 may be generally arranged to receive notification of the messaging initiation 1675 by the messaging endpoint 125 on the client device 120. The messaging automation component 1660 may receive the user profile 1655 from the user profile component 1650. The messaging automation component 1660 may configure an automated response 1685 based on the user profile 1655 in response to the messaging initiation 1675 and transmit the automated response 1685 to the messaging endpoint 125 via the messaging service 140. The automated response 1685 may be generated based on an automated response configuration 1685 received from a commerce front-end server 190 for the business. In some cases, the automated response configuration 1685 may have been created by an administrator interface to the messaging service 140.

An automated response configuration 1685 may have a state and thereby corresponding to a finite state machine (FSM). An administrator interface may include a mock chat window for the administrator to view how they are developing the tree, branching logic, or FSM. In some cases, administrator notification may occur where a user transitions to a state in a finite state machine without interaction instructions in the automated response configuration 1685. Some states may be associated with product ordering, which may instantiate a product ordering dialog. Product ordering may use peer-to-peer or business-to-peer ordering techniques.

Configuring the automated response 1685 may comprise extracting one or more customization elements from the user profile 1655 and basing the automated response 1685 on the extracted one or more customization elements. The one or more customization element may comprise one or more of a name, an address, a date of birth, and a location. A customization element such as a name may be included in the automated response 1685. A customization element such as an address (e.g., the user's address) or location (as may be determined according to geolocation of the messaging endpoint 125) may be used to determine, for example, a particular business location relevant to the user with the automated response 1685 generated in relation to that particular business location. In some cases an address may correspond to a delivery address, such as a delivery address field received as part of the messaging initiation 1675. Alternatively or additionally, different dialogs may be used for different geographic regions (e.g., cities, states, nations, multi-nation regions). Similarly, different dialogs may be used for people of different regions, such as different dialogs for minors and adults.

Where an automated response 1685 is based on a location, configuring the automated response 1685 may include determining a current geographic location associated with the user account. This current geographic location may determined by retrieving a location of the client device 120 from the client device, either requesting the location in response to the messaging initiation 1675 or by retrieving a recorded location for the client device 120 recorded as part of providing general location-based services to the user of the client device 120.

In some cases, an automated response configuration 1695 may empower a user to initiate a commerce transaction in which a product or service is ordered. The messaging automation component 1660 may receive a commerce transaction instruction as part of the automated response 1685 through the processing of the automated response configuration 1695. However, the consumer-to-business messaging system 100 may be configured to require user confirmation of any commerce transaction to avoid a user being charged for an unwanted product or service. As such, the messaging automation component 1660 may initiate a commerce transaction confirmation dialog in response to the commerce transaction instruction to confirm that commerce transaction with the user and only perform the commerce transaction—which may include performing a financial transaction and submitting an order request to the commerce front-end server 190—in response to an affirmative response from the user to the commerce transaction confirmation dialog.

Users may be shown advertisements, which may comprise messages such as promoted message 1405. The consumer-to-business service 110 may display an advertisement, such as in the messaging endpoint 125 or on a web page associated with the consumer-to-business messaging system 100 such as a web page for the social networking service 170. The consumer-to-business service 110 may receive a user selection of the advertisement and instantiate the messaging endpoint 125—such as a messaging widget—in response to the user selection of the advertisement.

In some cases, engaging an advertisement or link may initiate a deep link into the messaging endpoint 125 in an interaction with the business. This messaging interaction may include controls for ordering particular products that may be recommended or otherwise presented during the messaging interaction. Users may be empowered to select the controls as buttons or may be empowered to select a control by entering text corresponding to the control.

In some cases, a user may initiate messaging with a business by entering a name or other identifier for the business into an address field for the messaging endpoint 125. A messaging endpoint 125 may support auto-complete in the address field. Auto-completion may match against other users known to the user, against nearby businesses, against followed businesses, against liked businesses, against businesses with which the user has engaged in a transaction, or against all businesses in various embodiments.

As discussed at least with reference to FIG. 14C, in some cases an administrator may take control of an automated interaction. The messaging automation component 1660 may perform an automated interaction via the messaging endpoint 125 based on the configured automated response 1685 and record the automated interaction. The messaging automation component 1660 may then display the recorded automated interaction via an administrator interface for the automated response in response to an administrator for the business taking control of the interaction with the user.

The messaging automation component 1660 may perform an automated interaction via the messaging endpoint 125 based on the configured automated response 1685. The messaging automation component 1660 may determine that a current state for the automated interaction indicates administrator notification. The messaging automation component 1660 may transmit a notification to an administrator account for the automated response 1685 in response to determining that the current state for the automated interaction indicates administrator notification. A state for the automated interaction indicating administrator notification may be specified in the automated response configuration 1695.

Different administrators may be associated with different locations, whether particular business locations or particular geographic regions. Similarly, different administrators may be used for different categories of customers (e.g., financial status, preferred language). Therefore, the administrator account to which the notification is transmitted may be determined from a plurality of administrator accounts based on user information from the user profile 1655, the user information comprising at least one of a user location and user demographic information.

In some cases the automated response configuration 1695 may specify a branching response or otherwise depend on a user information element that may be specified in a user profile 1655. However, some users may not have complete user profiles. The messaging automation component 1660 may therefore prompt users to add information to their user profile in order to receive an improved benefit from the automated interaction. The messaging automation component 1660 may determine that the automated response 1685 is operative to be configured according to a user information element, determine that the user information element is not specified in the user profile 1655, and prompt specification of the user information element for the user profile 1655 in response to determining that the automated response is operative to be configured according to the user information element and that the user information element is not specified in the user profile. This may comprise instantiating a dialog on the messaging endpoint 125 or an in-line query for information in an automated interaction.

In some cases, a messaging interaction may be embedded within a web page, such as third-party web page for the business. The messaging endpoint 125 may comprise a messaging widget for the messaging service 140 embedded in the third-party web page. The messaging service 140 may therefore perform an automated interaction via the messaging widget based on the configured automated response 1685. Where a messaging widget embedded in a third-party webpage is used the user account and user profile may be identified based on a web cookie stored on and received from the client device 120.

An integrated messaging and payment system can provide convenience in the processing of payment transactions for the purchase of a product or service. Specifically, the integrated messaging and payment system can allow a user to perform a payment transaction with a merchant to purchase a product or service within a messaging endpoint 125. For example, the consumer-to-business messaging system 100 can allow the user to initiate a payment transaction with a merchant while communicating with the merchant via the messaging endpoint 125. Thus, the consumer-to-business messaging system 100 can enable a user to easily interact with a merchant to inquire about and/or purchase a product from the user's client device 120 (e.g., a mobile device such as a smartphone).

Additionally, an embodiment of the consumer-to-business messaging system 100 can simplify a method for processing refunds to users. For example, the consumer-to-business messaging system 100 can provide a way for merchants to issue refunds to the user via the messaging endpoint 125. Specifically, the consumer-to-business messaging system 100 can allow a user to request a refund from a merchant from within the messaging endpoint 125 by associating a messaging thread between the user and the merchant with a transaction identifier tied to a payment transaction between the user and the merchant. Thus, the merchant can issue a refund to a user without requiring the user to give the merchant sensitive information (e.g., a card number) in a phone call or in person.

According to one or more embodiments, the consumer-to-business messaging system 100 can also allow users to pay merchants via a variety of payment methods. In particular, the consumer-to-business messaging system 100 can allow users to register a plurality of payment credentials with the system for use in payment transactions with merchants. For example, the consumer-to-business messaging system 100 can allow a user to select one or more of a plurality of registered payment credentials to pay for a product from a merchant using the messaging endpoint 125. Additionally, the consumer-to-business messaging system 100 also may allow merchants to provide a plurality of different payment options to the user based on the preferences or requirements of the merchants. Thus, the consumer-to-business messaging system 100 can provide versatility of payment methods in electronic payment transactions between users and merchants.

Furthermore, the system can allow a consumer to make a pay a merchant for a product or service without having to provide sensitive financial information (e.g., credit card number, checking account number) to the merchant. Thus, the consumer-to-business messaging system 100 can provide increased security for the user. In particular, the user can avoid any fears of fraud when visiting a new merchant.

The consumer-to-business messaging system 100 can also increase security for the merchant. In particular, the consumer-to-business messaging system 100 can perform risk checks based on information maintained about the consumer by a social networking system. The consumer-to-business messaging system 100 can deny a payment if the consumer is a known fraudster or if the payment appears fraudulent based on information about the consumer or the merchant maintained by the system.

In addition allowing the users to exchange electronic communications, the consumer-to-business messaging system 100 can empower the users to send and receive monetary payments to and from one another. In one or more embodiments, the consumer-to-business messaging system 100 allows users to define and send a payment message to a merchant user. For instance, the consumer-to-business messaging system 100 can allow the user to send a payment to a business via the messaging service 140. Likewise, the business can receive notice of the payment, and accept or decline the payment. The business can communicate with the consumer-to-business messaging system 100 to coordinate a transaction that facilitates the payment between the users (i.e., their accounts).

In one or more embodiments, for example, the consumer-to-business messaging system 100 can communicate with a payment network to authorize and process a transaction. For example, the consumer-to-business messaging system 100 can send a transaction to a payment gateway system. Once the payment gateway system receives the transaction, the payment gateway system can send the transaction to the processor (e.g., a payment processing system) used by a payment merchant user's acquiring bank. Based on the method of the payment (e.g., consumer user's account), the payment processing system can transmit the transaction to an appropriate card network system. In many instances, the card network system then sends the transaction to an issuing bank system.

The issuing bank system either approves or declines the transaction, and sends the decision back to a card network system. The card network then sends the decision to the payment processing system. The payment processing system can then forward the decision to the payment gateway system, and in one or more embodiments, the payment gateway system can maintain the details related to the transaction and the decision. The payment processing system also sends the decision to the consumer-to-business messaging system 100.

In addition to authorizing a transaction, the payment network can also perform settlement tasks. For example, the consumer-to-business messaging system 100 can coordinate with the payment gateway system to submit a daily settlement batch including one or more captured transactions to an acquiring bank via the acquiring bank's preferred payment processing system. The payment processing system then sends the settlement batch to a server of the acquiring bank, which records a deposit in the amount of each transaction within the settlement batch to an account associated with the merchant.

The acquiring bank can then send a funding request in satisfaction of the deposit amount to the payment processing system, which passes the funding request to the appropriate card network system. The card network system then sends the funding request to the issuing bank system. The issuing bank system can post the transaction to the consumer user's account and pass a release of the funds to the card network system, which are then passed to the payment processing system, and then the acquiring bank.

Figure 17:
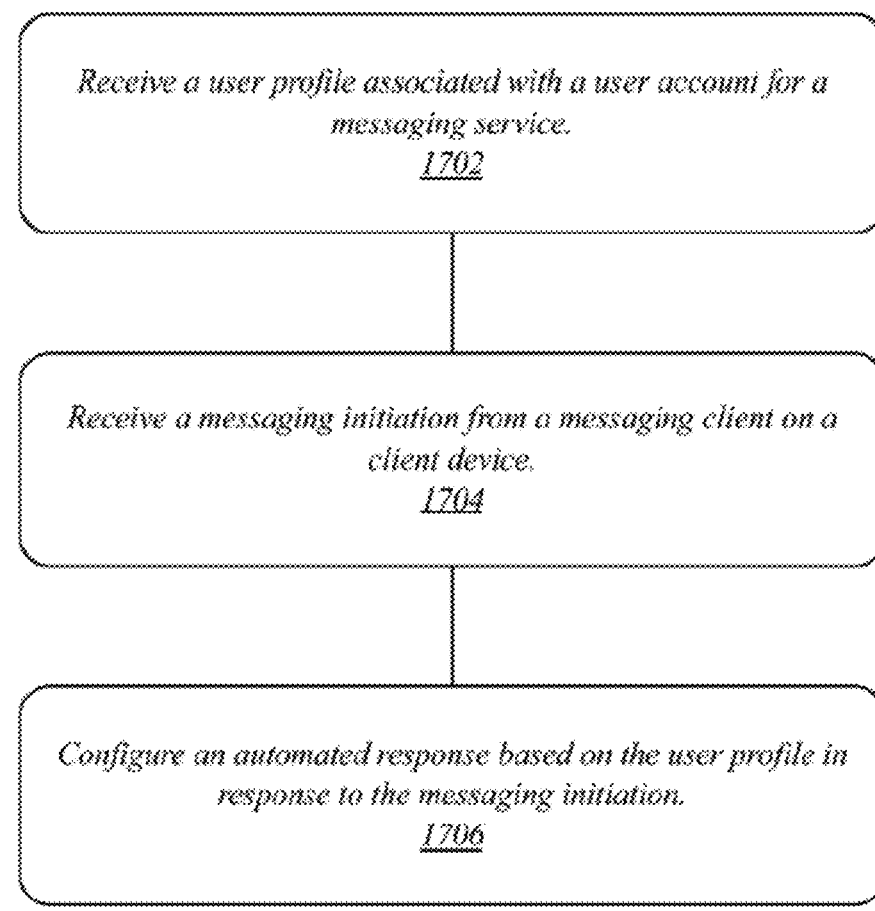
FIG. 17 illustrates an embodiment of a fourth logic flow for the system of FIG. 1.

FIG. 17 illustrates one embodiment of a fourth logic flow 1700. The logic flow 1700 may be representative of some or all of the operations executed by one or more embodiments described herein.

In the illustrated embodiment shown in FIG. 17, the logic flow 1700 may receive a user profile associated with a user account for a messaging service at block 1702.

The logic flow 1700 may receive a messaging initiation from a messaging endpoint on a client device at block 1704.

The logic flow 1700 may configure an automated response based on the user profile in response to the messaging initiation at block 1706.

The embodiments are not limited to this example.

Computer System Embodiments

Figure 18:
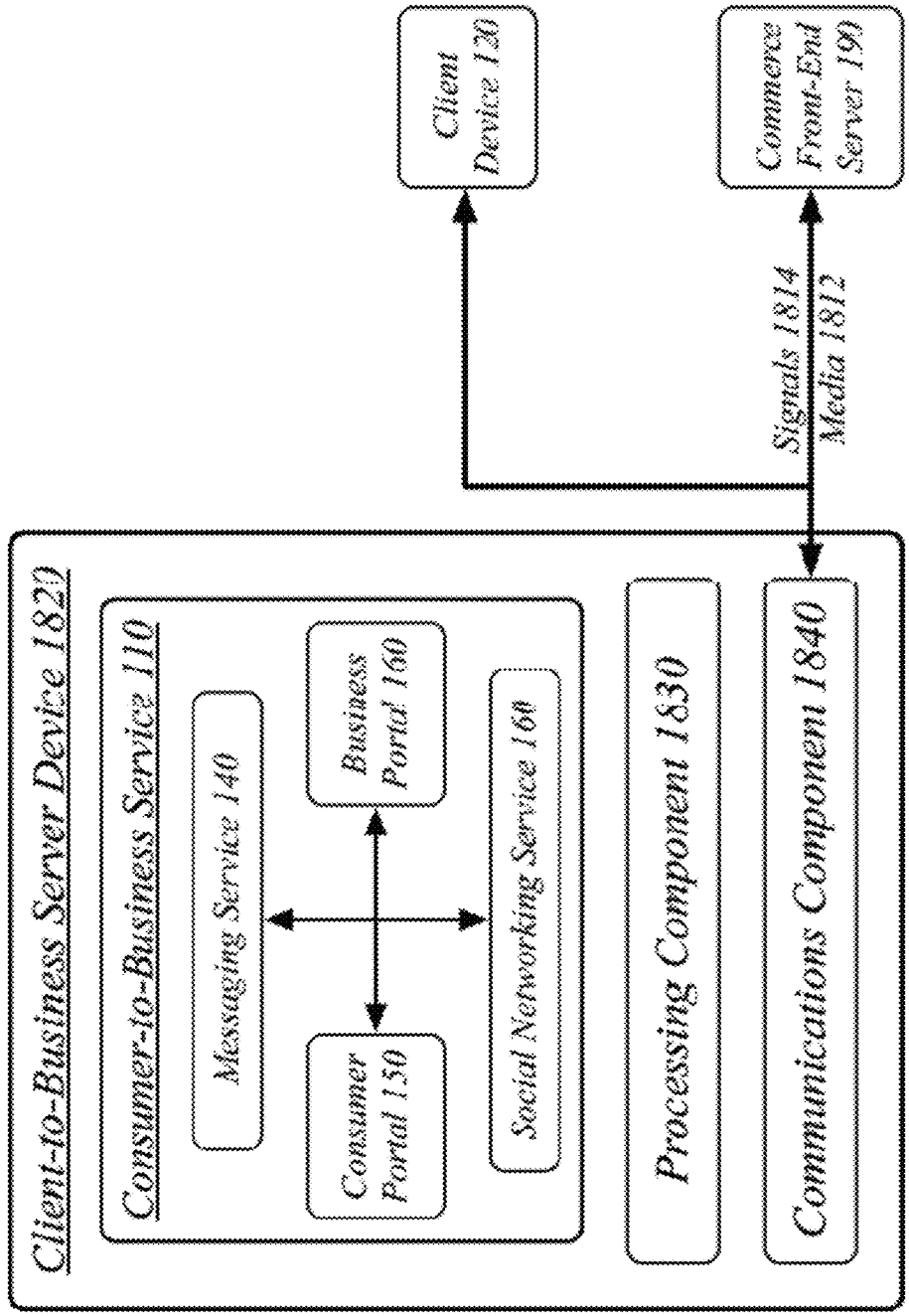
FIG. 18 illustrates an embodiment of a centralized system for the system of FIG. 1.

FIG. 18 illustrates a block diagram of a centralized system 1800. The centralized system 1800 may implement some or all of the structure and/or operations for the system 100 in a single computing entity, such as entirely within a single device 1820.

The device 1820 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 1820 may execute processing operations or logic for the system 100 using a processing component 1830. The processing component 1830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 1820 may execute communications operations or logic for the system 100 using communications component 1840. The communications component 1840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1812, 1842 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The client-to-business service device 1820 may implement the consumer-to-business service 110 in a single computing device. The client-to-business server device 1820 may communicate with other devices over a communications media 1812 using communications signals 1814 via the communications component 1840. The devices may be internal or external to the client-to-business server device 1820 as desired for a given implementation. The devices may include the client device 120 and the commerce front-end server 190.

Figure 19:
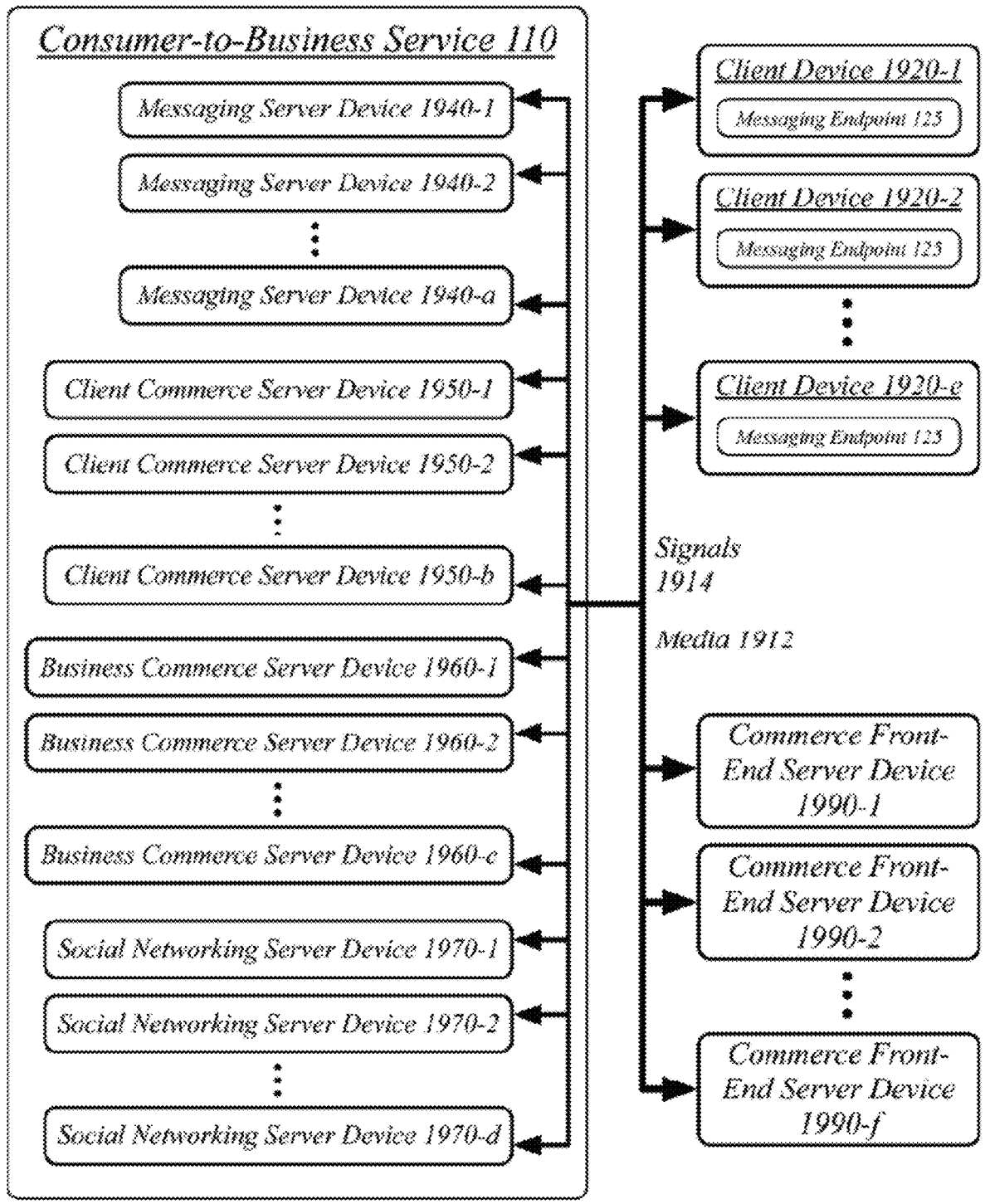
FIG. 19 illustrates an embodiment of a distributed system for the system of FIG. 1.

FIG. 19 illustrates a block diagram of a distributed system 1900. The distributed system 1900 may distribute portions of the structure and/or operations for the system 100 across multiple computing entities. Examples of distributed system 1900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1900 may comprise a plurality of server devices, including one or more messaging server devices 1940, one or more client commerce server devices 1950, one or more business commerce server devices 1960, and one or more social networking server devices 1970. In general, the server devices 1940, 1950, 1960, and 1970 may be the same or similar to the client-to-business server device 1820 as described with reference to FIG. 18. For instance, the server devices 1940, 1950, 1960, and may each comprise a processing component and a communications component 1940 which are the same or similar to the processing component 630 and the communications component 640, respectively, as described with reference to FIG. 6. In another example, the server devices 1940, 1950, 1960, and 1970 may communicate over a communications media 1912 using communications signals 1914 via the communications components.

The messaging server devices 1940 may comprise or employ one or more programs that operate to perform various methodologies in accordance with the described embodiments. In one embodiment, for example, the messaging server devices 1940 may implement the messaging service 140.

The client commerce server devices 1950 may comprise or employ one or more programs that operate to perform various methodologies in accordance with the described embodiments. In one embodiment, for example, the client commerce server devices 1950 may implement the consumer portal 150.

In some embodiments, for example, the client commerce server devices 1950 may implement the user context component 1140, the user profile component 1150, and the recommendation component 1160. In other embodiments, these components may be implemented by other server devices, such as specific recommendation server devices.

The business commerce server devices 1960 may comprise or employ one or more programs that operate to perform various methodologies in accordance with the described embodiments. In one embodiment, for example, the business commerce server devices 1960 may implement the business portal 160.

The social networking server devices 1970 may comprise or employ one or more programs that operate to perform various methodologies in accordance with the described embodiments. In one embodiment, for example, the social networking server devices 1970 may implement the social networking service 170.

The consumer-to-business service 110 may communicate with a plurality of client devices 1920 similar to the client device 120, each executing a messaging endpoint 125. The consumer-to-business service 110 may communicate with a plurality of commerce front-end server devices 1990 corresponding to one or more business entities.

Figure 20:
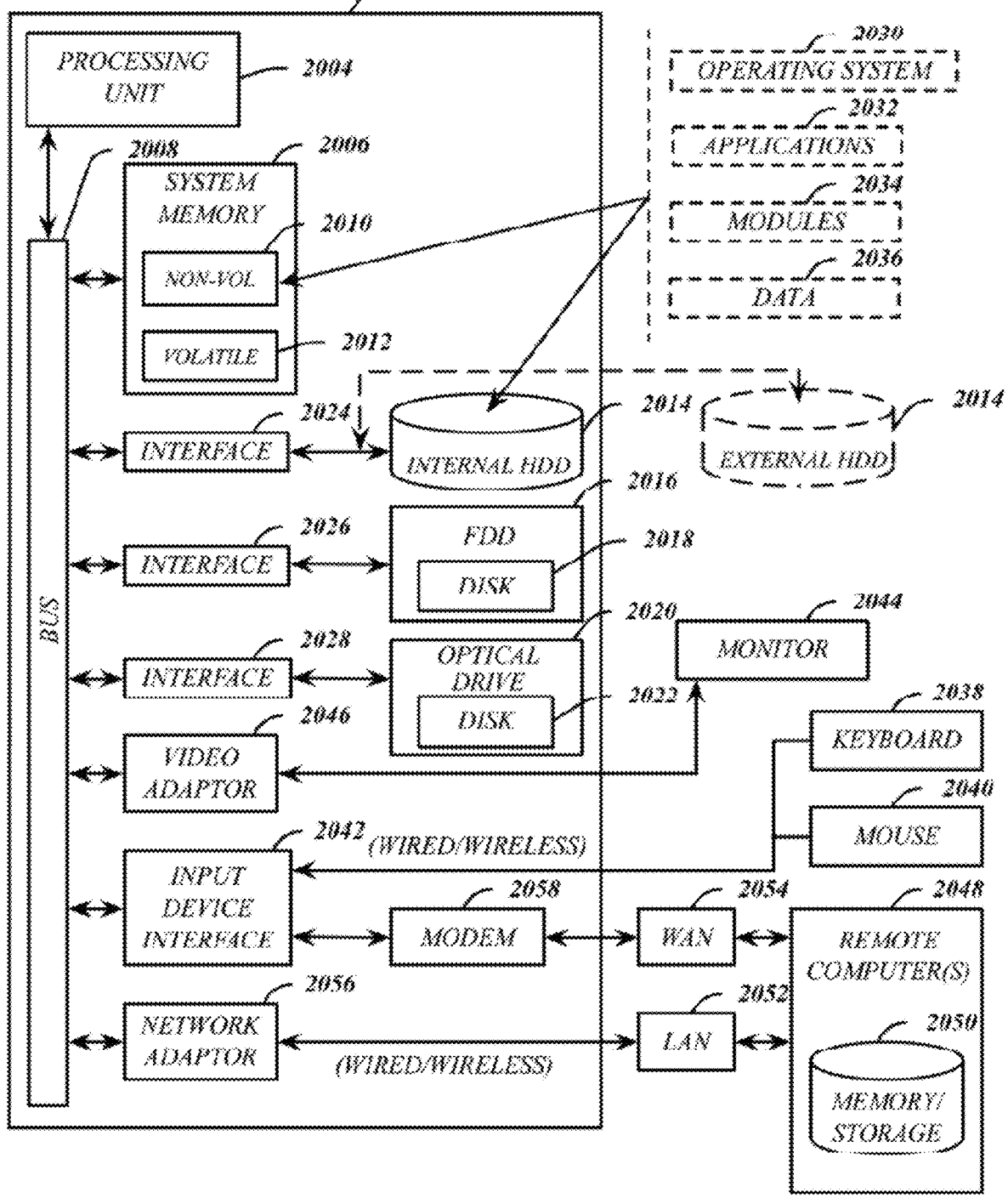
FIG. 20 illustrates an embodiment of a computing architecture.

FIG. 20 illustrates an embodiment of an exemplary computing architecture 2000 suitable for implementing various embodiments as previously described. In one embodiment, the computing architecture 2000 may comprise or be implemented as part of an electronic device. Examples of an electronic device may include those described with reference to FIGS. 18 and 19, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 2000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 2000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 2000.

As shown in FIG. 20, the computing architecture 2000 comprises a processing unit 2004, a system memory 2006 and a system bus 2008. The processing unit 2004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 2004.

The system bus 2008 provides an interface for system components including, but not limited to, the system memory 2006 to the processing unit 2004. The system bus 2008 can be any of several types of bus structure that may further interconnect to a memory bus (with or without a memory controller), a peripheral bus, and a local bus using any of a variety of commercially available bus architectures. Interface adapters may connect to the system bus 2008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 2000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 2006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 20, the system memory 2006 can include non-volatile memory 2010 and/or volatile memory 2012. A basic input/output system (BIOS) can be stored in the non-volatile memory 2010.

The computer 2002 may include various types of computer-readable storage media in the form of one or more lower speed memory units, including an internal (or external) hard disk drive (HDD) 2014, a magnetic floppy disk drive (FDD) 2016 to read from or write to a removable magnetic disk 2018, and an optical disk drive 2020 to read from or write to a removable optical disk 2022 (e.g., a CD-ROM or DVD). The HDD 2014, FDD 2016 and optical disk drive 2020 can be connected to the system bus 2008 by a HDD interface 2024, an FDD interface 2026 and an optical drive interface 2028, respectively. The HDD interface 2024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 2010, 2012, including an operating system 2030, one or more application programs 2032, other program modules 2034, and program data 2036. In one embodiment, the one or more application programs 2032, other program modules 2034, and program data 2036 can include, for example, the various applications and/or components of the system 100.

A user can enter commands and information into the computer 2002 through one or more wire/wireless input devices, for example, a keyboard 2038 and a pointing device, such as a mouse 2040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 2004 through an input device interface 2042 that is coupled to the system bus 2008, but can be connected by other interfaces such as a parallel port, IEEE 1394 serial port, a game port, a USB port, an IR interface, and so forth.

A monitor 2044 or other type of display device is also connected to the system bus 2008 via an interface, such as a video adaptor 2046. The monitor 2044 may be internal or external to the computer 2002. In addition to the monitor 2044, a computer typically includes other peripheral output devices, such as speakers, printers, and so forth.

The computer 2002 may operate in a networked environment using logical connections via wire and/or wireless communications to one or more remote computers, such as a remote computer 2048. The remote computer 2048 can be a workstation, a server computer, a router, a personal computer, portable computer, microprocessor-based entertainment appliance, a peer device or other common network node, and typically includes many or all of the elements described relative to the computer 2002, although, for purposes of brevity, only a memory/storage device 2050 is illustrated. The logical connections depicted include wire/wireless connectivity to a local area network (LAN) 2052 and/or larger networks, for example, a wide area network (WAN) 2054. Such LAN and WAN networking environments are commonplace in offices and companies, and facilitate enterprise-wide computer networks, such as intranets, all of which may connect to a global communications network, for example, the Internet.

When used in a LAN networking environment, the computer 2002 is connected to the LAN 2052 through a wire and/or wireless communication network interface or adaptor 2056. The adaptor 2056 can facilitate wire and/or wireless communications to the LAN 2052, which may also include a wireless access point disposed thereon for communicating with the wireless functionality of the adaptor 2056.

When used in a WAN networking environment, the computer 2002 can include a modem 2058, or is connected to a communications server on the WAN 2054, or has other means for establishing communications over the WAN 2054, such as by way of the Internet. The modem 2058, which can be internal or external and a wire and/or wireless device, connects to the system bus 2008 via the input device interface 2042. In a networked environment, program modules depicted relative to the computer 2002, or portions thereof, can be stored in the remote memory/storage device 2050. It will be appreciated that the network connections shown are exemplary and other means of establishing a communications link between the computers can be used.

The computer 2002 is operable to communicate with wire and wireless devices or entities using the IEEE 802 family of standards, such as wireless devices operatively disposed in wireless communication (e.g., IEEE 802.20 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.20x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 21:
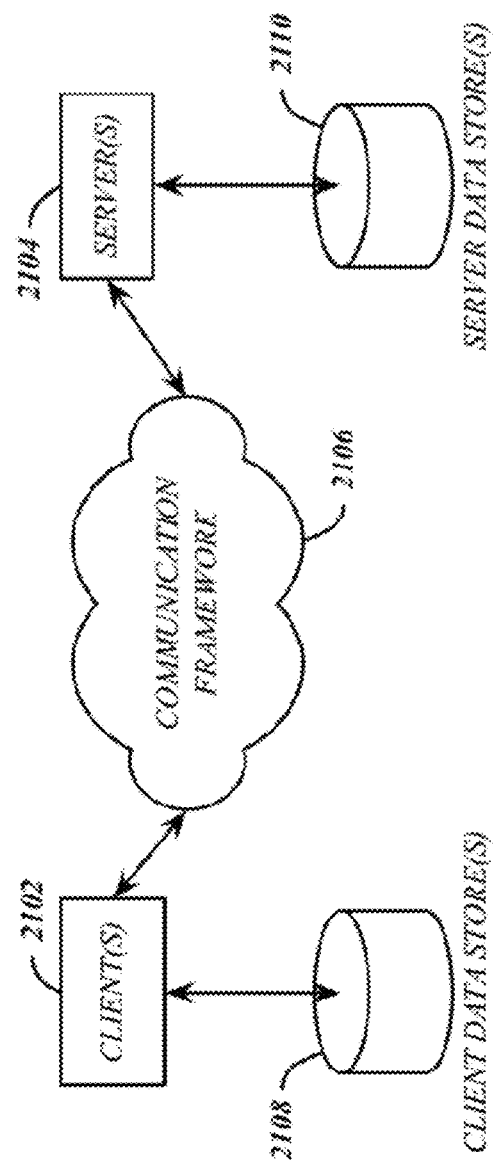
FIG. 21 illustrates an embodiment of a communications architecture.

FIG. 21 illustrates a block diagram of an exemplary communications architecture 2100 suitable for implementing various embodiments as previously described. The communications architecture 2100 includes various common communications elements, such as a transmitter, receiver, transceiver, radio, network interface, baseband processor, antenna, amplifiers, filters, power supplies, and so forth. The embodiments, however, are not limited to implementation by the communications architecture 2100.

As shown in FIG. 21, the communications architecture 2100 comprises includes one or more clients 2102 and servers 2104. The clients 2102 may implement the client device 910. The servers 2104 may implement the server device 950. The clients 2102 and the servers 2104 are operatively connected to one or more respective client data stores 2108 and server data stores 2110 that can be employed to store information local to the respective clients 2102 and servers 2104, such as cookies and/or associated contextual information.

The clients 2102 and the servers 2104 may communicate information between each other using a communication framework 2106. The communications framework 2106 may implement any well-known communications techniques and protocols. The communications framework 2106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 2106 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 2102 and the servers 2104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 22:
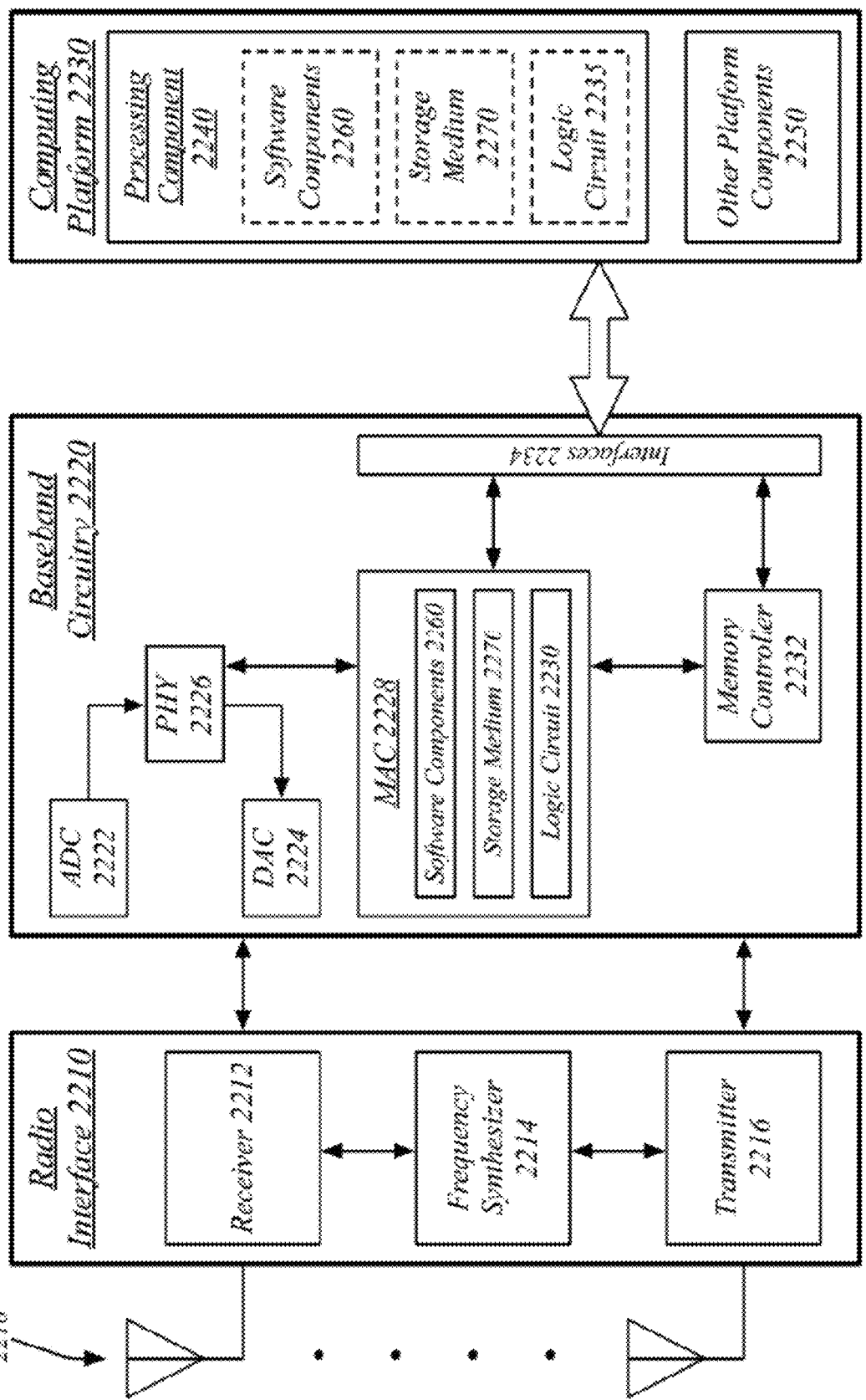
FIG. 22 illustrates an embodiment of a radio device architecture.

FIG. 22 illustrates an embodiment of a device 2200 for use in a multicarrier OFDM system, such as the system 100. Device 2200 may implement, for example, software components 2260 as described with reference to system 100 and/or a logic circuit 2235. The logic circuit 2235 may include physical circuits to perform operations described for the system 100. As shown in FIG. 22, device 2200 may include a radio interface 2210, baseband circuitry 2220, and computing platform 2230, although embodiments are not limited to this configuration.

The device 2200 may implement some or all of the structure and/or operations for the system 100 and/or logic circuit 2235 in a single computing entity, such as entirely within a single device. Alternatively, the device 2200 may distribute portions of the structure and/or operations for the system 100 and/or logic circuit 2235 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 2210 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 2210 may include, for example, a receiver 2212, a transmitter 2216 and/or a frequency synthesizer 2214. Radio interface 2210 may include bias controls, a crystal oscillator and/or one or more antennas 2218. In another embodiment, radio interface 2210 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 2220 may communicate with radio interface 2210 to process receive and/or transmit signals and may include, for example, an analog-to-digital converter 2222 for down converting received signals, a digital-to-analog converter 2224 for up converting signals for transmission. Further, baseband circuitry 2220 may include a baseband or physical layer (PHY) processing circuit 2256 for PHY link layer processing of respective receive/transmit signals. Baseband circuitry 2220 may include, for example, a processing circuit 2228 for medium access control (MAC)/data link layer processing. Baseband circuitry 2220 may include a memory controller 2232 for communicating with processing circuit 2228 and/or a computing platform 2230, for example, via one or more interfaces 2234.

In some embodiments, PHY processing circuit 2226 may include a frame construction and/or detection module, in combination with additional circuitry such as a buffer memory, to construct and/or deconstruct communication frames, such as radio frames. Alternatively or in addition, MAC processing circuit 2228 may share processing for certain of these functions or perform these processes independent of PHY processing circuit 2226. In some embodiments, MAC and PHY processing may be integrated into a single circuit.

The computing platform 2230 may provide computing functionality for the device 2200. As shown, the computing platform 2230 may include a processing component 2240. In addition to, or alternatively of, the baseband circuitry 2220, the device 2200 may execute processing operations or logic for the system 100 and logic circuit 2235 using the processing component 2240. The processing component 2240 (and/or PHY 2226 and/or MAC 2228) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 2230 may further include other platform components 2250. Other platform components 2250 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 2200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 2200 described herein, may be included or omitted in various embodiments of device 2200, as suitably desired. In some embodiments, device 2200 may be configured to be compatible with protocols and frequencies associated one or more of the 3GPP LTE Specifications and/or IEEE 2202.16 Standards for WMANs, and/or other broadband wireless networks, cited herein, although the embodiments are not limited in this respect.

Embodiments of device 2200 may be implemented using single input single output (SISO) architectures. However, certain implementations may include multiple antennas (e.g., antennas 2218) for transmission and/or reception using adaptive antenna techniques for beamforming or spatial division multiple access (SDMA) and/or using MIMO communication techniques.

The components and features of device 2200 may be implemented using any combination of discrete circuitry, application specific integrated circuits (ASICs), logic gates and/or single chip architectures. Further, the features of device 2200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 2200 shown in the block diagram of FIG. 22 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving, at a network interface on a commerce intermediary server, an order request package from a client device, the order request package specifying a user account and a commerce account, the user account associated with a user entity in a social graph data structure, the commerce account associated with a commerce entity in the social graph data structure; transmitting the order request package to a commerce front-end server associated with the commerce entity; and creating a commerce edge in the social graph data structure between the user entity and the commerce entity in response to receiving the order request package from the client device, the commerce edge associated with the order request package.

A computer-implemented method may further comprise receiving at a messaging server a message package, the message package addressed to the user account, the message package received from the commerce front-end server; determining that the commerce front-end server is authorized to message the user account based on the commerce edge in the social graph data structure between the user entity and the commerce entity; and transmitting the message package to the client device based on the determination that the commerce front-end server is authorized to message the user account based on the commerce edge in the social graph data structure between the user entity and the commerce entity.

A computer-implemented method may further comprise the message package received at the messaging server from the commerce front-end server via the commerce intermediary server.

A computer-implemented method may further comprise the message package comprising an order fulfillment package in response to the order request package.

A computer-implemented method may further comprise the order fulfillment package comprising an online fulfillment notification indicating that an online service contracted by the order request package has been fulfilled.

A computer-implemented method may further comprise the order fulfillment package comprising an in-person fulfillment notification indicating that at least one of an in-person service or an in-person product contracted by the order request package is ready for receipt at a particular location.

A computer-implemented method may further comprise the order fulfillment package comprising a machine-readable optical label, the machine readable optical label encoding an order identifier assigned to the order request package.

A computer-implemented method may further comprise transmitting a business application package to the client device, the business application package defining an order request format and order request options for the order request package.

A computer-implemented method may further comprise the business application package transmitted to the client device in response to a follow request received from the client device.

A computer-implemented method may further comprise the business application package comprising one or more of address information associated with the commerce entity, contact information associated with the commerce entity, and a product manifest associated with the commerce entity.

A computer-implemented method may further comprise the business application package comprising a product manifest associated with the commerce entity, the product manifest comprising a plurality of products, wherein each of the products is associated with a price, wherein one or more of the plurality of products is associated with one or more product options.

A computer-implemented method may further comprise receiving a geographic location of the client device; and selecting automatically at least one of the one or more product options based on the received geographic location.

A computer-implemented method may further comprise receiving a geographic location for the client device from the client device at a location-based services server; and transmitting the business application package to the client device based on the geographic location corresponding to the commerce entity.

A computer-implemented method may further comprise receiving a page follow request for the user account; creating a following edge in the social graph data structure between the user entity and the commerce entity in the social graph data structure; and transmitting the business application package to the client device based on the page follow request.

A computer-implemented method may further comprise performing a commerce affinity analysis for the commerce entity based on the social graph data structure; and transmitting the business application package to the client device based on the commerce affinity analysis predicting a commerce affinity between the user entity and the commerce entity.

A computer-implemented method may further comprise the commerce affinity analysis comprising one or more explicit affinity symbols in the social graph data structure and one or more implicit affinity symbols in the social graph data structure.

A computer-implemented method may further comprise performing a financial transaction with a financial transaction server based on the order request package; and inserting a financial transaction record for the financial transaction into the order request package prior to transmitting the order request package to the commerce front-end server.

A computer-implemented method may further comprise retrieving a default payment configuration record for the user account; and performing the financial transaction using the default payment configuration record.

A computer-implemented method may further comprise the order request package comprising a payment configuration record.

A computer-implemented method may further comprise receiving a promotion package from the commerce intermediary server, the promotion package defining one or more user selection attributes; selecting the user account based on the user selection attributes; authorizing the transmission of the promotion package to the user account based on commerce edge in the social graph data structure between the user entity and the commerce entity; and messaging the user account with the promotion package based on the authorizing of the transmission of the promotion package.

An apparatus may comprise a processor circuit; a network interface; a commerce intermediary server operative on the processor circuit to receive, from the network interface, an order request package from a client device, the order request package specifying a user account and a commerce account, the user account associated with a user entity in a social graph data structure, the commerce account associated with a commerce entity in the social graph data structure; and transmit the order request package to a commerce front-end server associated with the commerce entity; and a social graph data structure component operative to create a commerce edge in the social graph data structure between the user entity and the commerce entity in response to the commerce intermediary server receiving the order request package from the client device, the commerce edge associated with the order request package. The apparatus may be operative to implement any of the computer-implemented methods described herein.

A computer-implemented method may comprise receiving a messaging package from a messaging endpoint at a messaging service; performing a natural language processing of the messaging package to determine a response message predicted to correspond to the messaging package; determining an administrator account assigned to respond to the messaging package; and transmitting a form response package to an administrator messaging endpoint for the administrator account, the form response package comprising the response message.

A computer-implemented method may further comprise form response package operative to configure the administrator messaging endpoint to respond to the messaging package via the messaging service with the response message.

A computer-implemented method may further comprise the administrator messaging endpoint operative to display an option to transmit the response message to the messaging endpoint.

A computer-implemented method may further comprise receiving a responding messaging package from the administrator messaging endpoint, the responding messaging package comprising the response message.

A computer-implemented method may further comprise the response message comprising one or more dynamic fields, the receiving responding messaging package assigning one or more values to at least one of the one or more dynamic fields.

A computer-implemented method may further comprise the response message comprising one or more dynamic fields, further comprising: retrieving user account information associated with the messaging endpoint; and assigning one or more values to at least one of the one or more dynamic fields based on the user account information.

A computer-implemented method may further comprise wherein performing the natural language processing comprises submitting at least a portion of the messaging package to a natural language processor.

A computer-implemented method may further comprise the natural language processor trained based on a messaging interaction history for the messaging service.

A computer-implemented method may further comprise receiving one or more messaging intent keywords from the natural language processor; and retrieving the response message from a response message repository based on the one or more messaging intent keywords.

A computer-implemented method may further comprise submitting a plurality of response messages to a natural language processor; receiving an intent keyword mapping from the natural language processor in response to submitting the plurality of response messages to the natural language processor, the intent keyword mapping defining associations between the plurality of response messages and a plurality of intent keywords; and storing the defined associations between the plurality of response messages and the plurality of intent keywords in a response message repository.

A computer-implemented method may further comprise receiving a responding messaging package from the administrator messaging endpoint; determining that the responding messaging package is not based on the response message; extracting an administrator-specified response message from the responding messaging package; extracting a user message from the messaging package; submitting the user message and the administrator-specified response message to the natural language processor; receiving an additional keyword mapping from the natural language processor, the additional keyword mapping defining an association between the administrator-specified response message and one or more additional intent keywords; storing the administrator-specified response message in the response message repository; and storing the association between the administrator-specified response message and the one or more additional intent keywords in the response message repository.

A computer-implemented method may further comprise receiving a responding messaging package from the administrator messaging endpoint; determining whether the responding messaging package uses the response message; and training the natural language processor based on whether the responding messaging package uses the response message.

A computer-implemented method may further comprise the natural language processing of the messaging package determining one or more intent keywords and one or more parameters, further comprising: configuring an automated commerce interaction based on the one or more intent keywords and the one or more parameters.

A computer-implemented method may further comprise the automated commerce interaction comprising a reservation or a purchase.

A computer-implemented method may further comprise determining a product object from a product catalog based on at least one the one or more intent keywords and the one or more parameters, the automated commerce interaction incorporating the product object.

An apparatus may comprise a processor circuit on a device; a network interface; a commerce intermediary server operative on the processor circuit to receive, from the network interface, a messaging package from a messaging endpoint at a messaging service; perform a natural language processing of the messaging package to determine a response message predicted to correspond to the messaging package; determine an administrator account assigned to respond to the messaging package; and transmit a form response package to an administrator messaging endpoint for the administrator account, the form response package comprising the response message. The apparatus may be operative to implement any of the computer-implemented methods described herein.

A computer-implemented method may comprise receiving a user context associated with a user account for a messaging service; retrieving a user profile for the user account; determining one or more recommendations based on the user context and the user profile; and configuring a recommendation interface for a messaging endpoint on a client device based on the recommendations, the messaging endpoint associated with the user account for the messaging service.

A computer-implemented method may further comprise the user profile comprising a messaging affinity based on a messaging history for the user account, wherein determining the one or more recommendations is based on the messaging affinity.

A computer-implemented method may further comprise the user context comprising at least a geographic location for the client device, wherein at least one of the determined recommendations is for an interaction with an entity selected based on being within a geographic search area defined by the geographic location for the client device.

A computer-implemented method may further comprise the one or more recommendations comprising one or more recommendations to interact with one or more categories of business entities.

A computer-implemented method may further comprise the one or more recommendations comprising one or more recommendations to interact with one or more specific business entities.

A computer-implemented method may further comprise the one or more recommendations comprising one or more recommendations to purchase one or more specific products.

A computer-implemented method may further comprise the one or more recommendations comprising one or more recommendations to purchase one or more specific products from one or more specific business entities.

A computer-implemented method may further comprise the user context comprising at least a geographic location for the client device, the user profile comprising a plurality of recommended products, the one or more recommendations comprising recommendations to purchase one or more of the recommended products from one or more business entities within a geographic search area defined by the geographic location.

A computer-implemented method may further comprise wherein one or more recommended products of the plurality of recommended products are determined based on the one or more recommended products being referenced in a messaging history for the user account.

A computer-implemented method may further comprise the user profile comprising a messaging history for the user account, the one or more recommendations based at least in part on the messaging history.

A computer-implemented method may further comprise performing a consumer-to-business messaging interaction in the messaging service; determining a referenced product recommended for a user of the user account in the consumer-to-business messaging interaction; and including the referenced product in the one or more recommendations, the consumer-to-business messaging interaction comprising at least part of the user profile.

A computer-implemented method may further comprise the user context comprising at least a geographic location for the client device, the consumer-to-business messaging interaction between the user account and a business entity account, further comprising: determining to including the referenced product from the consumer-to-business messaging interaction based on the business entity account being associated with a business entity geographic location within a geographic search area defined by the geographic location for the client device.

A computer-implemented method may further comprise receiving a selected recommendation from the client device, the selected recommendation comprising one of the one or more recommendations; and initiating a messaging conversation in the messaging service between the messaging endpoint on the client device and a provider messaging endpoint associated with the selected recommendation, the messaging conversation automatically including the selected recommendation.

A computer-implemented method may further comprise receiving a recommendation acceptance message from the messaging endpoint on the client device regarding acceptance of the selected recommendation; transmitting the recommendation acceptance message to the provider messaging endpoint; and receiving a fulfillment update message from the provider messaging endpoint regarding fulfillment of the selected recommendation.

A computer-implemented method may further comprise determining a plurality of relevant products based on the user profile and the user context; and determining the one or more recommendations as highest-paying recommendations of the plurality of relevant products.

A computer-implemented method may further comprise determining a plurality of relevant business entities based on the user profile and the user context; and determining the one or more recommendations based on message-open-rates for the user account for the plurality of relevant business entities.

An apparatus may comprise a processor circuit on a device; a user context component operative on the processor circuit to manage a user context associated with a user account for a messaging service; a user profile component operative to retrieve a user profile for the user account; and a recommendation component operative to determine one or more recommendations based on the user context and the user profile and configure a recommendation interface for a messaging endpoint on a client device based on the recommendations, the messaging endpoint associated with the user account for the messaging service. The apparatus may be operative to implement any of the computer-implemented methods described herein.

A computer-implemented method may comprise receiving a user profile associated with a user account for a messaging service; receiving a messaging initiation from a messaging endpoint on a client device; and configuring an automated response based on the user profile in response to the messaging initiation.

A computer-implemented method may further comprise wherein configuring the automated response comprises extracting one or more customization elements from the user profile and basing the automated response on the extracted one or more customization elements, the one or more customization element comprising one or more of a name, an address, a date of birth, and a location.

A computer-implemented method may further comprise determining that the automated response is operative to be configured according to a user information element; determining that the user information element is not specified in the user profile; and prompting specification of the user information element for the user profile in response to determining that the automated response is operative to be configured according to the user information element and that the user information element is not specified in the user profile.

A computer-implemented method may further comprise wherein configuring the automated response further comprises determining a current geographic location associated with the user account.

A computer-implemented method may further comprise the messaging endpoint comprising a messaging widget embedded in a third-party webpage, further comprising: performing an automated interaction via the messaging widget based on the configured automated response.

A computer-implemented method may further comprise identifying the user account based on a web cookie.

A computer-implemented method may further comprise the automated response generated based on at least one of a decision tree and a finite state machine.

A computer-implemented method may further comprise the automated response created by an administrator interface to the messaging service.

A computer-implemented method may further comprise receiving a commerce transaction instruction as part of the automated response; and initiating a commerce transaction confirmation dialog in response to the commerce transaction instruction.

A computer-implemented method may further comprise displaying an advertisement; receiving a user selection of the advertisement; and instantiating the messaging endpoint in response to the user selection of the advertisement.

A computer-implemented method may further comprise the automated response selected from a plurality of automated responses based on a delivery address field of the messaging initiation.

A computer-implemented method may further comprise performing an automated interaction via the messaging endpoint based on the configured automated response; recording the automated interaction; and displaying the recorded automated interaction via an administrator interface for the automated response.

A computer-implemented method may further comprise performing an automated interaction via the messaging endpoint based on the configured automated response; determining that a current state for the automated interaction indicates administrator notification; and transmitting a notification to an administrator account in response to determining that the current state for the automated interaction indicates administrator notification.

A computer-implemented method may further comprise determining the administrator account from a plurality of administrator accounts based on user information from the user profile, the user information comprising at least one of a user location and user demographic information.

An apparatus may comprise a processor circuit on a device; a user profile component operative on the processor circuit to retrieve a user profile associated with a user account for a messaging service; and a messaging automation component operative to receive a messaging initiation from a messaging endpoint on a client device; and configure an automated response based on the user profile in response to the messaging initiation. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   receiving a user profile associated with a user account for a messaging service, the user profile associated with a repository of question-and-answer pairs;
   receiving a messaging query from a messaging endpoint on a client device;
   generating, by a natural language processor, a weighted relevance for each question in the question and answer pairs, the weighted relevance indicating the probability that the received query has the same meaning as the question in the question and answer pairs;
   determining that the weighted relevance for one question in the repository exceeds the weighted relevancies for all other questions in the repository;
   determining that the weighted relevance for the one question exceeds a predefined minimum threshold; and
   returning the answer from the question and answer pair containing the one response.

2. The method of claim 1, further comprising:
   configuring the automated response by extracting one or more customization elements from the user profile and basing the automated response on the extracted one or more customization elements, the one or more customization element comprising one or more of a name, an address, a date of birth, and a location.

3. The method of claim 1, the messaging endpoint comprising a messaging widget embedded in a third-party webpage, further comprising:
   performing an automated interaction via the messaging widget based on the configured automated response.

4. The method of claim 1, further comprising:
   receiving a commerce transaction instruction as part of the automated response; and
   initiating a commerce transaction confirmation dialog in response to the commerce transaction instruction.

5. The method of claim 1, further comprising:
   performing an automated interaction via the messaging endpoint based on the configured automated response;
   recording the automated interaction; and
   displaying the recorded automated interaction via an administrator interface for the automated response.

6. The method of claim 1, further comprising:
   performing an automated interaction via the messaging endpoint based on the configured automated response;
   determining that a current state for the automated interaction indicates administrator notification; and
   transmitting a notification to an administrator account in response to determining that the current state for the automated interaction indicates administrator notification.

7. The method of claim 6, further comprising:
   determining the administrator account from a plurality of administrator accounts based on user information from the user profile, the user information comprising at least one of a user location and user demographic information.

8. An apparatus, comprising:
   a processor circuit on a device;
   a user profile component operative on the processor circuit to:
      retrieve a user profile associated with a user account for a messaging service, the user profile associated with a repository of question-and-answer pairs; and
   a messaging automation component operative to:
      receive a messaging query from a messaging endpoint on a client device;
      generate, by a natural language processor, a weighted relevance for each question in the question-and-answer pairs, the weighted relevance indicating the probability that the received query has the same meaning as the question in the question-and-answer pairs;
      determine that the weighted relevance for one question exceeds the weighted relevancies for other questions in the repository;
      determine that the weighted relevance for the one question exceeds a predefined minimum threshold; and
      return the answer from the question-and-answer pair containing the one response.

9. The apparatus of claim 8, the messaging endpoint comprising a messaging widget embedded in a third-party webpage, further comprising:
   the messaging automation component operative to perform an automated interaction via the messaging widget based on the configured automated response.

10. The apparatus of claim 8, further comprising:
the messaging automation component operative to receive a commerce transaction instruction as part of the automated response and initiate a commerce transaction confirmation dialog in response to the commerce transaction instruction.

11. The apparatus of claim 8, further comprising:
the messaging automation component operative to perform an automated interaction via the messaging endpoint based on the configured automated response; record the automated interaction; and display the recorded automated interaction via an administrator interface for the automated response.

12. The apparatus of claim 8, further comprising:
the messaging automation component operative to perform an automated interaction via the messaging endpoint based on the configured automated response; determine that a current state for the automated interaction indicates administrator notification; and transmit a notification to an administrator account in response to determining that the current state for the automated interaction indicates administrator notification.

13. At least one non-transitory computer-readable storage medium comprising instructions that, when executed, cause a system to:
receive a user profile associated with a user account for a messaging service, the user profile associated with a repository of question-and-answer pairs;
receive a messaging query from a messaging endpoint on a client device;
generate, by a natural language processor, a weighted relevance for each question in the question-and-answer pairs, the weighted relevance indicating the probability that the received query has the same meaning as the question in the question-and-answer pairs;
determine that the weighted relevance for one question exceeds the weighted relevancies for all other questions in the repository;
determine that the weighted relevance exceeds a predefined minimum threshold; and
return the answer from the question-and-answer pair containing the one response.

14. The computer-readable storage medium of claim 13, the messaging endpoint comprising a messaging widget embedded in a third-party webpage, comprising further instructions that, when executed, cause a system to:
perform an automated interaction via the messaging widget based on the configured automated response.

15. The computer-readable storage medium of claim 13, comprising further instructions that, when executed, cause a system to:
receive a commerce transaction instruction as part of the automated response; and
initiate a commerce transaction confirmation dialog in response to the commerce transaction instruction.

16. The computer-readable storage medium of claim 13, comprising further instructions that, when executed, cause a system to:
perform an automated interaction via the messaging endpoint based on the configured automated response;
record the automated interaction; and
display the recorded automated interaction via an administrator interface for the automated response.

17. The computer-readable storage medium of claim 13, comprising further instructions that, when executed, cause a system to:
perform an automated interaction via the messaging endpoint based on the configured automated response;
determine that a current state for the automated interaction indicates administrator notification; and
transmit a notification to an administrator account in response to determining that the current state for the automated interaction indicates administrator notification.

\* \* \* \* \*